US009456048B2

(12) United States Patent
Kloba et al.

(10) Patent No.: US 9,456,048 B2
(45) Date of Patent: *Sep. 27, 2016

(54) SYSTEM, METHOD, AND COMPUTER PROGRAM PRODUCT FOR SERVER SIDE PROCESSING IN A MOBILE DEVICE ENVIRONMENT

(71) Applicant: iAnywhere Solutions, Inc., Dublin, CA (US)

(72) Inventors: David D. Kloba, Mountain View, CA (US); Michael R. Gray, Foster City, CA (US); David M. Moore, San Francisco, CA (US); Thomas E. Whittaker, Belmont, CA (US); David J. Williams, San Francisco, CA (US); Rafael Z. Weinstein, San Francisco, CA (US); Joshua E. Freeman, San Jose, CA (US); Linus M. Upson, Redwood City, CA (US); Tashana K. Landray, Mountain View, CA (US)

(73) Assignee: IANYWHERE SOLUTIONS, INC., Dublin, CA (US)

( * ) Notice: Subject to any disclaimer, the term of this patent is extended or adjusted under 35 U.S.C. 154(b) by 116 days.

This patent is subject to a terminal disclaimer.

(21) Appl. No.: 14/089,457

(22) Filed: Nov. 25, 2013

(65) Prior Publication Data
US 2014/0237065 A1 Aug. 21, 2014

Related U.S. Application Data

(63) Continuation of application No. 09/705,914, filed on Nov. 6, 2000, now Pat. No. 8,595,308.

(51) Int. Cl.
G06F 15/16 (2006.01)
H04L 29/08 (2006.01)
(Continued)

(52) U.S. Cl.
CPC ..... *H04L 67/2842* (2013.01); *G06F 17/30893* (2013.01); *G06F 17/30902* (2013.01);
(Continued)

(58) Field of Classification Search
CPC .................................................. H04L 63/0428
USPC ................................ 709/207, 213, 227, 228
See application file for complete search history.

(56) References Cited

U.S. PATENT DOCUMENTS 5,349,678 A 9/1994 Morris et al.
5,377,326 A 12/1994 Murata et al.
(Continued)

FOREIGN PATENT DOCUMENTS

EP 0 714 066 A2 5/1996
EP 0 848 339 A1 6/1998
(Continued)

OTHER PUBLICATIONS

Claria—Company Information—Corporate Overview (visited Mar. 24, 2006) http://www.claria.com/companyinfo/, 2 pages.
(Continued)

*Primary Examiner* — Adnan Mirza
(74) *Attorney, Agent, or Firm* — Sterne, Kessler, Goldstein & Fox P.L.L.C.

(57) ABSTRACT

Described herein are systems, methods, computer program products, and combinations and sub-combinations thereof, for enabling web content (as well as other objects) to be loaded on mobile devices (as well as other types of devices), and for users of mobile devices to operate with such web content on their mobile devices in an interactive manner while in an off-line mode.

32 Claims, 37 Drawing Sheets

(51) Int. Cl.
*G06F 17/30* (2006.01)
*H04W 72/00* (2009.01)
*H04W 72/02* (2009.01)
*H04W 4/18* (2009.01)

(52) U.S. Cl.
CPC ........... *H04L67/04* (2013.01); *H04L 67/2852* (2013.01); *H04L 67/2861* (2013.01); *H04L 67/02* (2013.01); *H04L 67/289* (2013.01); *H04W 4/18* (2013.01); *H04W 72/00* (2013.01); *H04W 72/02* (2013.01)

(56) References Cited

U.S. PATENT DOCUMENTS

| | | |
|---|---|---|
| 5,392,390 A | 2/1995 | Crozier |
| 5,410,543 A | 4/1995 | Seitz et al. |
| 5,426,594 A | 6/1995 | Wright et al. |
| 5,666,530 A | 9/1997 | Clark et al. |
| 5,666,553 A | 9/1997 | Crozier |
| 5,673,322 A | 9/1997 | Pepe et al. |
| 5,684,828 A | 11/1997 | Bolan et al. |
| 5,684,990 A | 11/1997 | Boothby |
| 5,694,546 A | 12/1997 | Reisman |
| 5,724,521 A | 3/1998 | Dedrick |
| 5,727,129 A | 3/1998 | Barrett et al. |
| 5,727,159 A | 3/1998 | Kikinis |
| 5,727,202 A | 3/1998 | Kucala |
| 5,729,735 A | 3/1998 | Meyering |
| 5,732,074 A | 3/1998 | Spaur et al. |
| 5,740,364 A | 4/1998 | Drerup |
| 5,754,774 A | 5/1998 | Bittinger et al. |
| 5,768,511 A | 6/1998 | Galvin et al. |
| 5,774,867 A | 6/1998 | Fitzpatrick et al. |
| 5,790,977 A | 8/1998 | Ezekiel |
| 5,794,210 A | 8/1998 | Goldhaber et al. |
| 5,794,259 A | 8/1998 | Kikinis |
| 5,799,063 A | 8/1998 | Krane |
| 5,802,292 A | 9/1998 | Mogul |
| 5,805,807 A | 9/1998 | Hanson et al. |
| 5,809,242 A | 9/1998 | Shaw et al. |
| 5,813,007 A | 9/1998 | Nielsen |
| 5,832,489 A | 11/1998 | Kucala |
| 5,835,712 A | 11/1998 | DuFresne |
| 5,848,396 A | 12/1998 | Gerace |
| 5,850,517 A | 12/1998 | Verkler et al. |
| 5,862,325 A | 1/1999 | Reed et al. |
| 5,862,339 A | 1/1999 | Bonnaure et al. |
| 5,862,346 A | 1/1999 | Kley et al. |
| 5,864,676 A | 1/1999 | Beer et al. |
| 5,873,047 A | 2/1999 | Nakano et al. |
| 5,873,100 A | 2/1999 | Adams et al. |
| 5,877,766 A | 3/1999 | Bates et al. |
| 5,881,234 A | 3/1999 | Schwob |
| 5,884,323 A | 3/1999 | Hawkins et al. |
| 5,890,158 A | 3/1999 | House et al. |
| 5,895,471 A | 4/1999 | King et al. |
| 5,896,502 A | 4/1999 | Shieh et al. |
| 5,905,856 A | 5/1999 | Ottensooser |
| 5,906,657 A | 5/1999 | Tognazzini |
| 5,917,491 A | 6/1999 | Bauersfeld |
| 5,918,013 A | 6/1999 | Mighdoll et al. |
| 5,918,237 A | 6/1999 | Montalbano |
| 5,919,247 A | 7/1999 | Van Hoff et al. |
| 5,922,045 A | 7/1999 | Hanson |
| 5,928,329 A | 7/1999 | Clark et al. |
| 5,933,811 A | 8/1999 | Angles et al. |
| 5,937,163 A | 8/1999 | Lee et al. |
| 5,943,496 A | 8/1999 | Li et al. |
| 5,943,676 A | 8/1999 | Boothby |
| 5,946,697 A | 8/1999 | Shen |
| 5,948,061 A | 9/1999 | Merriman et al. |
| 5,948,066 A | 9/1999 | Whalen et al. |
| 5,953,392 A | 9/1999 | Rhie et al. |
| 5,954,795 A | 9/1999 | Tomita et al. |
| 5,960,406 A | 9/1999 | Rasansky et al. |
| 5,961,601 A | 10/1999 | Iyengar |
| 5,961,602 A | 10/1999 | Thompson et al. |
| 5,974,238 A | 10/1999 | Chase, Jr. |
| 5,978,828 A | 11/1999 | Greer et al. |
| 5,978,833 A | 11/1999 | Pashley et al. |
| 5,978,842 A | 11/1999 | Noble et al. |
| 5,987,454 A | 11/1999 | Hobbs |
| 5,987,476 A | 11/1999 | Imai et al. |
| 5,987,499 A | 11/1999 | Morris et al. |
| 5,991,800 A | 11/1999 | Burke et al. |
| 6,000,000 A | 12/1999 | Hawkins et al. |
| 6,006,231 A | 12/1999 | Popa |
| 6,006,274 A | 12/1999 | Hawkins et al. |
| 6,009,462 A | 12/1999 | Birrell et al. |
| 6,012,083 A | 1/2000 | Savitzky et al. |
| 6,021,433 A | 2/2000 | Payne et al. |
| 6,023,698 A | 2/2000 | Lavey, Jr. et al. |
| 6,023,701 A | 2/2000 | Malik et al. |
| 6,023,704 A | 2/2000 | Gerard et al. |
| 6,023,708 A | 2/2000 | Mendez et al. |
| 6,026,474 A | 2/2000 | Carter et al. |
| 6,029,141 A | 2/2000 | Bezos et al. |
| 6,029,175 A | 2/2000 | Chow et al. |
| 6,029,195 A | 2/2000 | Herz |
| 6,032,162 A | 2/2000 | Burke |
| 6,035,324 A | 3/2000 | Chang et al. |
| 6,041,360 A | 3/2000 | Himmel et al. |
| 6,049,821 A | 4/2000 | Theriault et al. |
| 6,052,735 A | 4/2000 | Ulrich et al. |
| 6,058,416 A | 5/2000 | Mukherjee et al. |
| 6,061,718 A | 5/2000 | Nelson |
| 6,065,051 A | 5/2000 | Steele et al. |
| 6,065,059 A | 5/2000 | Shieh et al. |
| 6,065,120 A | 5/2000 | Laursen et al. |
| 6,070,184 A | 5/2000 | Blount et al. |
| 6,076,109 A | 6/2000 | Kikinis |
| 6,085,101 A | 7/2000 | Jain et al. |
| 6,085,192 A | 7/2000 | Mendez et al. |
| 6,091,956 A | 7/2000 | Hollenberg |
| 6,092,079 A | 7/2000 | Gerard et al. |
| 6,101,480 A | 8/2000 | Conmy et al. |
| 6,119,155 A | 9/2000 | Rossmann et al. |
| 6,119,167 A | 9/2000 | Boyle et al. |
| 6,122,658 A | 9/2000 | Chaddha |
| 6,131,096 A | 10/2000 | Ng et al. |
| 6,138,155 A | 10/2000 | Davis et al. |
| 6,141,010 A | 10/2000 | Hoyle |
| 6,148,330 A | 11/2000 | Puri et al. |
| 6,151,610 A | 11/2000 | Senn et al. |
| 6,161,146 A | 12/2000 | Kley et al. |
| 6,167,255 A | 12/2000 | Kennedy, III et al. |
| 6,167,441 A | 12/2000 | Himmel |
| 6,182,113 B1 | 1/2001 | Narayanaswami |
| 6,182,122 B1 | 1/2001 | Berstis |
| 6,195,692 B1 | 2/2001 | Hsu |
| 6,209,027 B1 | 3/2001 | Gibson |
| 6,209,111 B1 | 3/2001 | Kadyk et al. |
| 6,216,110 B1 | 4/2001 | Silverberg |
| 6,216,141 B1 | 4/2001 | Straub et al. |
| 6,219,696 B1 | 4/2001 | Wynblatt et al. |
| 6,226,650 B1 | 5/2001 | Mahajan et al. |
| 6,233,608 B1 | 5/2001 | Laursen et al. |
| 6,236,330 B1 | 5/2001 | Cohen |
| 6,236,357 B1 | 5/2001 | Corwith |
| 6,236,991 B1 | 5/2001 | Frauenhofer et al. |
| 6,253,326 B1 | 6/2001 | Lincke et al. |
| 6,263,347 B1 | 7/2001 | Kobayashi et al. |
| 6,266,681 B1 | 7/2001 | Guthrie |
| 6,269,341 B1 | 7/2001 | Redcay, Jr. |
| 6,275,859 B1 | 8/2001 | Wesley et al. |
| 6,278,449 B1 | 8/2001 | Sugiarto et al. |
| 6,300,947 B1 | 10/2001 | Kanevsky |
| 6,309,424 B1 | 10/2001 | Fallon |
| 6,311,058 B1 | 10/2001 | Wecker et al. |
| 6,313,852 B1 | 11/2001 | Ishizaki et al. |
| 6,332,127 B1 | 12/2001 | Bandera et al. |
| 6,336,137 B1 | 1/2002 | Lee et al. |
| 6,339,795 B1 | 1/2002 | Marurkar et al. |
| 6,341,316 B1 | 1/2002 | Kloba et al. |

(56) References Cited

U.S. PATENT DOCUMENTS

| | | |
|---|---|---|
| 6,353,839 B1 | 3/2002 | King et al. |
| 6,366,915 B1 | 4/2002 | Rubert et al. |
| 6,401,104 B1 | 6/2002 | LaRue et al. |
| 6,405,225 B1 | 6/2002 | Apfel et al. |
| 6,415,316 B1 | 7/2002 | Van Der Meer |
| 6,415,317 B1 | 7/2002 | Yelon et al. |
| 6,421,717 B1 | 7/2002 | Kloba et al. |
| 6,447,396 B1 | 9/2002 | Galyean et al. |
| 6,449,638 B1 | 9/2002 | Wecker et al. |
| 6,470,358 B1 | 10/2002 | Beyda et al. |
| 6,470,378 B1 | 10/2002 | Tracton et al. |
| 6,493,758 B1 | 12/2002 | McLain |
| 6,493,768 B1 | 12/2002 | Boutcher |
| 6,496,979 B1 | 12/2002 | Chen et al. |
| 6,515,680 B1 | 2/2003 | Hendricks et al. |
| 6,516,341 B2 | 2/2003 | Shaw et al. |
| 6,519,627 B1 | 2/2003 | Dan et al. |
| 6,522,342 B1 | 2/2003 | Gagnon et al. |
| 6,535,912 B1 | 3/2003 | Anupam et al. |
| 6,538,665 B2 | 3/2003 | Crow et al. |
| 6,553,037 B1 | 4/2003 | Pivowar et al. |
| 6,553,412 B1 | 4/2003 | Kloba et al. |
| 6,560,639 B1 | 5/2003 | Dan et al. |
| 6,577,622 B1 | 6/2003 | Schuster et al. |
| 6,587,835 B1 | 7/2003 | Treyz et al. |
| 6,609,150 B2 | 8/2003 | Lee et al. |
| 6,615,276 B1 | 9/2003 | Mastrianni et al. |
| 6,636,897 B1 | 10/2003 | Sherman et al. |
| 6,647,370 B1 | 11/2003 | Fu et al. |
| 6,650,620 B1 | 11/2003 | Neogi |
| 6,654,746 B1 | 11/2003 | Wong et al. |
| 6,654,800 B1 | 11/2003 | Rieger, III |
| 6,665,709 B1 | 12/2003 | Barron |
| 6,671,853 B1 | 12/2003 | Burkett et al. |
| 6,675,356 B1 | 1/2004 | Adler et al. |
| 6,677,894 B2 | 1/2004 | Sheynblat et al. |
| 6,701,378 B1 | 3/2004 | Gilhuly et al. |
| 6,754,670 B1 | 6/2004 | Lindsay et al. |
| 6,779,042 B1 | 8/2004 | Kloba et al. |
| 6,839,744 B1 | 1/2005 | Kloba et al. |
| 6,874,683 B2 | 4/2005 | Keronen et al. |
| 6,882,299 B1 | 4/2005 | Allport |
| 6,925,595 B1 | 8/2005 | Whitledge et al. |
| 6,961,776 B1 | 11/2005 | Buckingham et al. |
| 7,000,032 B2 | 2/2006 | Kloba et al. |
| 7,039,599 B2 | 5/2006 | Merriman et al. |
| 7,072,984 B1 | 7/2006 | Polonsky et al. |
| 7,100,111 B2 | 8/2006 | McElfresh et al. |
| 7,174,361 B1 | 2/2007 | Paas |
| 7,210,100 B2 | 4/2007 | Berger et al. |
| 7,263,547 B2 | 8/2007 | Kloba et al. |
| 7,392,308 B2 | 6/2008 | Aufricht et al. |
| 7,644,018 B1 | 1/2010 | Yukie et al. |
| 7,673,017 B2 | 3/2010 | Kim et al. |
| 7,987,420 B1 | 7/2011 | Kloba et al. |
| 2001/0032193 A1 | 10/2001 | Ferber |
| 2001/0036224 A1 | 11/2001 | Demello et al. |
| 2001/0041973 A1 | 11/2001 | Abkowitz et al. |
| 2001/0047394 A1 | 11/2001 | Kloba et al. |
| 2001/0051900 A1 | 12/2001 | Fisher et al. |
| 2002/0007402 A1 | 1/2002 | Huston et al. |
| 2002/0049635 A1 | 4/2002 | Mai et al. |
| 2002/0052781 A1 | 5/2002 | Aufricht et al. |
| 2002/0073235 A1 | 6/2002 | Chen et al. |
| 2002/0077130 A1 | 6/2002 | Owensby |
| 2002/0082912 A1 | 6/2002 | Batachia et al. |
| 2003/0006911 A1 | 1/2003 | Smith et al. |
| 2003/0032409 A1 | 2/2003 | Hutcheson et al. |
| 2003/0181201 A1 | 9/2003 | Bomze et al. |
| 2003/0182184 A1 | 9/2003 | Strasnick et al. |
| 2004/0181593 A1 | 9/2004 | Kanojia et al. |
| 2004/0249708 A1 | 12/2004 | Jacobs et al. |
| 2005/0102180 A1 | 5/2005 | Gailey et al. |
| 2005/0114366 A1 | 5/2005 | Mathai et al. |
| 2005/0192008 A1 | 9/2005 | Desai et al. |
| 2006/0036493 A1 | 2/2006 | Aufricht et al. |
| 2006/0036494 A1 | 2/2006 | Aufricht et al. |
| 2006/0036495 A1 | 2/2006 | Aufricht et al. |
| 2006/0041638 A1 | 2/2006 | Whittaker et al. |
| 2006/0136571 A1 | 6/2006 | Kloba et al. |
| 2008/0120184 A1 | 5/2008 | Aufricht et al. |
| 2008/0134031 A1 | 6/2008 | Aufricht et al. |
| 2008/0215672 A1 | 9/2008 | Kloba et al. |
| 2010/0114705 A1 | 5/2010 | Hoyle |

FOREIGN PATENT DOCUMENTS

| | | |
|---|---|---|
| EP | 0 876 034 A2 | 11/1998 |
| EP | 0 944 009 A2 | 9/1999 |
| EP | 1 061 458 A2 | 12/2000 |
| WO | WO 94/12938 | 6/1994 |
| WO | WO 97/04389 | 2/1997 |
| WO | WO 98/34203 | 8/1998 |
| WO | WO 98/34422 | 8/1998 |
| WO | WO 98/38614 A1 | 9/1998 |
| WO | WO 99/22322 | 5/1999 |
| WO | WO 99/35802 A1 | 7/1999 |
| WO | WO 99/55066 A1 | 10/1999 |
| WO | WO 00/14625 | 3/2000 |
| WO | WO 00/62463 A2 | 10/2000 |

OTHER PUBLICATIONS

Kloba et al., U.S. Appl. No. 09/705,927, filed Nov. 6, 2000.

Cerami, Ethan. Delivering Push, New York; McGraw-Hill, 1998.

Examination Report, From Great Britain Application No. GB0207917.6, Mailed Jul. 1, 2004, 3 pages.

Examination Report, From GB 0207917.6, Mailed Dec. 5, 2003, 3 pages.

"Method for bookmarking web pages of temporary interest," Research Disclosure, RD429108, Disclosed by Ericsson, Inc., Jan. 2000, Kenneth Mason Publications, Ltd., http://www.researchdisclosure.com, 1 page.

"Appointments Off by One Hour After Synchronization," http://support.microsoft.com/support/kb/articles/q195/5/79.asp, last reviewed Sep. 2, 1999, provided by Microsoft Product Support Services, 1 page.

"Russian Nino Computer," http://webideas.com/russian/systems/nino301.htm, last visited Jul. 25, 2000, Web Ideas Int'l Co., 1 page.

"512KB Organizer w/Synchronization," http://www.codemicro.com/fs/p11109.html, last visited Jul. 25, 2000, codemicro.com.

"Syncrhonization Between Your Handheld PC and Desktop PC," http://www.microsoft.com/MOBILE/hpc/features/synch.asp, last visited Jul. 25, 2000, Microsoft, Inc., 1 page.

"Puma Adds Security to Wireless Syncing Software," http://devices.internet.com/news/q29908/990802puma/990802puma.html, last visited Jul. 25, 2000, Copyright 1999, internet.com Corp., 1 page.

"iMobile Data Synchronization Replicates Mobile Databases," http://www.synchrologic.com/about/about_imobile_data_synchronization.html, 2 pages, last visited Jul. 25, 2000, Synchrologic, Inc.

"WeSync.com Previews Wireless Synchronization Solution for Handheld Computers: Collaborative Service for Handheld Users Moves Into Public Beta Today; Wireless Refresh (TM) Lets Users Perform Narrow Bandwidth Wireless Syncs," http://www.palmsizepc.com/oct99-20-1.html, last visited Jul. 25, 2000, 3 pages, WeSync.com, Inc.

"XTNDConnect Server White Papers," http://www.extendsys.com/prodinfo/white/serversync/, last visited Jul. 25, 2000, 1 page, Extended Systems, Inc.

"Introduction to Wireless Internet & Mobile Computing Market," Copyright 1999, Wireless Internet & Mobile Computing, http://www.wirelessinternet.com/introtol.htm, last visited Jul. 24, 2000, 4 pages.

"Databites," http://www.databites.com/company_info.htm, Databites Corporation, 2 pages, last visited Jul. 26, 2000.

"Tools for the TEKS: Integrating Technology in the Classroom:" Offline Web Browsing=No More Excuses!, Copyright 1998, Wesley A. Fryer, last visited Jun. 22, 2000, http://www.wrvi.com/teks/article4.html, 9 pages.

(56) References Cited

OTHER PUBLICATIONS

Story, Derrick "Palm Browsing," Miller-Freeman, Inc., Jul. 30, 1999, http://www.webreview.com/pub/1999/07/30/feature/index.html, 2 pages.
Shultz, Greg "Take Advantage of Offline Browsing Tools: Learn to browse Web site content without being connected to the Internet," last visited Jun. 22, 2000, http://www.zdnet.com/zdhelp/stories/main/0,5594,2395480,00.html, Copyright 2000, ZD Inc., 2 pages.
Dalrymple, Jim "Palm-like Internet appliance on the way from 3Com," Mar. 27, 2000, http://www.maccentral.com/news/0003/27.palm.shtml, Mac Publishing LLC, 3 pages.
"Offline Reading," http://www.microsoft.com/windows/Ie/Features/offline.asp, last updated Mar. 18, 1999, Microsoft Corporation, 1 page.
"InContext FlashSite," http://ipw.internet.com/clients_servers/offline_browsers/916161991.html, internet.com Corporation, Jan. 12, 1999, 2 pages.
"AvantGo Enterprise™," http://avantgo.com/enterprise/products/index.html, Copyright 2000 AvantGo, Inc., 2 pages, last visited Jun. 21, 2000.
"PalmPilot Software Programming and Development," http://www.pencomputersolutions.com/, Pen Computer Solutions, Inc., 4 pages, last edited Jun. 16, 2000.
"Pocket Browser 1.52 for Palm-size PC," http://www.ceshopper.com/ceshopper/pocketbrowser.html, Copyright 2000, CEShopper.com, last visited Jun. 22, 2000, 1 page.
"Answers & Tips: Browse the web on any palm," http://web.zdnet.com/zdtv/screensavers/answerstips/story/0.3656.2408515.0-0.html, 2 pages, Copyright 1997-2000, ZDTV LLC, last visited Jun. 22, 2000.
"Palm Announces Mobile Internet Kit, Linking Palm Handhelds With Mobile Phones for Wireless Web Connectivity: New Web Clipping Applications to Provide Out-of-the-box Access to Leading Internet Content," http://biz/yahoo.com/bw/000627/ny_palm_2.html, Yahoo!, Jun. 27, 2000, 3 pages.
"GoAmerica Licenses Oracle Platform," http://www.allnetdevices.com/wireless/news/2000/06/27/goamerica_licenses.html, internet.com Corp, Jun. 27, 2000, 2 pages.
"ProxiWeb," http://aolcom.cnet.com/downloads/0-10126-100-1757359.html?tag=st.dl.10126_106_1.1st.td, Apr. 25, 2000, CNET Networks, Inc., 2 pages.
Wilcox, Joe, "IBM aimes to put computers on the wrist," http://cnet.com/news/0-1006-200-2160685.html, CNET Networks, Inc., Jun. 27, 2000, 3 pages.
Portable Internet, http://www.portableinternet.com/, Copyright 2000, Portable Internet, Inc., last visited on Jul. 5, 2000, 1 page.
BravuraNet, http://www.bravurnet.com, Copyright 2000, BravuraNet, last visited Jul. 13, 2000.
"HotLinks: Store Bookmarks Online," http://www.zdnet.com/pcmag/stories/firstlooks/0.6763.2403245.00.html, Dec. 3, 1999, ZD Inc., 2 pages.
"MyBookmarks™," http://www.mybookmarks.com, Copyright 2000, MyBookmarks.com, LLC, last visited Jul. 13, 2000, 1 page.
AvantGo Server Administration Guide, Version 2.0 for Windows NT, AvantGo Inc., Sep. 1988, 135 pages.
Press Release, "AvantGo Presents Mobile Computing Software at Herring on the Enterprise: Organizations such as Grenley-Stewart Resources and Rosenbluth International Already Reaping Benefits," Apr. 6, 1998, AvantGo, Inc.
Press Release, "AvantGo to Demonstrate New Enterprise Applications for the 3Com® PalmPilot™ Connected Organizer at Seybold '98: Applications Enable Networked Digital Workflows for Publishing Environments," 2 pages, Mar. 17, 1998, AvantGo, Inc.
Press Release, "AvantGo Software Extends Enterprise Applications to Handheld Devices: New Company Provides Instant Access to Essential Information for Mobile Professionals," 3 pages, Feb. 17, 1998, AvantGo, Inc.
Press Release, "Visto and AvantGo Team to Extend Web-Based Personal Content to Palm Pilot and Windows CE Devices: Visto Briefcase Will Leverage AvantGo 2.0 for Mobile Workforce," 2 pages, Sep. 21, 1998, AvantGo, Inc.
Press Release, "UpShot Partners with AvantGo to Display Latest Sales Data on Handhelds: Field Sales Representatives Will Have the Power of Sales Automation at Their Fingertips," 2 pages, Sep. 21, 1998, AvantGo, Inc.
Press Release, "AvantGo Announces Business Partner Program: VARs, Systems Integrators, Distributors and Consultants to Deliver Enterprise Applications for Handheld Computers," 2 pages, Sep. 21, 1998, AvantGo, Inc.
Press Release, "Industry Bigshots and Upstarts Rally Around AvantGo 2.0: Microsoft, IBM, Oracle, Symbol Technologies and Palm Computing Support AvantGo," 3 pages, Sep. 21, 1998, AvantGo, Inc.
Press Release, "Novatel Wireless and AvantGo Team Up to Provide Corporate Information to Wirelessly-Enabled Handhelds: Minstrel Modem and AvantGo 2.0 Extend Enterprise Connectivity," 2 pages, Sep. 21, 1998, AvantGo, Inc.
Press Release, "AvantGo Releases AvantGo 2.0- The Definitive Enterprise Solution for Managing Mobile Information: New Product Offering Provides Centralized Administration, Universal Remote Access and Mobile Transactions Between Corporate Databases and Handhelds," 3 pages, Sep. 21, 1998, AvantGo, Inc.
Press Release, "Casio Announces Support for AvantGo: AvantGo to Deliver Enterprise Applications for Casio's Windows CE-Compatible Devices," 2 pages, Sep. 21, 1998, AvantGo, Inc.
AvantGo Desktop and AvantGo WebClient for the 3Com PalmPilot™ Connected Organizer, "Readme," 2 pages, Jan. 20, 1998, AvantGo, Inc.
Press Release, AvantGo Integrated Into Pocket Internet Explorer for Pocket PCs: AvantGo Available on New Pocket PC Devices from Casio, Compaq, Hp and Symbol Technologies, 3 pages, Apr. 19, 2000, AvantGo, Inc.
Press Release, "AvantGo Completes $31 Million Mezzanine Financing: Goldman Sachs, American Express, Ford Motor Company, McKessonHBOC and Research in Motion (RIM) Accelerate Growth of Business-to-Business Mobile Internet Company," 2 pages, Apr. 17, 2000, AvantGo, Inc.
Press Release, "AvantGo Empowers BG's Leading Lights with Mobile Intranet and Internet Access: Mobile Software gives International Energy Company an Advantage in Customer care and Business Management," 3 pages, Apr. 4, 2000, AvantGo, Inc.
Press Release, "AvantGo Embraces Macintosh Community: AvantGo Delivers Free Mobile Internet Service to Macintosh Users," 2 pages, Mar. 27, 2000, AvantGo, Inc.
Press Release, "AvantGo Joins GPRS Application Alliance: AvantGo Teams up with Ericsson to support Wireless Standards for Mobile Devices," 2 pages, Feb. 28, 2000, AvantGo, Inc.
Press Release, "AvantGo Integrated in Microsoft's Internet Explorer for the Pocket PC: Out of the Box, Mobile Users Gain Access to the Mobile Internet via Pocket Internet Explorer and AvantGo," 2 pages, Feb. 24, 2000, AvantGo, Inc.
Press Release, "AvantGo Joins Motorola Web w/o Wires Alliance Program: AvantGo Now Easily Accessible from Motorola Web Phones," 2 pages, Feb. 24, 2000, AvantGo, Inc.
Press Release, "AvantGo Optimizes User Experience on Palm IIIc™ Handheld Computers: With enhanced image support from AvantGo, Users Can View Web-Based Photos and Graphics in Color on New Devices," 2 pages, Feb. 24, 2000, AvantGo, Inc.
Press Release, "AvantGo.Com Bolsters Business Channels: New relationships with Business Week, Infonautics, The Economist, Fidelity Investments and The Financial News among the more than 80 Optimized AvantGo.com Business Channels for Mobile Device Users," 2 pages, Feb. 16, 2000, AvantGo, Inc.
Press Release, "Leading Labels and Music Sites Go Mobile With AvantGo.Com: Columbia Records, Universal's Interscope Geffen A&M, Ticketmaster Online-CitySearch's LiveDaily.com and Milor Entertainment Group join Amazon.com and mySimon.com to bring the Music Industry to Mobile Devices," 2 pages, Feb. 14, 2000, AvantGo, Inc.
Press Release, "AvantGo Names Head of Dell Online, Richard Owen, CEO: Mobile Computing Leader Bolsters Management Team With Key New Hires," Jan. 25, 2000, AvantGo, Inc.

(56) References Cited

OTHER PUBLICATIONS

Press Release, "AvantGo Expands Relationship with InfoSpace. com: AvantGo to offer InfoSpace.com's Mobile Private Label Portals to Users of Palm Computing Platform, Windows CE and Wireless PDAs," 2 pages, Jan. 18, 2000, AvantGo, Inc.

Press Release, "AvantGo.Com Available to Macintosh users," Jan. 5, 2000, AvantGo, Inc.

Press Release, "Verian Technologies and AvantGo Team Up to Resell Mobile Procurement Application: Bundled Software Package from Verian Provides Improved Inventory Management for Mobile Professionals," 2 pages, Jan. 3, 2000, AvantGo, Inc.

Press Release, "AvantGo Drives Healthcare Market Adoption of Handheld Devices: CHW, Mass General, McKessonHBOC, US Surgical, Norton Healthcare, Handheldmed.com, FitForAll.com and Asimba.com Select AvantGo to Deliver Critical Health Information to Mobile Devices," 3 pages, Dec. 14, 1999, AvantGo, Inc.

Press Release, AvantGo Announces New AvantGo Enterprise Publisher: Mobile Leader Expands Enterprise Offerings to Extend Corporate Web Content to Mobile Devices, 2 pages, Dec. 6, 1999, AvantGo, Inc.

Press Release, "Go Network Delivers Mobile Solutions with AvantGo: Partnership to Give Wireless Users Access to Go Network Anytime, Anywhere," 2 pages, Nov. 11, 1999.

Press Releae, "AvantGo Delivers Award-Winning Mobile Computing Software and Popular Consumer Internet Service to Europe: Company Expands into Europe; Phillip Hibberd to Head European Operations," 2 pages, Nov. 1, 1999, AvantGo, Inc.

Press Release, "AvantGo Mobile Unity Brings the Web to Wireless Devices: Mobile Computing Leader Brings the Web to Internet-enabled Phones and Wireless Handheld Devices; Integrates with Wireless Solutions," 4 pages, Oct. 25, 1999, AvantGo, Inc.

Press Release, Leading Mobile Computing Companies Form Industry Association: Puma, Aether Systems, Attachmate, AvantGo, Certicom, Globalware, Epocrates and the Windward Group Establish Mobile Application Link Forum to Advance and Promote Open Source Communications Protocol for Networked Applications, 3 pages, Oct. 18, 1999, AvantGo, Inc.

Press Release, "AvantGo Ships with New Special Edition Palm Vx™ Organizer," 2 pages, Oct. 13, 1999, AvantGo, Inc.

Press Release, "FT.Com and AvantGo Put the Latest International Business News in the Palm of Your Hand," 2 pages, Oct. 4, 1999, AvantGo, Inc.

Press Release, "Amazon.com First to Join AvantGo.com E-Commerce Initiative," 2 pages, Oct. 4, 1999, AvantGo, Inc.

Press Release, "AvantGo Teams With HP: AvantGo.com Now Available on the New HP Jornada 430se Palm-size PC," 2 pages, Sep. 27, 1999, AvantGo, Inc.

Press Release, "Sony Online Entertainment and AvantGo Announce Jeopardy! 2001 Online to be Delivered to Users of Handheld Devices: The Station ® sony.com ventures beyond the Internet to extend distribution," 2 pages, Sep. 20, 1999, AvantGo, Inc.

Press Release, "AvantGo.com Scales to Showcase the Power of AvantGo Enterprise 3: Free Interactive Service Delivers More Than 15 Million Web Pages Daily to Hundreds of Thousands of Users," 2 pages, Sep. 7, 1999, AvantGo, Inc.

Press Release, "AvantGo Enterprise 3 Breaks Barrier Between Enterprise and Handhelds: Attachmate Corporation and AvantGo enter Into Business Alliance," 3 pages, Sep. 7, 1999, AvantGo, Inc.

Press Release, "AvantGo Signs CFO Thomas Hunter: Former IBM and First Data Corp. Executive Joins Leading Handheld Software Provider," Aug. 23, 1999, AvantGo, Inc.

Press Release, Microsoft and AvantGo Deliver Personalized Content from Slate to AvantGo.com: Customized Information from Slate Now Available to Users of Palm OS- and Windows CE-Based Handheld Devices Through AvantGo.com, 2 pages, Aug. 9, 1999, AvantGo, Inc.

Press Release, "Salon.com to Provide Content for Palm Pilots and other Handheld Devices through AvantGo.com: News, Technology and other content from Salon.com now available to over 300,000 AvantGo.com subscribers," 2 pages, Jul. 26, 1999, AvantGo, Inc.

Press Release, "WisdomWare Partners with AvantGo to Provide Handheld Marketing and Sales Intelligence Solution: Reseller Agreement Enables Planned WisdomWare AnyWhere™ Service," 2 pages, Jul. 26, 1999, AvantGo, Inc.

Press Release, "Ontheroad.com Snapshots Double Every Two Weeks with AvantGo.com," 2 pages, Jul. 19, 1999, AvantGo, Inc.

Press Release, "AvantGo Partners with Vicinity to Provide Mapblast! Maps and directions to Handheld Device Users Through AvantGo.com," 2 pages, Jun. 28, 1999, AvantGo, Inc.

Press Release, "Microsoft and 3Com Invest in AvantGo: Mobile Computing Leader takes $14.7 Million in Third Round Funding from Microsoft, 3Com, Fayez Sarofim & Co., 21st Century Internet Venture Partners, H & Q Venture Associates and Adobe Ventures," 3 pages, Jun. 18, 1999, AvantGo, Inc.

Press Release, "AvantGo Teams with The Wall Street Journal Interactive Edition to Introduce New Personalized Content for AvantGo.com: AvantGo.com Provides News Services to PalmOS and Windows CE handheld users," 2 pages, May 17, 1999, AvantGo, Inc.

Press Release, "AvantGo.com Bolstered by Name Brand Handheld Makers, Wireless Providers and Content Publishers: Microsoft, Phillips, Casio, IBM, AT&T Wireless, GoAmerica, Novatel Wireless and Others Endorse Interactive Service with 100 Optimized Channels from Leading Content Providers," 6 pages, May 10, 1999, AvantGo, Inc.

Press Release, "AvantGo Unleashes AvantGo.com, the First Free Interactive Service for Mobile Device Users: New Personalized Service Puts the Power of the Web in the Palm of Your Hand," 3 pages, May 10, 1999, AvantGo, Inc.

Press Release, "David Harris Joins AvantGo as Vice President of Worldwide Sales and Business Development: Former Member of Adobe Senior Management Signs on with Industry-Leading Mobile Computing Company," 2 pages, Apr. 19, 1999, AvantGo, Inc.

Press Release, "AvantGo Logo Created by 1185 Design Recognized as Outstanding: Design Receives Prestigious Communications Arts (CA) Magazine Award; Logo to Appear in CA and American Corporate Identity Publications," Mar. 29, 1999, AvantGo, Inc.

Press Release, "AvantGo Licenses Certicom's SSL Plus for Embedded Systems: Advanced Certicom security Technology now Available to Mobile Enterprise customers Using AvantGo with Windows CE and Palm Computing handhelds," 2 pages, Apr. 13, 1999, AvantGo, Inc.

Press Release, "AvantGo Integrates Seamlessly with New Minstrel III by Novatel Wireless: Interactive Wireless Data Capabilities Allow Real•time Access to Critical Information on Palm Computing Platform Devices," 2 pages, Apr. 6, 1999, AvantGo, Inc.

Press Release, "AvantGo and Microsoft Silicon Valley Developer Center to Offer Free Seminars to Enterprises Interested in Extending Applications to .Windows CE-Based Devices: Attendees Can Register Today for Technical Sessions on Apr. 26-27 and May 24-25," 2 pages, Mar. 16, 1999, AvantGo, Inc.

Press Release, "AvantGo and the Windward Group Offer Free Seminars to Enterprises Interested in Extending Applications to Mobile Devices: Attendees Can Register Today for Bay Area Sessions on Apr. 28 & 29," 2 pages, Mar. 15, 1999, AvantGo, Inc.

Press Release, "AvantGo Recognized Again for Execllence in Mobile Computing: Mobile Insights Chooses AvantGo as Best Mobile Computing Solution in "Wireless Internet and Intranet" Category," 2 pages, Mar. 6, 1999, AvantGo, Inc.

Press Release, "AvantGo and Puma Deliver Open Source Code for Handheld-to-Server Connectivity: Microsoft, Sybase and Symbol Support Mobile Application Link as Key to Corporate Handheld Market Growth," 2 pages, Mar. 1, 1999, AvantGo, Inc.

Press Release, "AvantGo Takes Home Seven Leading Industry Awards: Hot Mobile Computing Software Company Recognized During 1998 for Creativity, Innovation and Candor," Feb. 8, 1999, AvantGo, Inc.

Press Release, AvantGo Receives Two Awards from Tap Magazine,~ Feb. 26, 1999, AvantGo, Inc.

Press Release, "Symbol Technologies and AvantGo Announce Relationship to Provide Barcode Scanning Web Client on Symbol's New Palm Terminals," 2 pages, Feb. 1, 1999, AvantGo, Inc.

(56) References Cited

OTHER PUBLICATIONS

Press Release, "AvantGo Announces Support for the Latest Version of Windows CE for the Palm-Size PC: Leader in Managing Mobile Information Allows its Growing Number of Users to Take Advantage of More Windows CE Functionality, Including Color," 2 pages, Feb. 1, 1999, AvantGo, Inc.

Press Release, "InfoSpace.com and AvantGo Deliver New Optimized Channels of Web Content to Handheld Devices: Companies introduce a comprehensive offering of Web content for handhelds," 2 pages, Jan. 28, 1999, AvantGo, Inc.

Press Release, "CNNfn and AvantGo Team Up to Help Users Keep Track of Breaking Business News on their Handheld Devices," 2 pages, Jan. 26, 1999, AvantGo, Inc.

Press Release, "CommerceNet Awards Ecommerce Innovation: AvantGo, Brokat, DealTime, eBay, and General Magic Receive Awards," Dec. 16, 1998, AvantGo, Inc.

Press Release, "AvantGo and Puma Technology Join Forces on Open Industry Initiative for Mobile Device/Corporate Enterprise Application Connectivity: Mobile Application Link Initiative Lauded as Key to Market Growth," 3 pages, Dec. 2, 1998, AvantGo, Inc.

Press Release, "The Sporting News to Deliver News, Scores to Handheld Devices: The Sporting News Teams with AvantGo to Offer In-Depth News, Analysis and Scores to Portable Platforms," 2 pages, Nov. 20, 1998, AvantGo, Inc.

Press Release, "Knight Ridder Real Cities and AvantGo Team up to Provide City Sites, News and Information on Handheld Computers: Visitors to Sites Have a Chance to Win Free Palm III Organizers in Introductory Contest," 2 pages, Nov. 18, 1998, AvantGo, Inc.

Press Release, "AvantGo and Oracle Team up to Deliver Mobile Applications to Handheld Devices: Combination of AvantGo and Oracle Lite Enables Unique Mobile Device Access to Oracle8i," 2 pages, Nov. 9, 1998, AvantGo, Inc.

Press Release, "Ziff-Davis and AvantGo Bring Award Winning Content From ZDNet.com to Handheld Devices," 2 pages, Oct. 26, 1998, AvantGo, Inc.

Press Release, "USA Today Online Partners with AvantGo to Deliver News, Sports & Money Briefs, Travel Tips and Dow Jones Charts to Users of Handheld Devices," 2 pages, Oct. 20, 1998, AvantGo, Inc.

Press Release, "IndustryWeek and AvantGo Team Up to Deliver Management Best Practices News and Information to Users of Handheld Devices," 2 pages, Oct. 6, 1998, AvantGo, Inc.

Press Release, "The Industry Standard and AvantGo Team Up to Deliver News to Portable Devices: New Business Publication Takes Advantage of Publishing Trend Toward New Delivery Formats," 2 pages, Aug. 24, 1998, AvantGo, Inc.

Press Release, "AT&T Executive Joins AvantGo Board of Directors: Robert J. Lesko Brings Global Services Expertise to Hot Start-Up," Aug. 10, 1998, AvantGo, Inc.

Press Release, "AvantGo Announces Agreement to Deliver News From The Wall Street Journal Interactive Edition to Handheld Computers," 2 pages, Aug. 3, 1998, AvantGo, Inc.

Press Release, "Get Your Five-Day Weather Forecast-On A Handheld: Weather24 and AvantGo Deliver "Weather to Go" Content for Mobile Computer Users," 2 pages, Jun. 29, 1998, AvantGo, Inc.

Press Release, "News America Digital Publishing Teams with AvantGo to Provide News, Sports, Business and Entertainment Information to Mobile Users," 2 pages, Jun. 22, 1998, AvantGo, Inc.

Press Release, "AvantGo Secures $3.5 Million in Venture Capital: Hambrecht & Quist, Adobe Ventures and 21st Century Internet Venture Partners Invest; Chris Hollenbeck Joins AvantGo Board of Directors," 2 pages, Jun. 8, 1998, AvantGo, Inc.

Press Release, "AvantGo Signs Stuart Read As Vice President of Marketing: Past Founder of. Diba Joins Fast Growing Mobile Computing Company," May 26, 1998, AvantGo, Inc.

Press Release, "AvantGo Teams with Leading Publishers to Serve Up News for Mobile Users: Wired Digital, The New York Times, Mercury Center, InfoWorld and CNET Deliver Content for HandHelds," 3 pages, May 18, 1998, AvantGo, Inc.

Press Release, "AvantGo Wins DBMS Magazine Editor's Choice Award: Hot Mobile Computing Software Start-Up Recoginzed for Creativity and Innovation," Apr. 20, 1998, AvantGo, Inc.

Press Release, "AvantGo Licenses Java Technology to Palm Computing for the Conduit Development Kit, Java Edition: Technology Extends Enterprise Java Applications to the 3Com Palm Pilot Connected Organizer," 2 pages, Mar. 23, 1998, AvantGo, Inc.

"Shop for Everything: Store Your Online Bookmarks or Favorites on the Web," http://www.shop-for-everything.com/freestuff/bookmarks-favorites.html, last visited Jul. 13, 2000, 1 page.

Lei, H. et al., "DataX: An Approach to Ubiquitous Database Access," 2nd IEEE Workshop on Mobile Computing Systems and Applications (WMCSA), 1999 Proceedings, New Orleans, LA, Feb. 25-26, 1999, IEEE Comput. Soc., Los Alamitos, CA, pp. 70-79.

Kalakota, R., "Information Supply-Chains and Webcasting: A Design Framework," Fourth International Workshop on Community Networking, Proceedings, 1997, Atlanta, GA, Sep. 11-12, 1997, IEEE, NY, NY, pp. 103-111.

Joshi A. et al., "On Disconnected Browsing of Distributed Information," Seventh International Workshop on Research Issues in Data Engineering, 1997 Proceedings, Birmingham, UK, Apr. 7-8, 1997, IEEE Comput. Soc., Los Alamitos, CA, pp. 101-107.

Invitation to Pay Additional Fees, From PCT/US00/11438, Mailed Jun. 5, 2003, 6 pages.

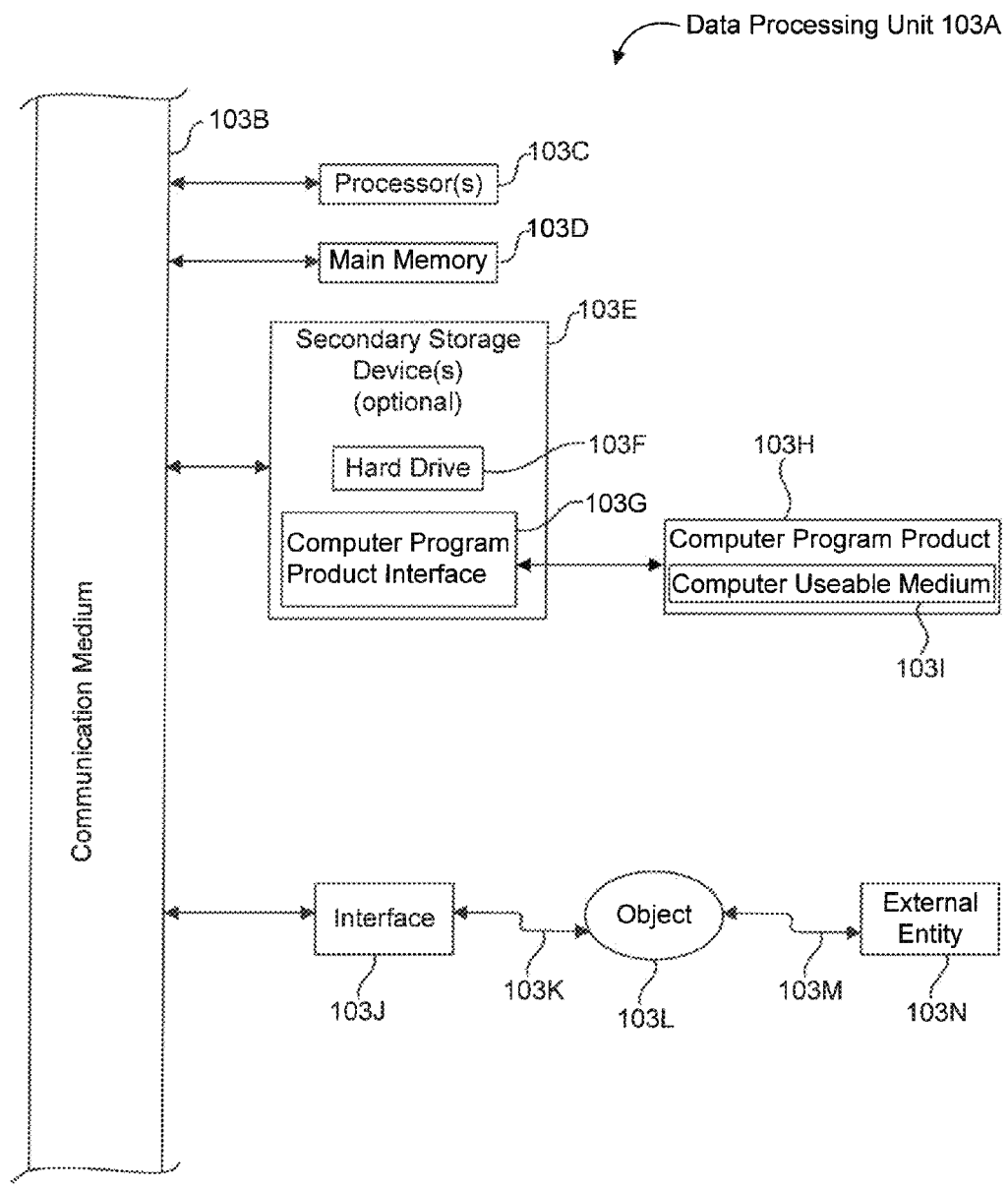
FIG. 1B1

Core Technology: Placing Internet/Intranet
Content on Mobile Devices

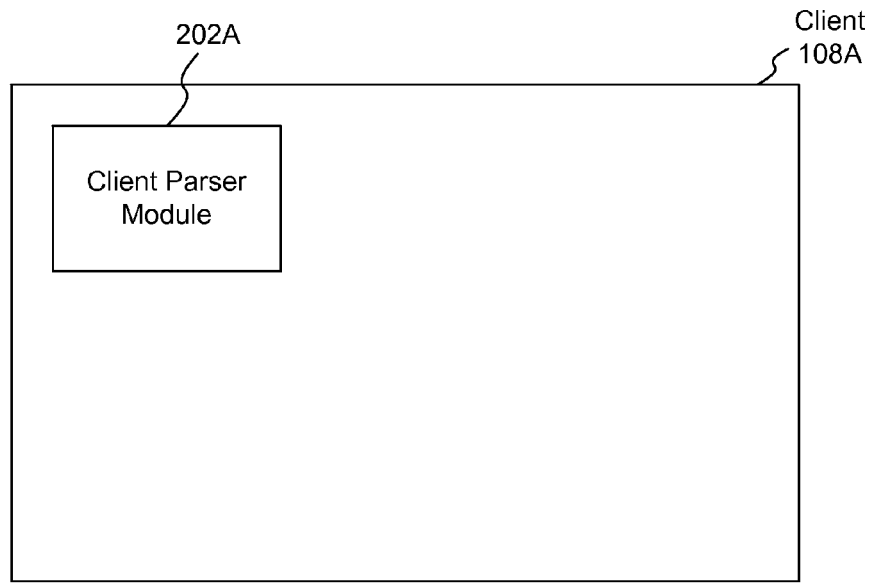
FIG. 2B1
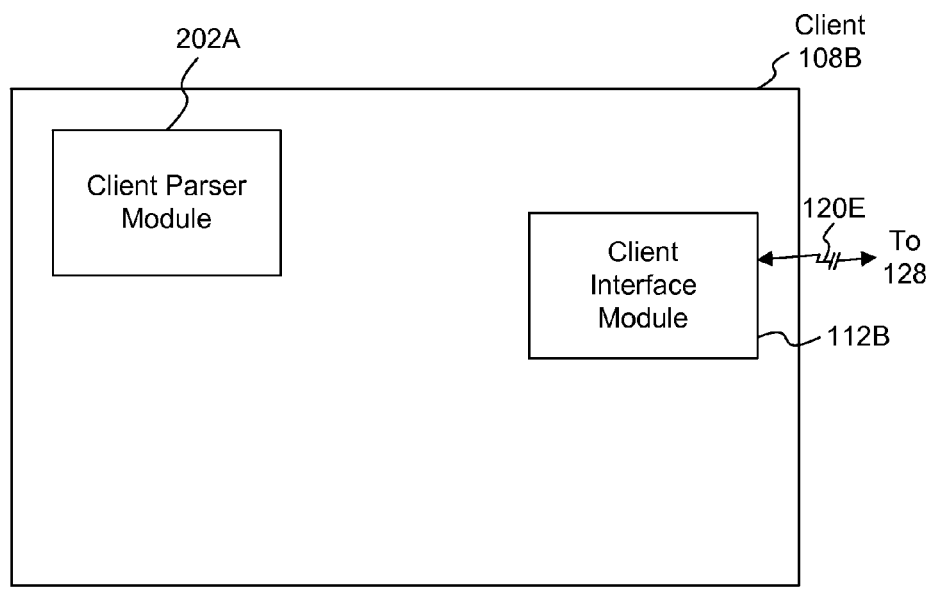
FIG. 2B2

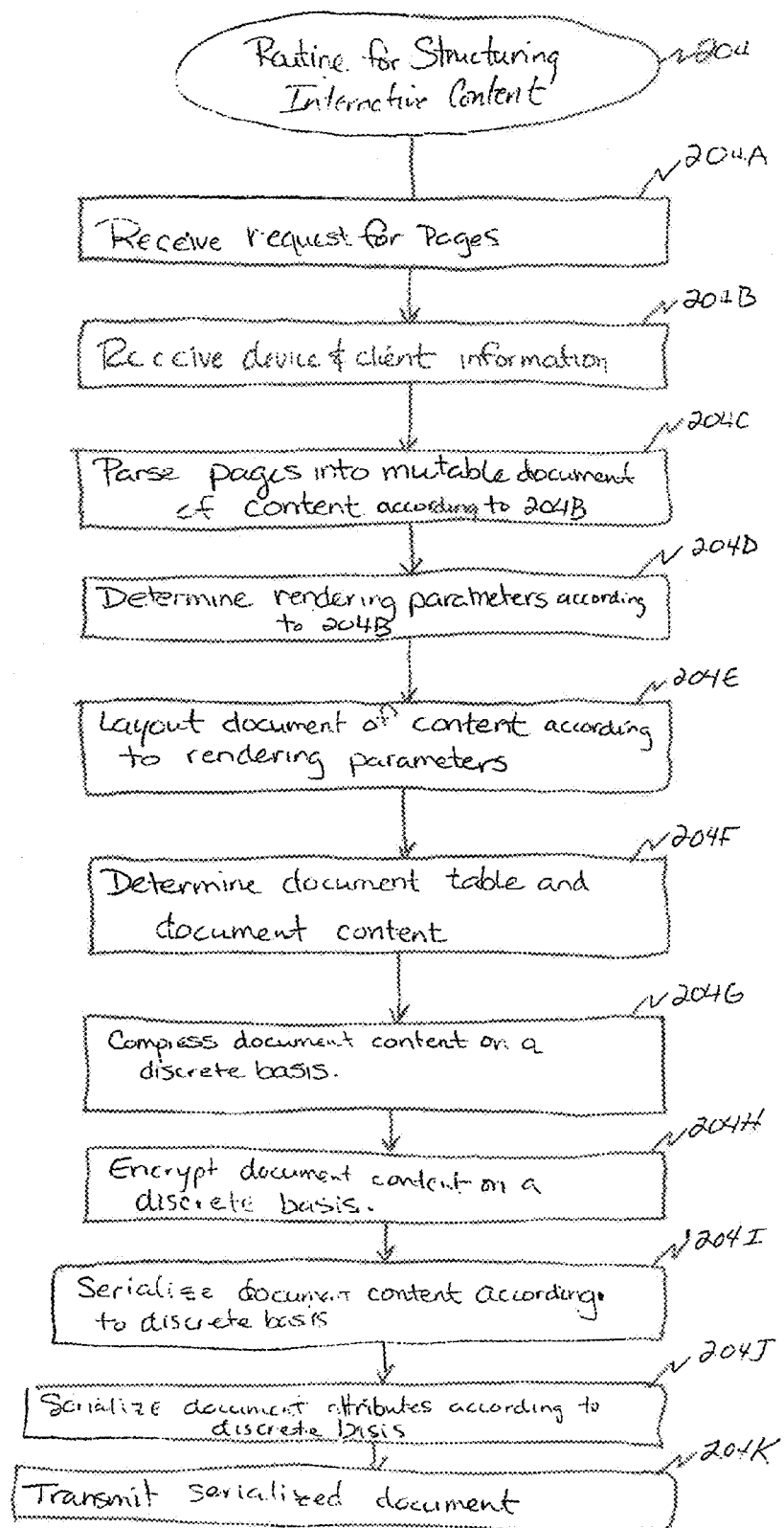
FIG. 2D1

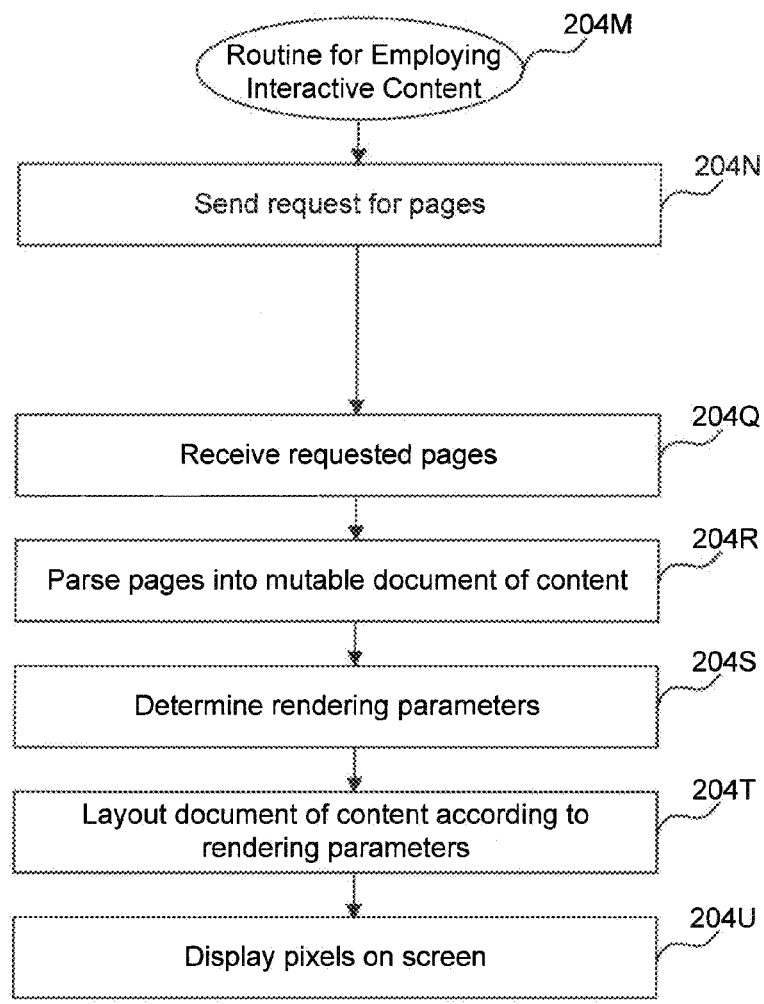
FIG. 2D2

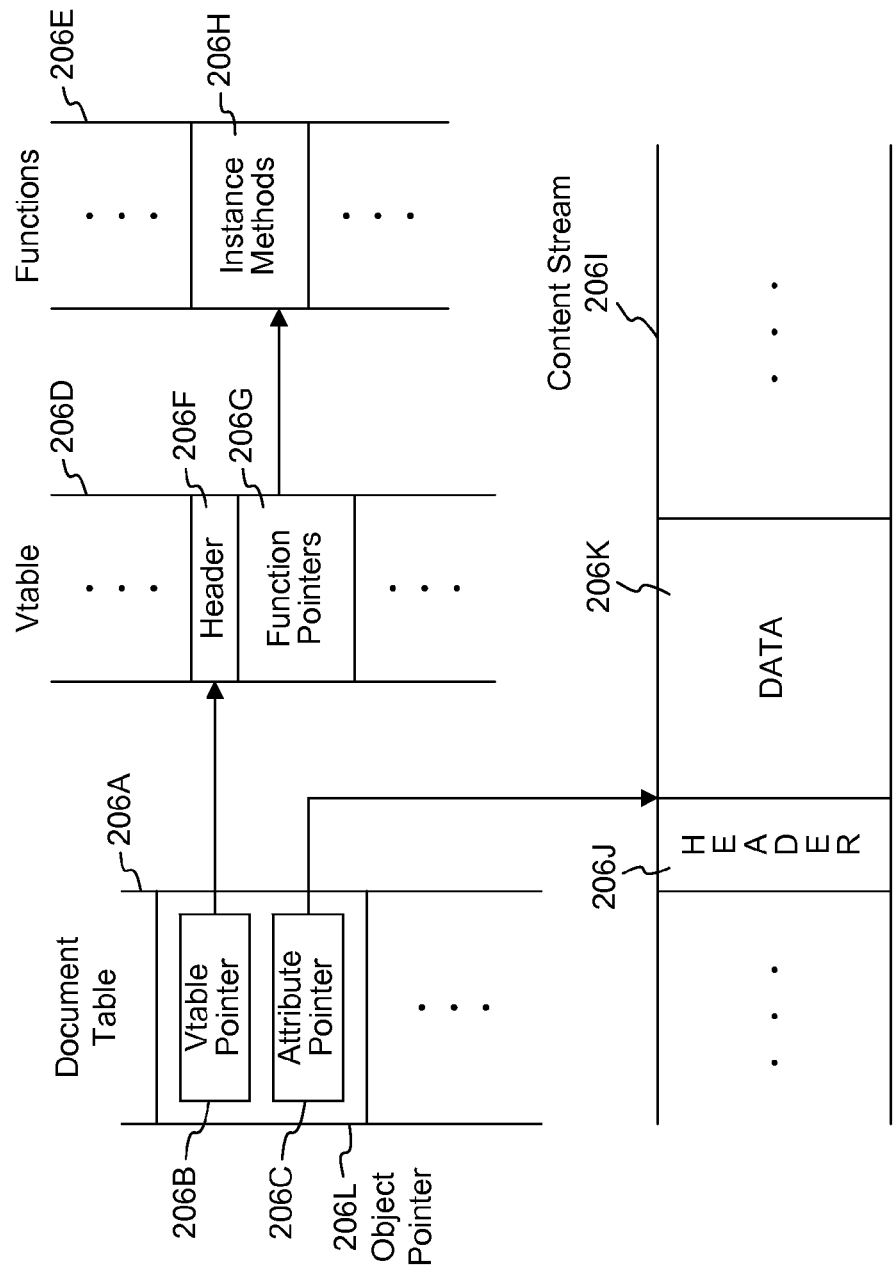
FIG. 2F1

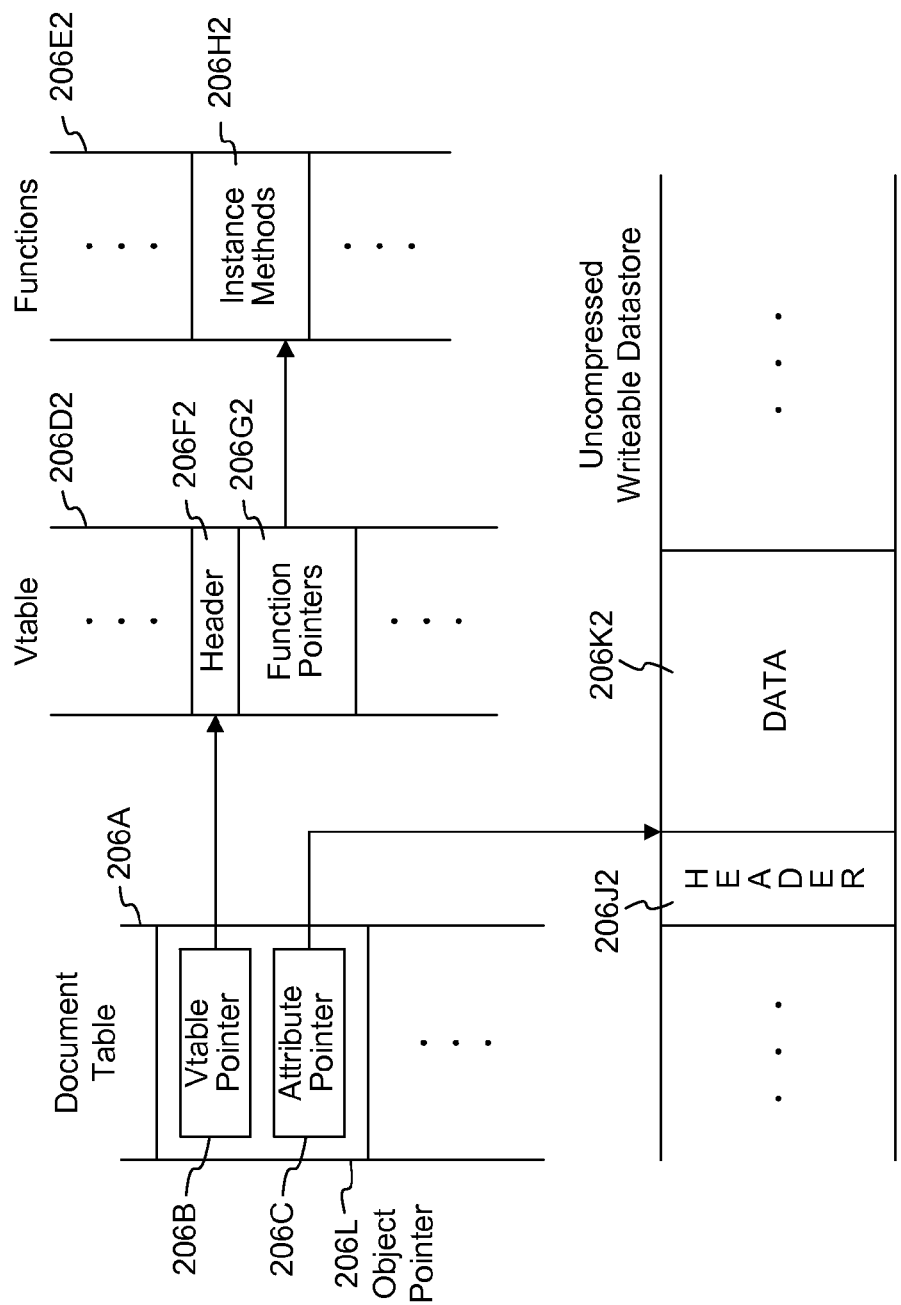
FIG. 2F2

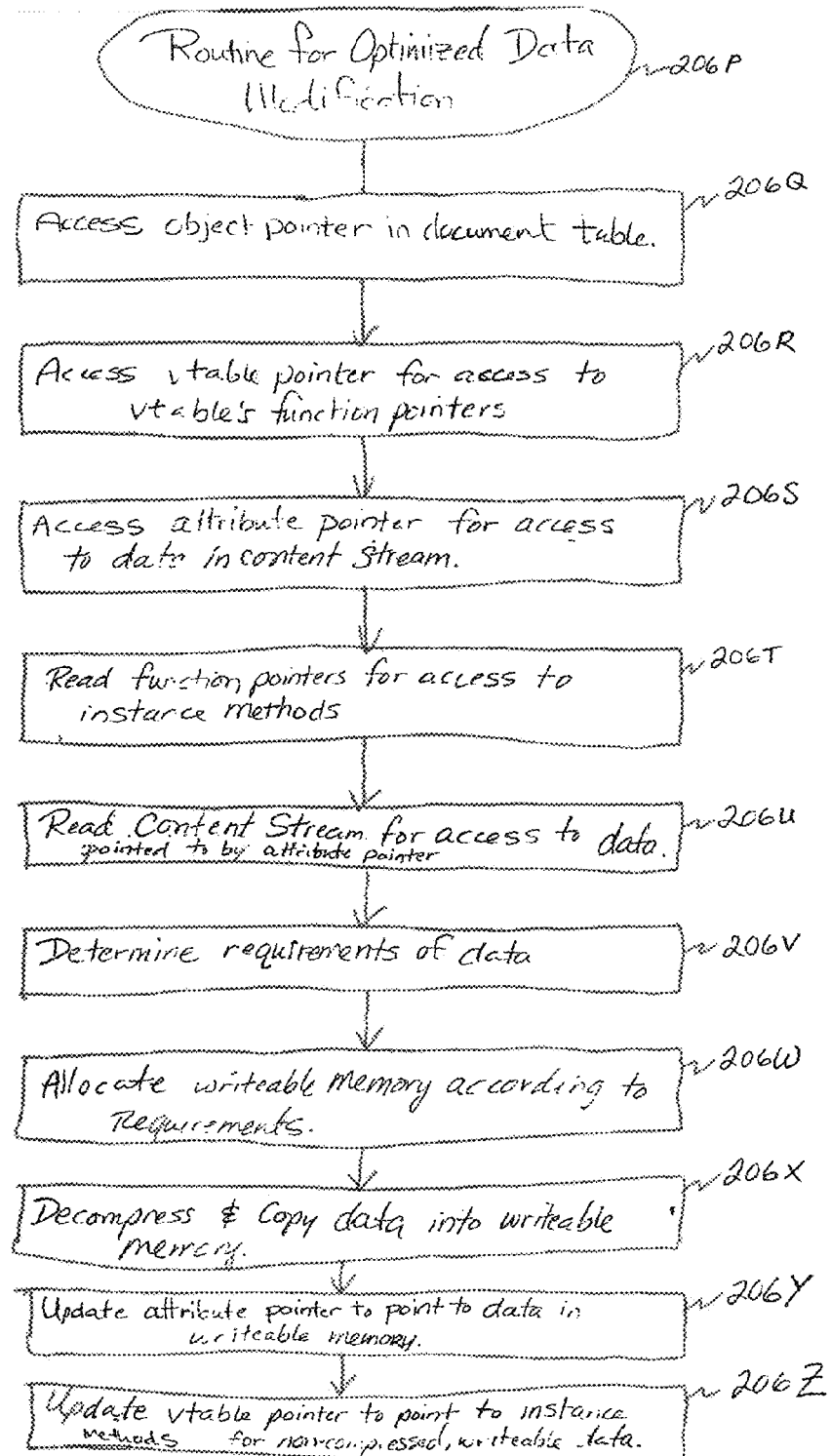
FIG. 2F3

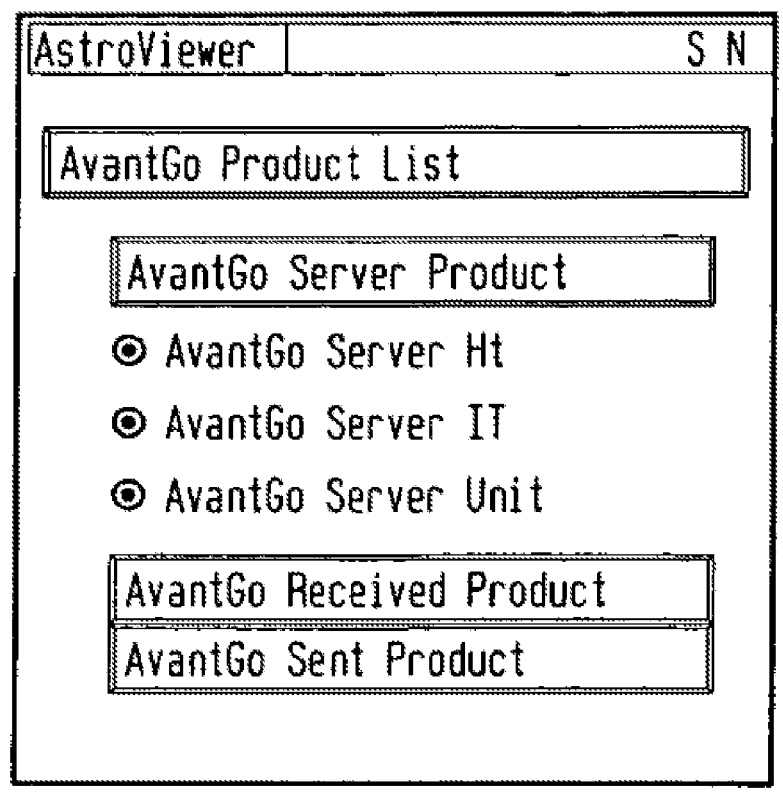
FIG. 2I1

# SYSTEM, METHOD, AND COMPUTER PROGRAM PRODUCT FOR SERVER SIDE PROCESSING IN A MOBILE DEVICE ENVIRONMENT

This application is a continuation of U.S. Non-Provisional application Ser. No. 09/705,914, filed Nov. 6, 2000, now allowed, which is a continuation-in-part application of U.S. Non-Provisional application Ser. No. 09/559,964, filed Apr. 28, 2000, now U.S. Pat. No. 6,779,042, issued Aug. 17, 2004, which is a continuation-in-part application of U.S. Non-Provisional application Ser. No. 09/393,390, filed Sep. 10, 1999, and claims the benefit of U.S. Provisional Application No. 60/173,807, filed Dec. 30, 1999, now expired, and U.S. Provisional Application No. 60/189,969, filed Mar. 17, 2000, now expired, all of which are incorporated by reference herein in their entireties.

BACKGROUND OF THE INVENTION

1. Field of the Invention

The present invention relates generally to mobile communications, and more particularly relates to technology for using interactive applications while on-line and off-line on mobile devices.

2. Related Art

A variety of mobile devices (such as personal data assistants, or PDAs) exist. Such mobile devices include ones based on the Palm operating environment and the Windows CE operating environment.

A variety of software applications for those mobile devices also exist.

What does not exist prior to the invention are software applications for enabling web content (as well as other objects) to be loaded on mobile devices, and for users of mobile devices to operate with such web content on their mobile devices in an interactive manner while in an off-line mode.

SUMMARY OF THE INVENTION

Briefly stated, the invention includes systems, methods, computer program products, and combinations and subcombinations thereof for enabling web content (as well as other objects) to be loaded on mobile devices (as well as other types of devices), and for users of mobile devices to operate with such web content on their mobile devices in an interactive manner while in an off-line mode.

These and additional features and advantages of the present invention will become more apparent from the detailed description set forth below when taken in conjunction with the drawings in which like reference characters generally identify corresponding elements throughout.

BRIEF DESCRIPTION OF THE FIGURES

The accompanying drawings, which are incorporated herein and form part of the specification, illustrate embodiments of the present invention and, together with the description, further serve to explain the principles of embodiments of the invention.

FIG. 1B1 is a block diagram of an example data processing unit useful in some embodiments for implementing items from FIGS. 1A and 1B;

FIG. 2B1 is a block diagram illustrating an additional module according to an embodiment of the invention;

FIG. 2B2 is a block diagram illustrating an additional module according to an embodiment of the invention;

FIG. 2D1 is an example flowchart relating to structuring interactive content according to an embodiment of the invention;

FIG. 2D2 is an example flowchart relating to structuring and rendering interactive content according to another embodiment of the invention;

FIG. 2F1 is a diagram illustrating the content instantiation architecture according to an embodiment of the invention;

FIG. 2F2 is a diagram illustrating the content instantiation architecture according to another embodiment of the invention;

FIG. 2F3 is a flowchart relating to a optimized data modification according to an embodiment of the invention;

FIGS. 2I1 and 2I2 demonstrate some CSS style according to embodiments of the invention;

It should be understood that these figures depict embodiments of the invention. Variations of these embodiments will be apparent to persons skilled in the relevant art(s) based on the teachings contained herein. For example, the flow charts contained in these figures depict particular operational flows. However, the functions and steps contained in these flow charts can be performed in other sequences, as will be apparent to persons skilled in the relevant art(s) based on the teachings contained herein.

DETAILED DESCRIPTION OF THE PREFERRED EMBODIMENTS

1. Overview of Embodiments of the Present Invention

Embodiments of the present invention are briefly described in this section.

Briefly stated, the invention is directed to placing objects such as, but not limited to, Internet or Web content on data processing devices, such as but not limited to mobile devices. Table 1 lists examples of such Internet content, although the invention is not limited to these examples.

TABLE 1

Internet Content
Internet content includes but is not limited to:

HTML
JavaScript ™
Channels
Java ™
ActiveX
Multimedia:
Images (e.g., JPEG, GIF, PNG, vector graphics, etc.)
Audio Files (e.g. MP3)
Video (e.g. AVI)
Streaming Content: Voice/Data/Video
Binary files
XML
Applications
Data Objects
Documents
Anything that can be delivered via a "browser"

Table 2 lists examples of mobile devices, although the invention is not limited to these examples.

TABLE 2

Mobile Devices
Mobile devices include but are not limited to:

Handheld Computers
Cellular Phones
Internet-enabled Phones
Pagers
Radios
TVs
Audio Devices
Car Audio Systems
Recorders
Text-to-Speech Devices
Bar-code Scanners
Net Appliances
Mini-browsers
Personal Data Assistants (PDAs)

Figure 1A:
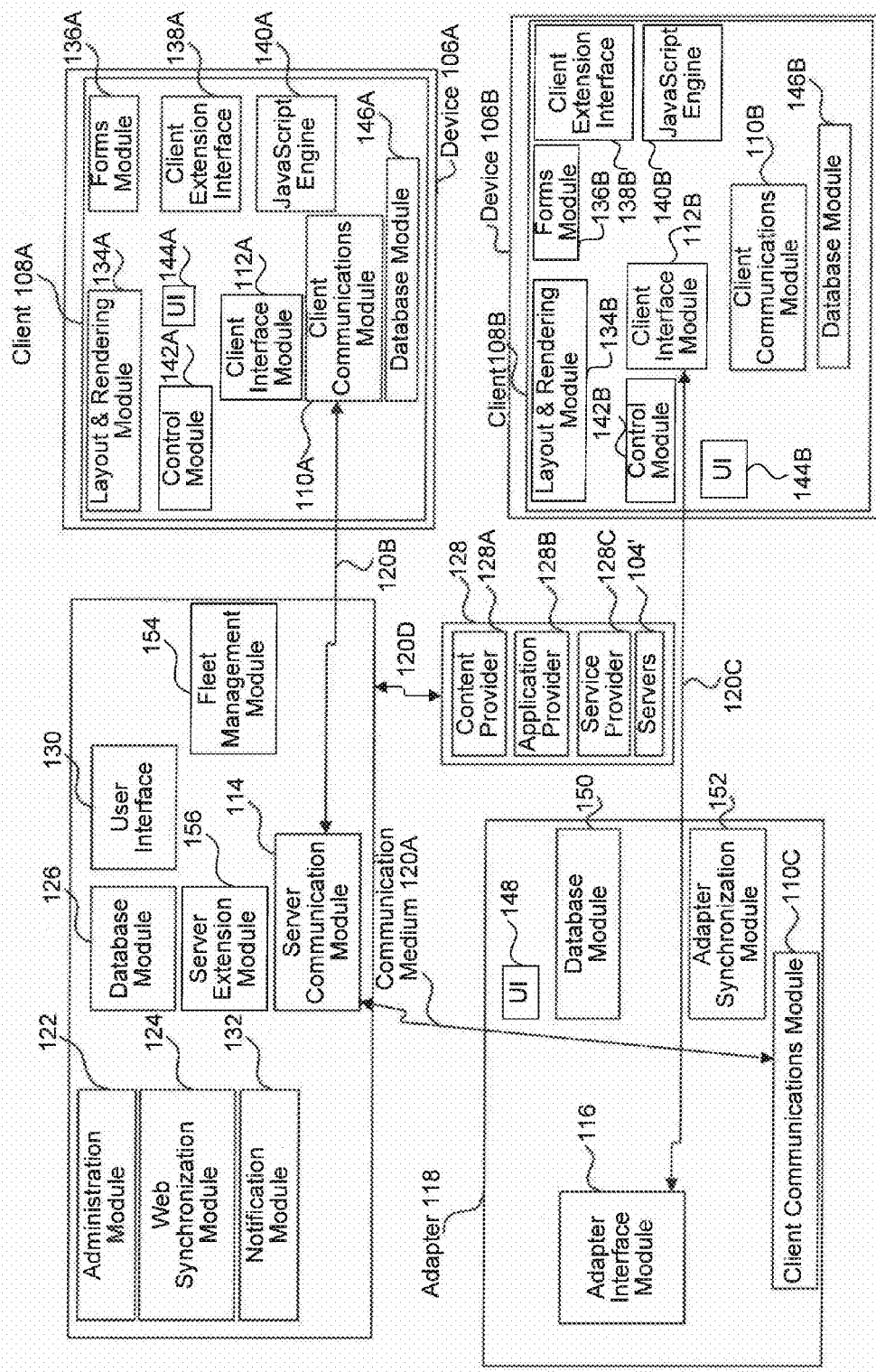
FIG. 1A is a block diagram of an embodiment of the invention.
Figure 1B:
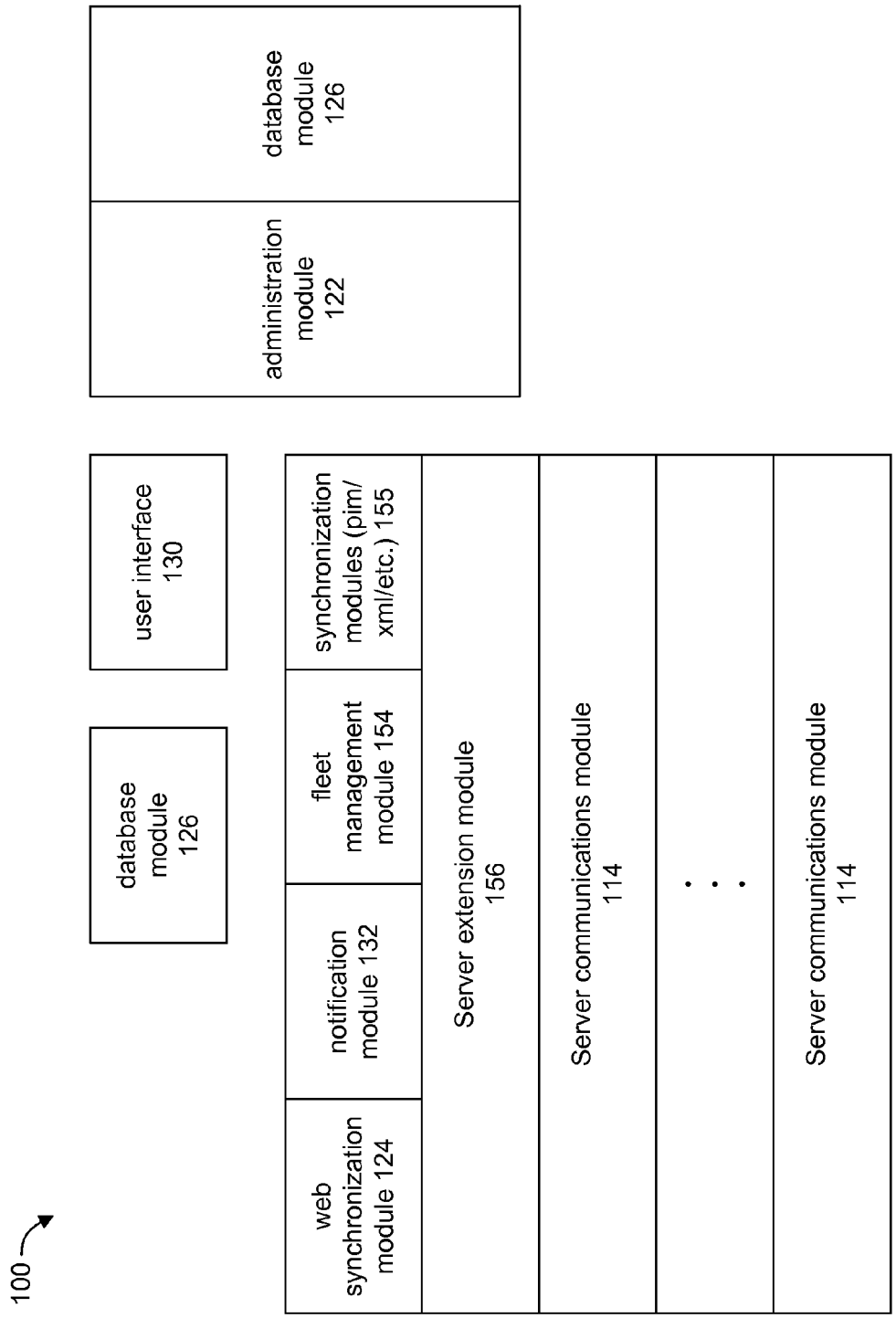
FIG. 1B is an alternative block diagram of the invention.
Figure 1C:
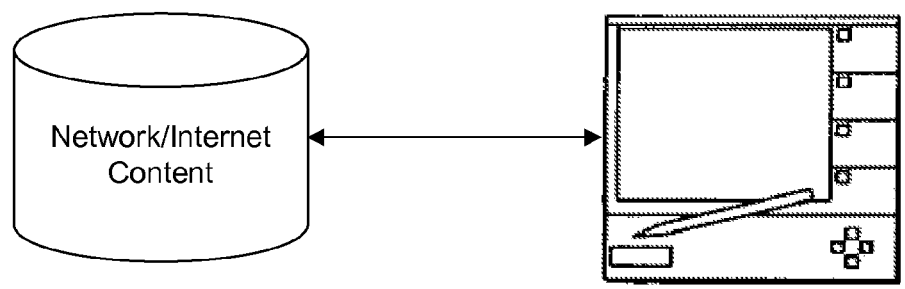
FIGS. 1C, 1D, 1E, 1F, 1G, 1H, 1I, and 1J are used to generally describe embodiments of the invention.

FIG. 1C illustrates the concept of the invention of placing objects on data processing devices, such as mobile devices.

1.1. Enabling Mobile Devices to Interact with Networked Applications

The invention includes technology for using applications on mobile devices that interact with the Internet or with intranets. The invention enables applications available via a network or via an Internet/intranet to download and to run on mobile devices. Consequently, the invention includes software and methods for administering a server that manages the variables relevant to a mobile device/server environment.

The invention enables:

Mobile devices to operate in conjunction with a Web server, even when the mobile devices are not coupled directly to the PC using portable on-device servers: Web pages are loaded, viewed, cached, and deleted even when the device is not coupled to any network.

Mobile devices to operate in conjunction with the Web, Internet, or intranet via a connection mechanism and then in disconnected mode or with the Web, Internet, or intranet in wireless mode with a continuous or a discontinuous connection mechanism.

A technique for interactive connectivity between handheld computers and computer networks.

Fleet management for centrally administering information in a handheld network environment that includes, but is not limited to, user data, user groups, group channels, channel data, personal channels, commercial channels, user accounts, corporate account, software groupings, personal information management, form delivery, form management, device configuration, device databases, device contents, and devices parameters.

Obtaining updated Web pages and other network objects, for use when the mobile device is not communicating with the PC.

Figure 1D:
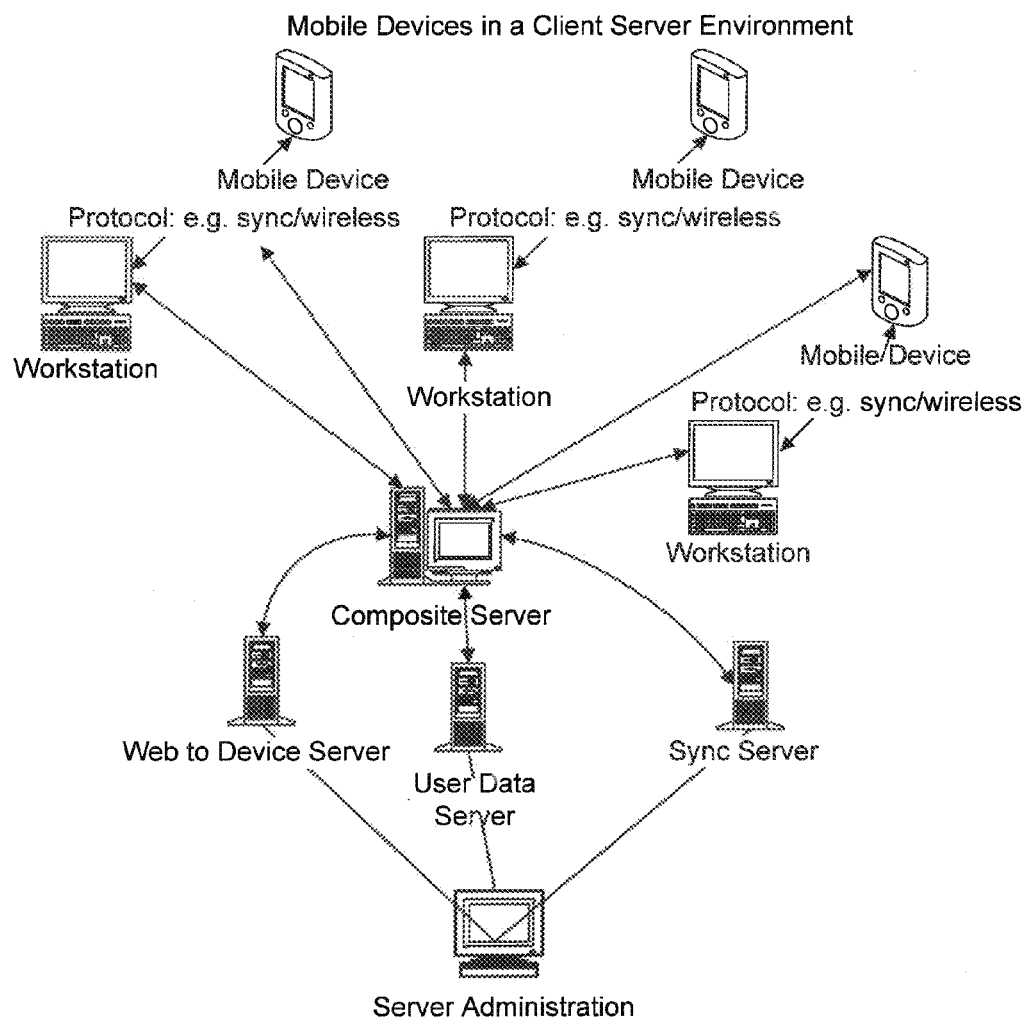

An example mobile device/server environment is shown in FIG. 1D.

1.2. Rapid Transfer of Web Pages to Mobile Devices

Figure 1E:
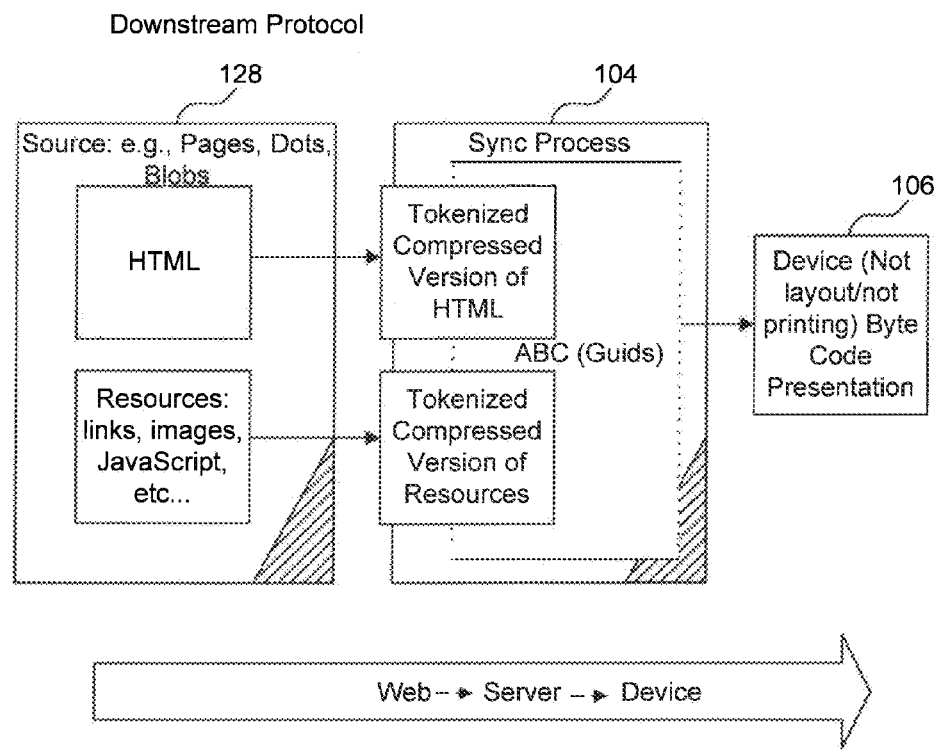

To improve efficiency of data exchange between mobile devices and networked content, the invention includes an improved communication protocol that collects requests and responses for network objects into a smaller number of protocol (such as HTTP) requests and responses. The server also determines the nature and the resources of the mobile device. This protocol is represented, for example, in FIG. 1E.

Downstream, the data is encoded in a data format called content stream (tokenized version of the data) and sent to the device. The content stream format creates a tokenized codification of HTML pages that is sent to the device. (The device receives the content stream and presents the material on the device.)

The HTML page is encoded into the content stream and sent to the device. The encoding is a mapping of parent and child HTML elements and/or resources to alphanumeric values.

The sync operation of the invention includes various synchronization processes that can collect information from the Internet to a server, and to the client. In embodiments, the usage of the term "sync" refers to the overall operation of connecting a client to a server for the exchange, interaction, creation, and removal of data.

In one embodiment, syncing can be defined as mirroring data on a client and a server, such that the data is the same on client and server. In other embodiments, syncing can be defined as overwriting data on a client or on a server, such that the data on either a client replaces the data on a server, and vice versa.

In one embodiment, a sync operation involves a user placing a mobile device into an adapter that includes a sync button. The adapter is connected to a server. Upon pressing the sync button, the user initiates the sync operations of the present invention, which include various synchronization processes (specific delivery modes). Thus, the term sync is meant to refer to the overall operation of linking a client to a server. Synchronization is meant to refer to the specific process of copying, adding, filtering, removing, updating and merging the information between a client and a server. Any number of synchronization processes can be executed during a sync.

Figure 1F:
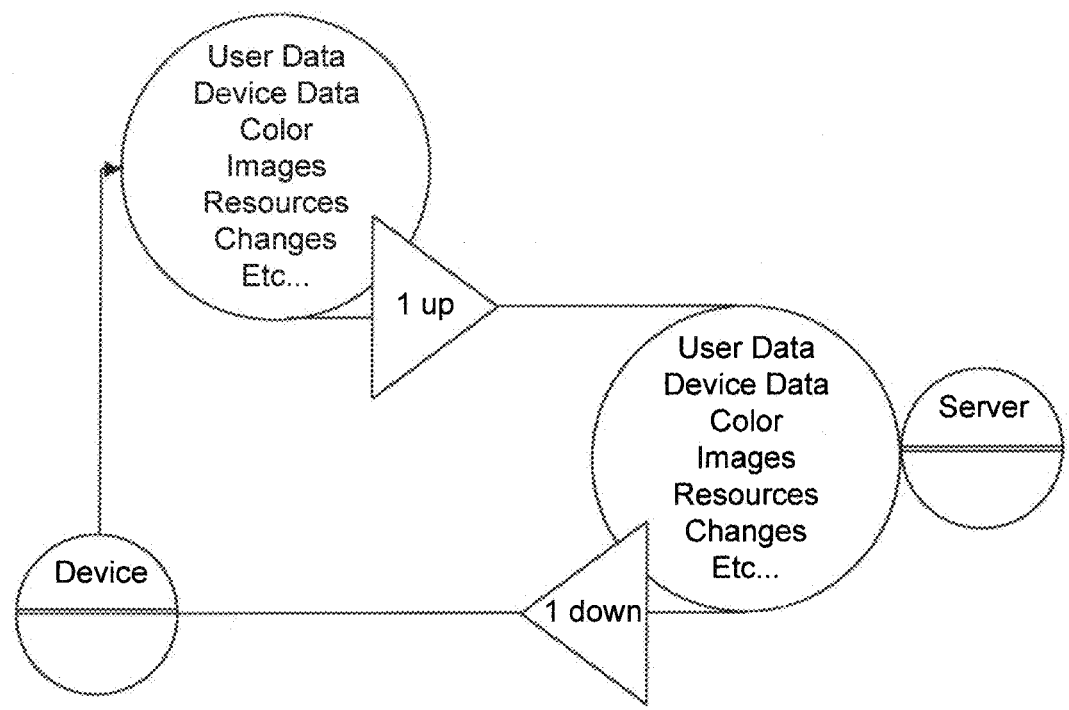
Figure 1G:
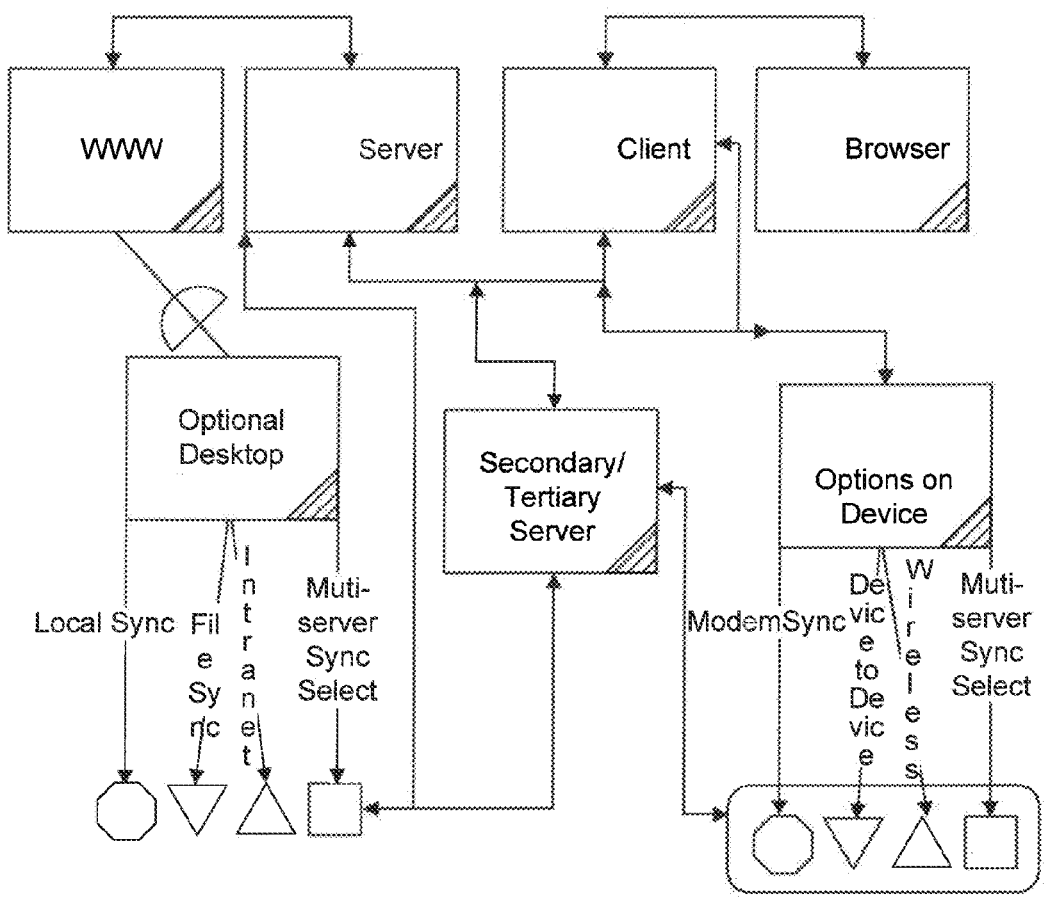
Figure 1H:
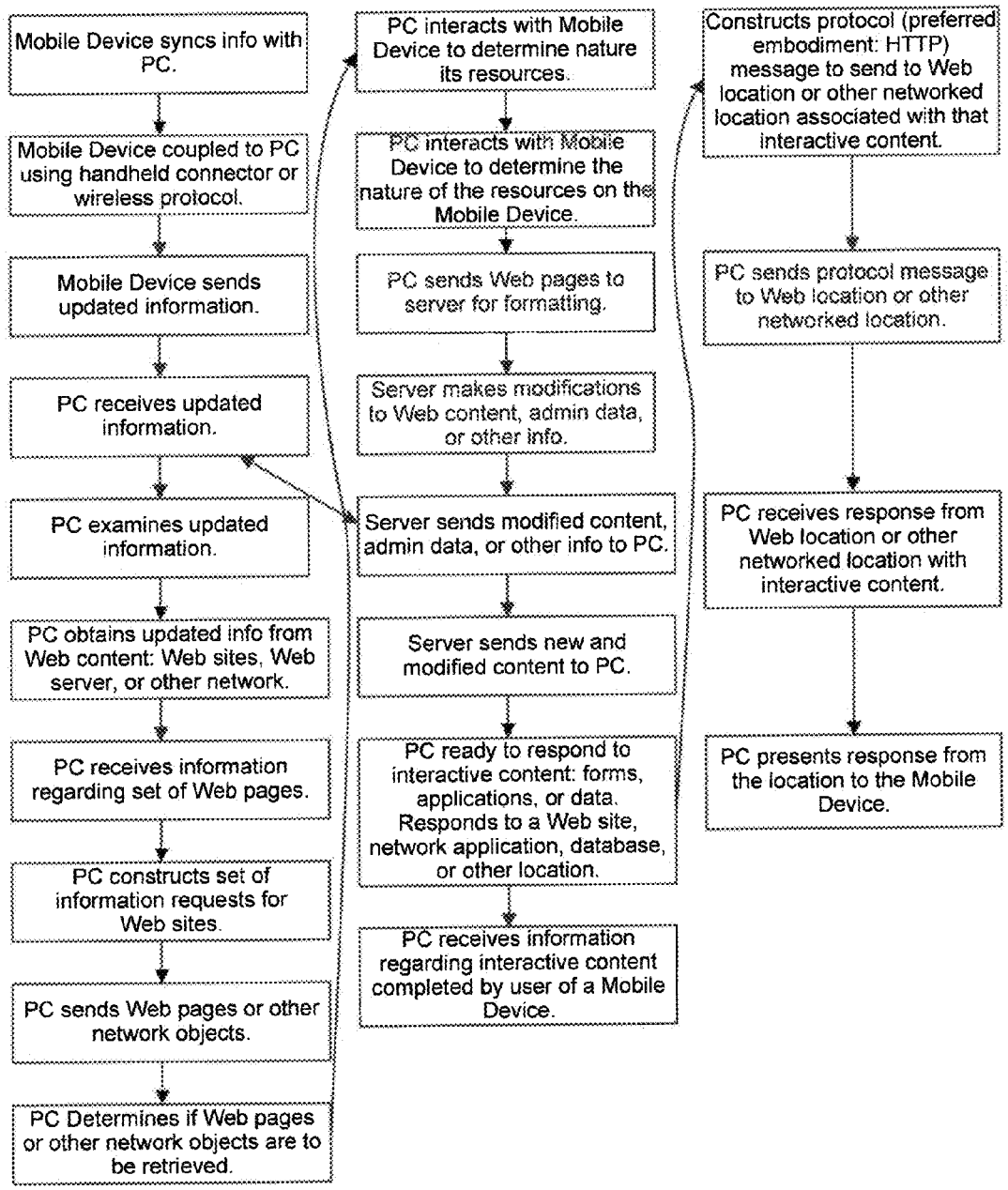

Before being sent downstream the data is compared to the data that is known to be on the client and then the client is updated all at once in a one-up/one-down synchronization method, which is represented in FIG. 1F. The server sets the client to preemptively prepare all device information necessary during the sync. Then the server receives the set of information in a one-up fashion. The server collates the information and sends the information in a one-down fashion. This optimizes the sync's efficiency and speed. The sync process, according to embodiments of the invention, is represented in FIGS. 1G and 1H.

1.3. Optimizing Content of Web Pages for Mobile Devices

When Web content and other network objects pass through the server they are processed to minimize their size and to optimize their delivery to mobile devices: for presentation, for ease of use, for efficiency, for size, etc.

Figure 1I:
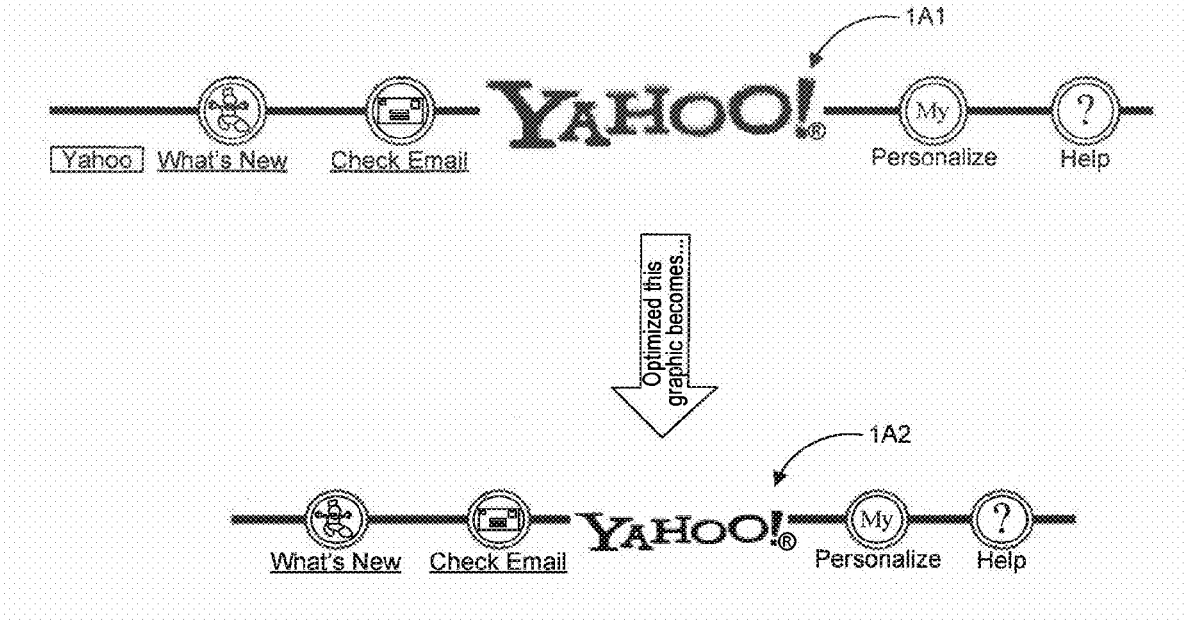

The invention uses server logic to optimize content. The server assesses the mobile device to optimize web content for the particular device. Factors that the server logic considers when performing this optimization include, but are not limited to (it is noted that the server may consider subsets of the following, depending on the application and implementation):

Dynamic memory specifications
High memory specifications
Protected Memory
Storage Memory
Database Memory
Available storage space
Screen size
User profile(s)
Color depth
Applications on device
Buttons on-device
Data markers (e.g., cookies, tokens)
Preferences
Fonts
Font specifications
Sync type
Synchronization types
Supported data types
Supported mime types
Connection/Network profile An example optimization process is shown in FIG. 1I.

On the server, the graphic is optimized per the state information of the device. If the device sends down the need for the graphic on a page for a device with a display that is 27 cm wide and in grayscale, the server sends its best version of a graphic optimized for that environment.

The technology of the invention is extended by tags on HTML pages that identify content that is designed for additional modifications. Any and all bytes processed by the server are potentially examined for compression/optimization. The server detects the tag and executes the necessary logic.

Table 3 illustrates example tags (the invention is not limited to the tags shown in Table 3).

TABLE 3

Sample Markup Language

| Tag | Effect |
| --- | --- |
| <META NAME="Handheld-Friendly" content="True"> | This tag enables several HTML features that are normally turned off. Most notably, The invention does not try to display TABLE tags or the HSPACE and VSPACE attributes of IMG tags unless the page is marked as "HandheldFriendly". Most TABLEs or H/VSPACEs are designed for much larger screens. |
| <AGIGNORE></AGIGNORE> | Used in a wireless channel. Use the AGIGNORE tag to surround content within an HTML page that may be inappropriate or unattractive on Internet-enabled phones. |
| <AGPAGEBREAK TITLE="your title"> | Used in a wireless channel. Breaks up pages on request. When processing pages for devices other than WAP phones, the server ignores the AGPAGEBREAK tag. |

Figure 1J:
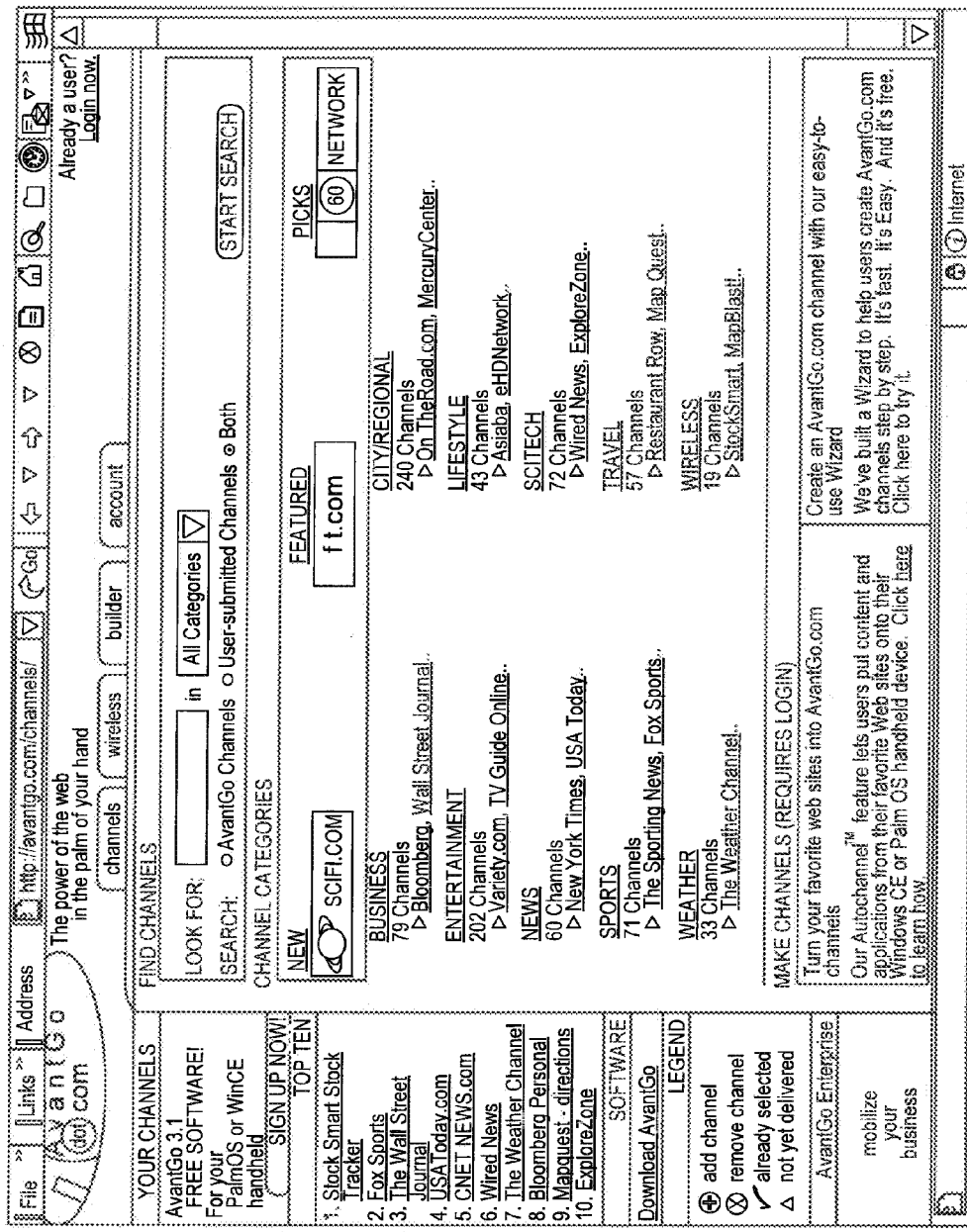

3. Web Content Aggregation, Web Channel Development, and Web Content Delivery for Users of the Internet and of Mobile Devices The invention is extended by the coupling of devices to the content available at the server web site (see the example shown in FIG. 1J).

These and other embodiments of the present invention are described in greater detail below.

Structural Embodiments of the Present Invention

FIG. 1A is a block diagram of a data processing environment 102 according to an embodiment of the invention. The data processing environment 102 includes a server 104 (although only one server 104 is shown, in practice the data processing environment 102 may include a plurality of servers), one or more devices 106, one or more adapters 118, and one or more providers 128.

Generally, the server 104 maintains a collection of channels. In an embodiment, a channel comprises a collection of objects. An object is any entity that can be transferred to a client 108, such as but not limited to content, applications, services, images, movies, music, links, etc.

A channel includes a number of properties. At least some of these properties define the objects that the channel includes. Such properties include, but are not limited to, the following (properties of channels may vary depending on the application and/or implementation):

A name of the channel.

A location of a root object (such as but not limited to a URL). In an embodiment, this root object is included in the channel. An indication of the number of levels below the root object, for which to include objects in the channel. For example, in an embodiment, if this property is equal to "1 level," then all objects that are 1 level down from the root object (reached by traversing links in the root object), are included in the channel. If this property is equal to "2 levels," then all objects that are 1 level down from the root object (reached by traversing links in the root object), and all objects that are 1 level down from those objects (reached by traversing links in those objects), are included in the channel. Embodiments of the invention allow "uneven" trees, where some branches of the tree extent to a greater number of levels than other branches of the tree. In other embodiments, the trees are even or balanced.

A maximum size of the channel. For example, if this is set to 500 Kbytes, then the aggregate size of the objects in the channel cannot be greater than 500 Kbytes. If the aggregate size of the objects in the channel is greater than this value, then embodiments of the invention may delete objects from the channel and/or delete portions of objects in the channel.

An indication of which resource objects are enabled for the channel:

An indication of whether or not images are to be included in or excluded from objects in the channel; and An indication of whether or not scripts are enabled in objects in the channel.

A refresh methodology.

It is noted that the properties associated with channels may vary from implementation to implementation. Also, implementations may employ combinations of the above properties, and/or properties in addition to the following, as will be appreciated by persons skilled in the relevant art(s).

The invention includes processes for managing channels, including but not limited to adding channels to the collection of channels maintained by the server 104.

The server 104 offers channels to clients 108. A user associated with or on behalf of a client 108 may access the server 104 and view the collection of channels. The client 108 (via the user, for example) may then select any combination of the channels in the collection. The server 104 maintains a list of the channels associated with each of the clients 108.

During a synchronization process, the server 104 loads a device 108 with the channels associated with the client 108. Generally, the server 104 does this by obtaining from providers 128 the objects defined by the channels, and causing those objects to be stored on the client 108. Thus, during the synchronization process, the server 104 will load the client 108 with the selected channels. More particularly, the server 104 will load the client 108 with the objects associated with the channels.

The client 108 may process and use those objects when not connected to the server 104. The invention enables the client 108 to actively interact with the objects and channels.

In one embodiment, the client 108A directly interacts with the server 104 via some transmission medium 120B, which may be any wired or wireless medium using any communication protocol.

In another embodiment, the client 108B indirectly interacts with the server 104 via an adapter 118. For example, the client 108B may be a mobile device (such as a Palm device) and the adapter 118 may be a cradle and a computer coupled to the cradle (the mobile device is inserted into the cradle). In this instance, the adapter 118 presents itself to the server 104 as a client 108B (via client communications module 110C). When the server 104 sends objects to the adapter 118, the adapter interface module 116 writes those objects to client 108B. In embodiments, adapter interface module 116 can be a Hot Sync™ Manager, an Active Sync™, etc. It is noted that the invention is not limited to any of the implementation examples discussed herein.

The components shown in FIG. 1A shall now be described in greater detail.

The server 104 includes an administration module 122, a database module 126, a user interface 130, a web synchronization module 124, a server extension module 156, a fleet management module 154, a notification module 132, and a server communication module 114. Other embodiments of server 104 may include a subset of these modules, and/or may include additional modules.

The administration module 122 controls and manages the states of the server 104 and the clients 108. For example, the administration module 122 manages and controls groups of clients 108, permissions assigned to clients 108, groups, and channels. For example, the administration module 122 administers the users/clients 108 assigned to groups, and the channels associated with users. These and additional functions performed by the administration module 122 are described herein.

The database module 126 controls access to databases associated with the server 104. The database module 126 maintains information relevant to the clients 108, as well as information relevant to the modules contained in the server 104. The database module 126 manages information on the collection of channels maintained by server 104. These and additional functions performed by the database module 126 are described herein.

The user interface 130 is, in an embodiment, a graphical user interface (GUI) that enables users and clients 108 to access functions and modules offered by the server 104. More generally, the user interface 130 within server 104 provides access to server 104 and the modules and resources contained therein.

The invention supports various server web sites that are available through any communication medium, such as but not limited to the Internet, intranets, direct dial up links, etc. The UI 130 enables such web sites.

These and additional functions performed by the user interface 130 are described herein.

The web synchronization module 124 is an application/instance of server extension module 156, and controls synchronization of web content to client 108. The invention may include other synchronization modules (which are application/instances of server extension module 156) that control synchronization of other types of objects to clients 108. For example, the server 104 may administer a calendar that may be installed on clients 108. The synchronization of appointments, events and/or dates on this calendar between clients 108 and the server 104 may be performed by a calendar synchronization module. These and additional functions performed by the server extension module 156 are described herein.

The fleet management module 154 performs functions associated with fleets of clients 108, which are groups of clients 108. For example, fleet management module 154 may perform global or mass operations on groups (fleets) of clients 108, such as loading or updating an application on groups (fleets) of clients 108. Another example of a mass operation is retrieval of information on clients 108 in a fleet, such as the free memory in clients 108 in a fleet (this would help an organization determine if its clients 108 need a memory upgrade). These and additional functions performed by the fleet management module 154 are described herein.

The server extension interface/module 156 enables modules, such as third party modules, to operate in or work with the server 104 (and modules contained in the server 104). The server extension module 156 presents an API (application programming interface). Modules in the server 104 may operate with other devices in the server 104 by conforming to the server API.

For example, the web synchronization module 124 and the fleet management module 154 (as well as other types of synchronization modules, not shown in FIG. 1A) may interact with databases on the server 104 via the database module 126 by going through the server extension module 156. The web synchronization module 124 and the fleet management module 154 may not be able to interact directly with the database module 126 for a number of reasons. For example, they may support different data formats, or simply "speak different languages." However, they can interact via the server extension module 156 as well as other server modules as long as they conform to the API of the server extension module 156. This is true of any modules in the server 104, or that interact with the server 104.

Server communication module 114 enables communication between the server 104 and entities external to the server 104, such as clients 108, adapters 118, providers 128, work stations, etc. The server 104 communicates with these entities via communication mediums 120, which may be any type of wireless or wired communication using any protocol. It is noted that multiple server communication modules 114 may execute in a single server 104. For example, in one embodiment, server communication module 114 is a TCP/IP stack. In another embodiment, server communication module 114 is a secure socket layer stack or a compression stack. The invention is not limited to any implementation examples discussed herein. These and additional functions performed by the server communication module 114 are described herein.

The notification module 132 sends objects to clients 108 beyond objects related to channels associated with clients 108. Such objects could be requested by client 108 in advance. For example, a client 108 could ask for a notification when an event happens, such as when a stock reaches a target price. When the event occurs, the notification module 132 would cause an appropriate notification(s)/object(s) to be sent to the client 108. Alternatively, the notification module 132 may send objects to clients 108 without any prior explicit request from the client 108. For example, the notification module 132 might send channels to clients 108 when such channels are identified to be similar to those already selected by the clients 108. Also, the notification module 132 might send appropriate notifications/objects to the clients 108 when such clients 108 receive email or faxes at the server 104. In embodiments, the notification module 132 transmits such objects to the client 108 immediately when the event occurs, during the next synchronization with the client 108, or at some other future synchronization.

An alternative representation of server 104 is shown in FIG. 1B. FIG. 1B illustrates, for example, that messages from entities outside of server 104 are received by server extension interface/module 156 via server communications modules 114. Generally, such messages represent requests for the server 104 to perform various functions. The server extension module 156 conceptually operates as a dispatcher who routes such messages to other modules contained in the server 104, such as web synchronization module 124 (who handles requests to synchronize with web content), notification module 132, fleet management module 154 (who handles fleet related requests), and/or third party modules 155 (such as other synchronization modules). Thus, the invention supports modules 155 generated by third parties to perform various functions. Such modules 155 "plug-in" to the server 104 via the server extension module 156.

Referring again to FIG. 1A, the devices 106 may be any type of data processing device. In embodiments of the invention, the devices 106 are mobile computing devices, although the invention is not limited to these embodiments. In such example embodiments, the devices 106 may include, but are not limited to, handheld computers, cellular phones, internet-enabled phones, pagers, radios, tvs, audio devices, car audio systems, recorders, text-to-speech devices, barcode scanners, net appliances, mini-browsers, personal data assistants (PDAs), etc.

In embodiments of the invention, the devices 106 include software, hardware, and/or combinations thereof related to client functionality (such client functionality is described herein). When a device 106 includes such software, hardware, and/or combinations thereof, the device 106 is referred to herein as a client 108. Accordingly, it can be said that the data processing environment 102 includes one or more clients 108.

Clients 108 each may include a layout and rendering module 134, a forms module 136, a control module 142, a user interface 144, a client extension interface 138, a client interface module 112, a client communications module 110, a JavaScript™ engine 140, and a database module 146. Other embodiments of clients 108 may include a subset of these modules, and/or may include additional modules.

Layout and rendering module 134 controls the processing of data objects on client 108, such as the layout and rendering of data objects on client 108. For example, the layout portion of module 134 obtains information from databases of the client 108 (via the database manager 146) and determines where such information should be rendered on the display of the client 108. Such information may include anything that can be rendered, such as but not limited to images, text, links, etc. The rendering portion of module 134 is responsible for drawing items on the display (drawing bits to the screen). These and additional functions performed by the layout and rendering module 134 are described herein.

The forms module 136 controls and manages forms. For example, in embodiments the forms module 136 manages aspects of off-line forms, such as HTML forms and/or multi-page forms. The forms module 136 enables access to and user interaction with forms (in some embodiments, the forms module 136 via UI 144 enables users of client 108 to directly access forms). The forms module 136 maintains the status of forms. Forms module 136 can also include a forms manager (not shown) to provide added functionality. These and additional functions performed by the forms module 136 are described herein.

The user interface 144 is preferably a graphical user interface that enables users to interact with client 108 and functions and modules provided by the client 108. More generally, UI 144 controls how functions presented by modules of the client 108 are presented to users. The UI 144 controls how users interact with such functions and modules. It is noted that the functionality of the UI 144 may be distributed. For example, portions of the UI 144 may reside in the forms module 136, as well as other modules of client 108. These and additional functions performed by the user interface 144 are described herein.

The client extension interface 138 enables modules, such as third party modules, to operate in or work with the client 108 (and modules contained in the client 108). The client extension interface 138, also known as an on-device server, presents an API (application programming interface) that is, in embodiments, common to clients 108 on many architectures.

Modules in the client 108 can work together via the client extension interface 138. For example, the JavaScript™ engine 140 may decide that it wishes to display a message to the user. To do this, the JavaScript™ engine 140 would work through the client extension interface 138 to cause the UI 144 to display the message to the user. The JavaScript™ engine 140 may not know how to directly interact with the UI 144. However, as long as both the JavaScript™ engine 140 and the UI 144 conform to the API of the client extension interface 138, then they can operate together.

Similarly, the control module 142 may decide that it needs to store some data in a database. The control module 142 would do this by working with the client extension interface 138 to access the database module 146 to effect such a modification to the databases in the client 108. These and additional functions performed by the client extension interface 138 are described herein.

The JavaScript™ engine 140 executes objects written in the JavaScript™ language that operate on client 108. As noted, the JavaScript™ engine 140 conforms to the API of the client extension interface 138, and works with the client extension interface 138 to work with other modules in client 108. These and additional functions performed by the JavaScript™ engine 140 are described herein.

Although not shown in FIG. 1A, embodiments of the invention include other engines for executing other types of scripts on client 108. These other engines can interact with other modules on client 108 as long as the engines conform to the API of the client extension interface 138.

The database module 146 controls access to databases associated with client 108. More generally, the database manager 146 controls access to resources on the client 108. For example, the control module 142 may interact with the database manager 146 to open an address book in the databases, and to write a record to the address book. Alternatively, the forms module 136 can interact with the database module 146 to access forms that are stored in the databases. These and additional functions performed by the database module 146 are described herein.

Client communications module 110 enables the client 108 to interact with external entities, such as server 104. In embodiments, the client communications module 110 enables TCP/IP traffic, although the invention is not limited to this example. More generally, the client communications module 110 enables communication over any type of communication medium 120, such as wireless, wired, etc., using any communication protocol, such as a pager protocol. These and additional functions performed by the client communications module 110 are described herein. The client interface module 112 enables the client 108 to communicate with adapters 118. Client interface module 112 optionally links to client communications module 110 in some embodiments to provide functionality (for example, when the client communications module 110 uses a wireless modem's drivers, which are accessed via client interface module 112). In embodiments, the client interface module 112 may be Hot Sync™ Manager in the Palm operating environment, or Active Sync™ in the Windows CE™ operating environment, or Pilot Link™ in the Unix operating environment. It is noted that these implementation examples are provided for illustrative purposes only. The invention is not limited to these examples. These and additional functions performed by the client interface module 112 are described herein.

The control module 142 coordinates the activities of the other modules in client 108 so that all the modules share resources properly. For instance, control module 142 can determine priorities for shared resources such as processing time, accessing memory, etc.

Providers 128 are sources of various types of objects, such as but not limited to content (content providers 128A), applications (application providers 128B), services (service providers 128C), etc. Providers 128 may also include servers 104' (similar to server 104), which may provide objects such as but not limited to content, applications, services, etc. For example, and without limitation, the application providers 128B may provide objects relating to (without limitation) operating system updates/changes, system upgrades, application updates/changes, etc.

Adapters 118 include an adapter interface module 116, a user interface 148, a database module 150, an adapter synchronization module 152, and a client communications module 110. Other embodiments of adapters 118 may include a subset of these modules, and/or may include additional modules.

Client communications module 110 is the same as similarly named modules in clients 108.

The adapter interface module 116 enables the adapter 118 to communicate with clients 108.

The adapter synchronization module 152 is involved with synchronization operations between server 104 and clients 108.

The UI 148 enables users to interact with modules and functions of adapter 118.

The database module 150 controls access to databases associated with adapter 118. The database module 150 manages information needed for clients 108 to remain in sync with server 104. In some embodiments, the adapter 118 does not include the database module 150 or the UI 148 (i.e., in embodiments where the adapter 118 operates essentially as a pipe, as in some embodiments on Unix).

These and additional functions performed by modules of the adapter 118 are described herein.

Additional modules and features of embodiments of the invention are described below.

1.4 Example Implementation Embodiments

FIG. 1B1 illustrates a block diagram of a data processing unit 103A that can be used to implement the entities shown in FIGS. 1A and 1B. It is noted that the entities shown in FIGS. 1A and 1B may be implemented using any number of data processing units 103A, and the configuration actually used is implementation specific.

Data processing unit 103A may represent laptop computers, hand held computers, lap top computers, and/or any other type of data processing devices. Which type of data processing device used to implement entities shown in FIGS. 1A and 1B is implementation specific.

Data processing unit 103A includes a communication medium 103B (such as a bus, for example) to which other modules are attached.

Data processing unit 103A includes one or more processor(s) 103C, and a main memory 103D. Main memory 103D may be RAM, ROM, or any other memory type, or combinations thereof.

Data processing unit 103A may include secondary storage devices 103E, such as but not limited to hard drives 103F or computer program product interfaces 103G. Computer program product interfaces 103G are devices that access objects (such as information and/or software) stored in computer program products 103. Examples of computer program product interfaces 103G include, but are not limited to, floppy drives, ZIP™ drives, JAZ™ drives, optical storage devices, etc. Examples of computer program products 103H include, but are not limited to, floppy disks, ZIP™ and JAZ™ disks, memory sticks, memory cards, or any other medium on which objects may be stored.

The computer program products 103H include computer useable mediums in which objects may be stored, such as but not limited to optical mediums, magnetic mediums, etc.

Control logic or software may be stored in main memory 103D, secondary storage device(s) 103E, and/or computer program products 103H.

More generally, the term "computer program product" refers to any device in which control logic (software) is stored, so in this context a computer program product could be any memory device having control logic stored therein. The invention is directed to computer program products having stored therein software that enables a computer/processor to perform functions of the invention as described herein.

The data processing unit 103A may also include an interface 103J which may receive objects (such as data, applications, software, images, etc.) from external entities 103N via any communication mediums including wired and wireless communication mediums. In such cases, the objects 103L are transported between external entities 103N and interface 103J via signals 103K, 103M. In other words, such signals 103K, 103M include or represent control logic for enabling a processor or computer to perform functions of the invention. According to embodiments of the invention, such signals 103K, 103M are also considered to be computer program products, and the invention is directed to such computer program products.

2. A Cross-Platform Browser and Client/Server Software Innovation for Mobile Devices As described above, the technology uses a cross-platform strategy for serving and obtaining content requests on and across platforms and processors available to mobile devices. In some embodiments, the client enables desktop personal computer (PC) functionality on mobile devices. For example, the client can support dynamic hypertext mark-up language (DHTML) on mobile devices; it can support device-side interpretation of JavaScript™; and it can provide secure client/secure protocol/secure server interaction. It is noted that these examples are mentioned for illustrative purposes only, and are not limiting. Addition functions and capabilities are within the scope and spirit of the present invention, as will be appreciated by persons skilled in the relevant art(s) based on the teachings contained herein.

Additionally, the client 108 of the invention enables per channel (and/or per page) username and password authentication for transactions (e.g. in e-commerce applications and/or channels), digital notarization, content hold and deliver technology in connected and disconnected modes, and bookmarks. Furthermore, the clients 108 (i.e., client 108A and 108B) of the invention enable support for multiple protocols such as mailto and dialto interfaces, and DHTML. It is noted that these examples are mentioned for illustrative purposes only, and are not limiting. The invention is applicable to other protocols, as will be appreciated by persons skilled in the relevant art(s) based on the teachings contained herein.

In an embodiment, the client 108 of the invention integrates with other mobile device applications through methods such as but not limited to: cut and paste, domain integration of Find and/or Search methods, and mobile device communication between on-device applications and their separate tables of data. For example, the client 108 of the invention can invoke a vector graphics display or a word processor or spreadsheet file synced to the device. In one embodiment, these features correspond and extend the functionality of pluggable MIME types on server 104.

In embodiments, the client 108 is designed to support the additional Internet document standards: HTML 4.0, XHTML 1.0, CSS (Cascading Style Sheets), and the W3C DOM (Document Object Model). It is noted that these examples are mentioned for illustrative purposes only, and are not limiting. The invention is applicable to other standards, as will be appreciated by persons skilled in the relevant art(s) based on the teachings contained herein.

Figure 2A:
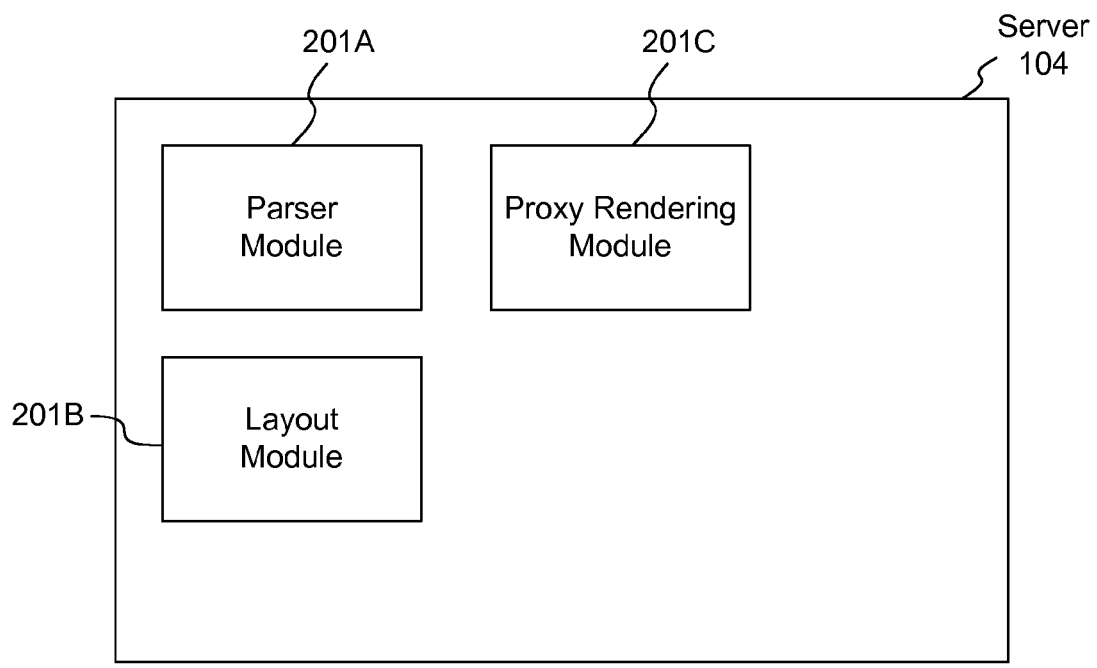
FIG. 2A is a block diagram illustrating additional modules according to an embodiment of the invention.

Referring to FIG. 2A, a block diagram, illustrating additional modules according to an embodiment of the invention, is shown.

Server 104 can include parser module 201A, layout module 201B, and/or proxy rendering module 201C. Modules 201A-201C can be implemented in server 104 alone or in combination with other elements or modules, such as in combination with clients (such functionality can also be performed completely by clients). It is noted that the functionality associated with modules may vary from implementation to implementation. The specific functionality and implementation described herein represent an example embodiment of the invention. Other embodiments will be apparent to persons skilled in the relevant art(s) based on the teachings contained herein.

Also, implementations may employ combinations of the above modules, and/or employ the functionalities of the above modules as sub-modules to other modules of server 104, as will be appreciated by persons skilled in the relevant art(s).

In one embodiment, parser module 201A reads the objects on a page, such as a Web page. The parser module 201A separates out the description of each object on the page and generates a tree of objects based on their descriptions and the inherent relationship defined by the descriptions. In one embodiment, the tree of objects is compatible with the W3C DOM. Thus, in the case of HTML, the Web page is a description of content objects using tags, attributes, and styles. In the case of WML, the page is a description of content object using binary data.

In one embodiment, layout module 201B maps the parsed objects of a page and determines how the objects can be positioned and sized (or laid out) in order to provide a page with similar substance on the mobile device to which it is going to be transmitted. As with the other embodiments of the layout module described herein, the layout module 201B receives display, font color, and other device configuration information from the proxy render module 201C.

In a server-side layout embodiment, layout module 201B receives the display configuration of the mobile device from proxy render module 201C. Proxy render module 201C provides server 104 with the functionality of layout and rendering module 134 (in this case, either of modules 134A or 134B) for any number of clients 108. In one embodiment, the proxy render module 201C provides configuration information from a database, which stores previously obtained configuration information. In embodiments described herein, the server 104 receives the configuration information from the client 108. For example, server 104 receives the configuration information from layout and rendering module 134. From this information, server 104 is able to operate proxy render module 201C accordingly and provide data in the proper format. For example, in one embodiment, the proxy render module 201C is able to produce byte code in the form of a content stream compatible with the display hardware of device 106.

As such, proxy rendering module 201C determines the display capabilities of the device 106 to which the content stream is going to be transmitted. Furthermore, in one embodiment, proxy rendering module 201C determines information about how particular objects can appear (i.e., are positioned) on the display of a mobile device from device information stored in database module 126, rather than for a specific device 106 from information provided by client 108.

Furthermore, the functionality of these modules can be implemented on clients 108. For example, the rendering functionality of layout and rendering module 134 can provide the configuration information directly to the layout functionality of the same module. In embodiments, modules implemented on the client 108 are designed to operate on relatively small computers and/or mobile devices such as those described herein as well as those similarly designed. The combination of functionalities in one module 134 is for illustrative purposes. The combination may be separated and implemented in two separate modules as discussed with respect to server 104 above. These implementations are discussed in more detail below.

Referring to FIG. 2B1, a block diagram, illustrating an additional module according to an embodiment of the invention, is shown.

Client 108A can include client parser module 202A. Client parser module 202A provides functionality similar to parser module 201A as described herein.

Referring to FIG. 2B2, a block diagram, illustrating additional modules according to an embodiment of the invention, is shown.

Client 108B can include client parser module 202B and client interface module 112B. Client parser module 202B provides functionality similar to parser module 201A as described herein. Client interface module 112B is capable of connecting with providers 128 via communication medium 120E. Providers 128, as described herein, are content providers, such as Web sites. Communications medium 120E may be implemented to augment the connection with server 104 via adapter 118. For example, communications medium 120E, as shown, could connect directly to providers 128 via a wireless link in order to obtain updated content from providers 128 or to transmit data to providers 128.

In one embodiment, the parsing functionality added to client 108 via client parser modules 202A and 202B allows clients 108 to obtain content directly from providers 128 without server 104 transformation. Some embodiments of this distribution of functionality is discussed below with respect to FIG. 2C.

Figure 2C:
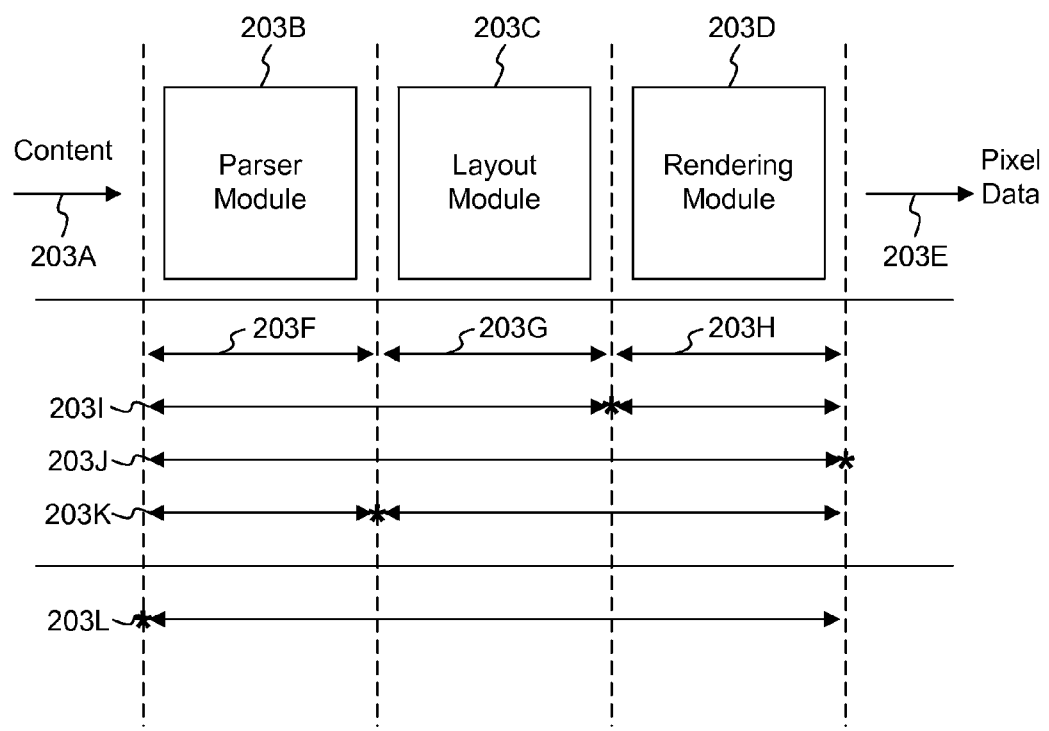
FIG. 2C is a diagram illustrating some processing components according to an embodiment of the invention.

Referring to FIG. 2C, a diagram, illustrating some processing components according to embodiments of the invention, is shown.

Content 203A from a page in the form of objects is parsed by parser module 203B, laid out by layout module 203C, rendered by rendering module 203D, and sent to mobile devices for display in the form of pixel data 203E. These objects can include but are not limited to tags, attributes, and style information.

The modules 203B, 203C, and 203D are similar to the modules discussed in FIGS. 2A, 2B1, and 2B2. FIG. 2C illustrates the feature of the invention where the method, system and computer program product can be configured such that the operations of modules can be performed on server 104 and/or clients 108, as well as on adapter 118 as well as combinations thereof.

In the examples of FIG. 2C, the operational processes of each of modules 203B, 203C, and 203D are delineated by marker 203F for parser module 203B. Similarly, marker 203G delineates the operational processes of layout module 203C. Marker 203H shows the operational processes for rendering module 203D.

In embodiments of the invention, the operational processes of these modules, as well as the modules themselves, can be implemented on either or both the server 104 or the client 108 (or adapter 118). This flexibility allows the invention to optimize the transformation and delivery of content to mobile devices based on the capabilities of the devices and/or requirements of users.

Line 203I illustrates an example implementation where modules 203B and 203C are operating on server 104 to perform the functions of parsing and layout. The asterisk of line 203I shows the transition to client 108 (or adapter 118) and thus the operations of module 203D are performed on client 108.

Similarly, lines 203J, 203K, and 203L illustrate other possible apportioning of the operational tasks. The markers between the arrows of lines 203J, 203K, and 203L similarly showing the transition from one of the server 104 to client 108 (and/or adapter 118).

In additional embodiments, modules on both server 104 and client 108 (and adapter 118) can operate in parallel or series on the objects of content 203A.

Referring to FIG. 2D1, an example flowchart 204 relating to structuring interactive content, according to an embodiment of the invention, is shown.

In step 204A, server 104 receives a request for pages. In one embodiment, the client 108 sends the request.

In step 204B, server 104 receives mobile device and client information describing the capabilities of the client 108 and the device 106. In one embodiment, client 108 sends information regarding the display and memory specifications of the mobile device upon which it is operating.

In step 204C, server 104 parses the pages into a mutable document of content according to the device and client information of step 204B. In one embodiment, parser module 201A parses the pages into discrete objects.

In step 204D, server 104 determines the rendering parameters of the client and mobile device according to the information obtained in step 204B. In one embodiment, proxy rendering module 201C provides the rendering parameters of the client and mobile device.

In step 204E, server 104 lays out the document content according to the rendering parameters determined in step 204D. In one embodiment, the parsed objects of a page are assembled and formatted such that the page displayed by the client on the mobile device has the same functional display or presentation as on any other device. In an embodiment, layout module 201B provides common layout services for the server 104. Similarly, layout and rendering module 134A of FIG. 1A provides these services on client 108A.

In step 204F, server 104 determines the document table and document content to be sent to client 108 so that the client 108 can use the content of the page(s). The structure and format of the document table and document content (according to embodiments) are discussed below.

In step 204G, server 104 compresses the document content, preferably on a discrete object-by-object basis (although other embodiments are possible). For example, the discrete objects obtained from the parsing of step 204C are compressed individually in step 204G.

In step 204H, server 104 encrypts the document content, preferably on a discrete object-by-object basis. For example, the discrete objects obtained from the parsing of step 204C are encrypted individually in step 204H.

In step 204I, server 104 serializes the document content according to the discrete basis. For example, the document content is placed in ordered blocks or sections. In one embodiment, the discrete basis may prioritize index or home pages and place them in places in the serialized chain of objects so that they may be readily recalled.

In step 204J, server 104 serializes the document attributes related to the document content according to the discrete basis. In one embodiment, the document attributes are placed in a similar order as the document objects in step 204I. In another embodiment, the document attributes are serialized based on the type of objects they respectively identify.

In step 204K, server 104 transmits the serialized document to client 108A and/or adapter 118 for delivery to client 108B. In one embodiment, the serialized document is a content stream transmitted to the device for client 108. The serialized document can provide an optimized format for delivering content to mobile devices that may not be designed to accommodate the relatively large file formats, which PCs are used to handling.

In the above description, server 104 is discussed as performing the operations of flowcharts 204. This is just one embodiment of the invention. Variations of this embodiment will be apparent to persons skilled in the relevant art(s) based on the teachings contained herein. For example, client 108 can perform some or all of the operations of flowchart 204, as discussed below.

Referring to FIG. 2D2, an example flowchart 204M relating to structuring interactive content according to another embodiment of the invention is shown In step 204N, client 108 (as discussed above, client 108 is used to refer generically to client 108A and/or client 108B, unless stated otherwise) sends a request for pages.

In step 204Q, client 108 receives the requested pages. In one embodiment, client 108B receives the pages directly from providers 128, as shown in FIG. 2B2. In another embodiment, client 108 receives the requested pages from the server 104.

In step 204R, client 108 parses the pages into a mutable document of content. As described above, the mutable document allows for better access and storage for the client.

In step 204S, client 108 determines the rendering parameters according to the local render module, such as layout and rendering module 134.

In step 204T, client 108 lays out the document of content according to the rendering parameters determined by the local render module, such as layout and rendering module 134. Such parameters include, for example, colors supported, device screen size, font characteristics, etc.

In step 204U, client 108 displays the data on the screen. In one embodiment, the render module of client 108 puts the pixel data on the screen.

For example, the client communications module 110A receives the pages from server 104. Client parser module 202A parses the pages. Layout and rendering module 134A determines the rendering and layout parameters and forwards the pixel data to the screen. Other examples and embodiments are discussed in detail below.

2.1 Serialized Document Model

Similar to the PODS described herein, the document (data object) assembled through the steps of flowcharts 204 and 204M includes a structure that is advantageous for mobile devices. The document object models (DOM) of an embodiment of the invention supports Copy-On-Write which is usually only implemented in hardware. This enables the creation of discretely compressed read-only documents (for example, the pre-processed content stream as described herein) that can be modified and saved and then loaded and modified incrementally on a discrete basis.

This embodiment allocates data in its final form. In an embodiment, read-only data in the content stream is, as best can be achieved, in its final, usable form. The data does not have to be duplicated for use as with other types of models. This aspect of the invention is important given the relatively limited resources of mobile devices.

2.2 Memory Allocation

Furthermore, this model has a tight memory allocation scheme. In an embodiment, memory is allocated in Pools and Arenas that are scoped to the lifetime of the object being allocated. For example, documents have a memory scope. When an object whose lifetime is that of a document is allocated, it is allocated from the owner document's memory scope.

When the document is destroyed, the associated memory scope can be freed immediately. Objects that will exist for the life of a memory scope will be allocated from the scope Arena (in an embodiment, arena allocated objects cannot be individually freed). In an embodiment, objects whose lifetimes are more volatile will be allocated from the scope pool (where they can be later freed). This allocation is but an example and others can be implemented depending on the device's memory structure (and also possibly depending on other factors) as one skilled in the relevant art would recognize. As in the above example, when both arena and pool memory types exist, content can be stored in a read-only (arena) and/or in a writeable (pool). Further embodiments using this type of memory allocation are discussed below.

Figure 2E:
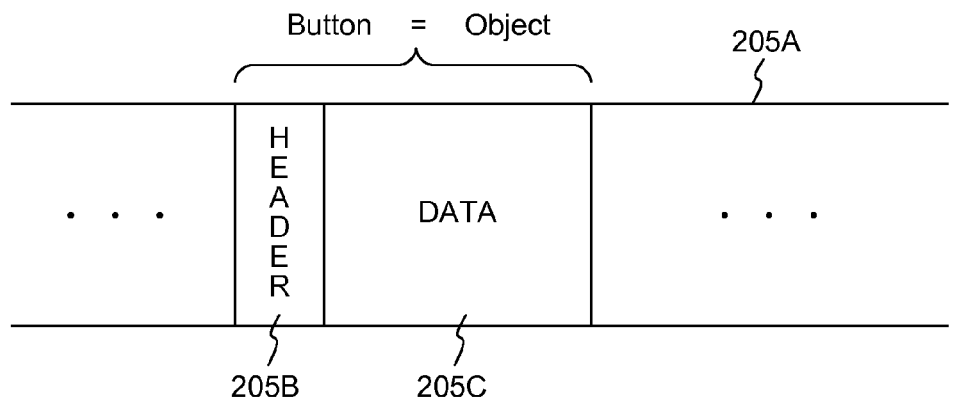
FIG. 2E is a diagram illustrating an example of content formatting according to an embodiment of the invention.

Referring to FIG. 2E, a diagram illustrating an example of content formatting according to an embodiment of the invention is shown. In this embodiment, an example button is shown within the document 205A. The button object includes a header 205B and the parameter information stored as data 205C. Header 205B can include type information which provides a mechanism whereby there is a pointer or pointers to the type of functions which operate on the data 205C.

Figure 2G:
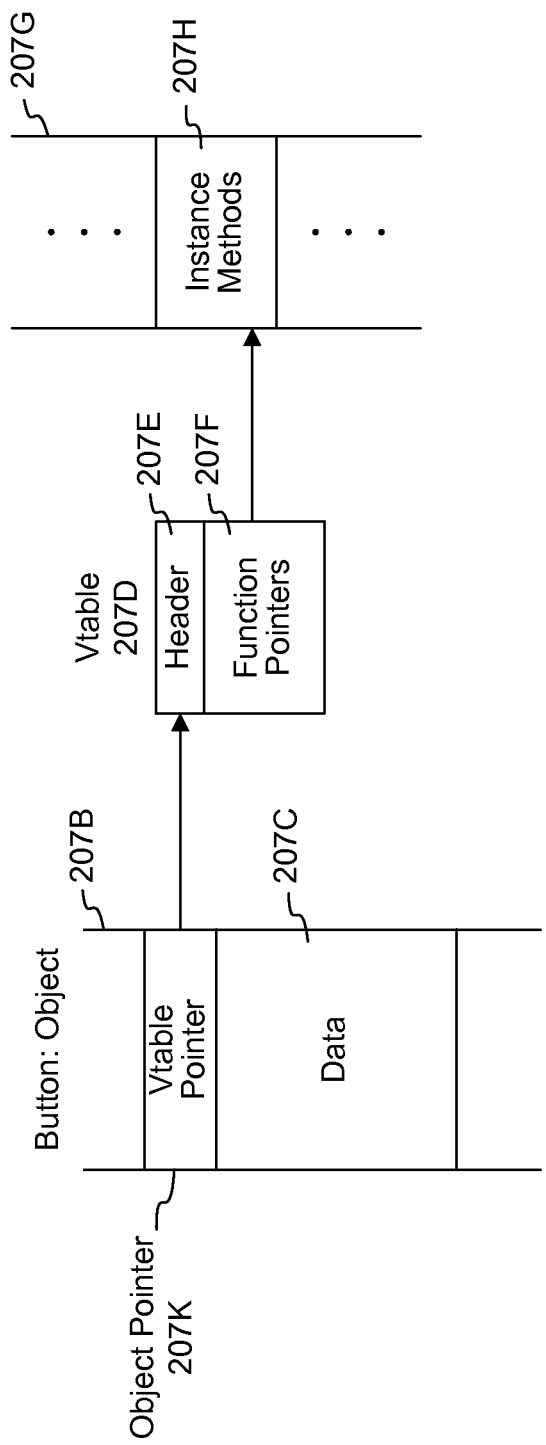
FIG. 2G is a diagram illustrating an example of an architecture related to an embodiment of the invention.

Referring to FIG. 2G, a diagram illustrating an object model related to those shown in FIGS. 2F1 and 2F2 is shown. FIG. 2G shows a button object 207A that includes object pointers 207K. Object pointers 207K comprise a vtable pointer 207B and a data object 207C. Vtable pointer 207B points to a vtable 207D that contains function pointers 207F for accessing instance methods 207H.

Button object 207A and data 207C can be placed in writeable memory. Qualitative data can be read and written (thus, modified) by instance methods 207H, which are designed to read and manipulate data 207C.

There are drawbacks to this object model. They include, but are not limited to:

1) Data 207C is in writeable memory. Data 207C is relatively large. If data 207C is first available in read-only form, then it must first be copied into writeable memory.

2) Writeable memory is often scarce on mobile devices (as well as other devices).

3) Data 207C cannot easily be maintained in compressed form as the size of data 207C will change as it is modified. This requires additional writeable memory.

Additionally, the lack of a document table effectively means that any changes to the data 207C or the type information in header 207B requires a change to the vtable 207D which is used to operate on data 207C. These changes have to be made globally so that the entire document is recreated.

FIGS. 2F1 and 2F2 illustrate content instantiation architectures according to embodiments of the invention.

Referring to FIG. 2F2, a diagram illustrating the content instantiation architecture according to an embodiment of the invention is shown. FIG. 2F2 differs from FIG. 2G in that data 206K2 is separated from object 206A. The addition of attribute pointer 206C, which points to data 206K2, serves as a link so that changes do not have to be made globally as in FIG. 2G.

Referring to FIG. 2F1, a diagram illustrating the content instantiation architecture according to an embodiment of the invention is shown. FIG. 2F1 is differs from FIG. 2F2 in that data 206K can be read only and compressed. Instance methods 206H are designed to read the compressed data.

The architectures of FIGS. 2F1 and 2F2 have advantages over the architecture of FIG. 2G. Unlike the architecture of FIG. 2G, data does not have to be decompressed or copied to writeable memory for initial use. Data can be read, and/or displayed immediately. The architectures of FIGS. 2F1 and 2F2 are very efficient for mobile devices (as well as other devices), which can have relatively limited memory or processing capabilities, because they use compressed read-only data. Additionally, the architectures of FIGS. 2F1 and 2F2 are useful for applications where memory and processing requirements need to be optimized, as well as for other applications as will be appreciated by persons skilled in the relevant art(s) based on the teachings contained herein.

Referring to FIG. 2F1, for example, document table 206A provides two pointers: Vtable pointer 206B and attribute pointer 206C. Vtable pointer 206B points to a vtable 206D which includes header 206F and function pointers 206G. Header 206F includes information pertaining to the class and type of functions being called. Function pointers 206G includes global, user, and low-level function pointers that provide access to the instance methods 206H of functions 206E.

Attribute pointer 206C points to the specific object in the content stream 206I similar to that discussed with respect to FIG. 2E. Header 206J and data 206K provide specific information about how to perform the functions pointed to in the vtable.

The use of document table 206A allows the entire document to be incrementally altered as may be required without having to totally restructure the document.

It is noted that the data 206K can be compressed. Content stream 206I, header 206J, and data 206K can be in read-only memory. Instance methods 206H can be designed to interpret the compressed data 206K so that instance methods 206H can read, display and process data 206K properly.

According to embodiments of the invention, modifications to data 206K are possible, but any modified data 206K objects are stored in writeable memory. Attribute pointer 206C is updated to reflect the modification so that future use of the specific data 206K object is directed to the modified object. The embodiments of FIGS. 2F1 and 2F2 therefore provide for relatively less use of writeable memory on the mobile device.

Software Modification on Write Method and Example

The embodiments of FIGS. 2F1 and 2F2 offer important advantages to browsers. For example, mobile devices typically are designed around several different operating systems and/or hardware standards. The use of a client that enhances access helps to assure compatibility. Furthermore, the general features of mobile devices are relatively limited compared to their PC counterparts. As such, mobile devices benefit from enhanced content storage, retrieval and modification techniques.

In an embodiment, data can be transformed as shown in FIGS. 2F1 and 2F2. In an example embodiment, the objects 206A in FIGS. 2F1 and 2F2 share the same form, i.e., a compressed, read-only form. The read-only objects 206A of FIG. 2F1 can be transformed by instance method 206H into the writeable form shown in FIG. 2F2. In one embodiment, when instance method 206H is called, a software exception similar to a hardware exception occurs.

Referring to FIG. 2F3, a flowchart 206P, relating to an enhanced data modification process according to an embodiment of the invention, is shown. For illustrative purposes, FIG. 2F3 is described with reference to FIG. 2F1. However, the operations of FIG. 2F3 are applicable to other embodiments, such as the example embodiment of FIG. 2F2.

In an embodiment, control module 142 performs the steps of routine 206P.

In step 206Q, client 108 accesses an object pointer 206L in a document (object) table 206A. The object pointer is an element of the document table, which in one embodiment, is placed at the beginning of the content stream.

In step 206R, client 108 accesses a vtable pointer 206B for access to the vtable's function pointers 206G.

In step 206S, client 108 accesses an attribute pointer 206C for access to data in a content stream 206I.

In step 206T, client 108 uses the vtable pointer 206B to read function pointers 206G for access to instance methods 206H.

In step 206U, client 108 reads the content stream 206I for access to data 206K pointed to by attribute pointer 206C.

In step 206V, client 108 determines the requirements for the data 206K. In one embodiment, client 108 determines the amount of writeable memory that the data 206K will take up.

In step 206W, client 108 allocates writeable memory according to the requirements determined in step 206V.

In step 206X, client 108 decompresses and copies the data 206K into writeable memory. In one embodiment, the client 108 access portions of hardware and operating system software of device 106 to decompress and copy the decompressed data. In another embodiment, the client 108 internalizes the decompression and copying step.

In step 206Y, client 108 updates attribute pointer 206C to point to the data 206K in writeable memory.

In step 206Z, client 108 updates vtable pointer 206B to point to instance methods 206H for non-compressed, writeable data.

For example, referring also to FIG. 2F2, a routine can allocate writeable memory for data 206K2. It decompresses the data 206K and copies the data 206K into writeable memory, shown as data 206K2. The method then changes the attribute pointer 206C to point to data 206K2. It also changes the vtable pointer 206B to point to the non-compressed, writeable instance functions vtable 206D2.

With the modification complete, the instance method 206H calls an equivalent instance method 206H2 to actually perform the required write operation of the data 206K2.

A feature of this embodiment is that the operations of FIGS. 2F1 and 2F2 occur invisibly (transparently) to the application calling the pointers. An additional feature is that the operation is performed once on a per object basis. Once performed, the object stays in writeable memory for the life of the document(s)/object(s).

A result of these embodiments is that object pointer 206L is preserved. This is important as many other objects may already have a reference to object 206A via object pointer 206L.

2.3 Detailed Object Model Embodiments

In an example application of the embodiment of FIG. 2F1, every object in the tree has an 8 byte (two pointers) entry in the Document Object Table (DOT). The entry consists of a pointer to the object's class vtable (table of function pointers for instance methods), and a pointer to the object's data. In the case of content stream formatted documents, the object's data pointer points into the content stream. It is noted that the invention is not limited to this example embodiment.

Inter-object references are via Object Identifiers (OID), which are unique 16 bit identifiers for each object in the document. Unlike pointers, OIDs support relocation and transmission between server and client. Entries in the DOT are ordered in OID order. That is, the OID is also the index into the DOT. Thus, an OID can quickly be translated into an Object pointer (which is desirable at runtime) by performing array arithmetic (object=&dot[oid]). By using OIDs and pointers in the DOT approach, a number of advantages are achieved: relocatability and transmittability from the OIDs, and ease of use, and a rational runtime model from the Object model.

The DOT is created when the document is being loaded, as shown in FIGS. 2F1 and 2F2. An example scenario is as follows: The content stream is interrogated to see how many objects are in the document. A DOT large enough to accommodate that number of objects is created. An application quickly scans through the content stream, which has objects in OID order. For each object the application checks the type, ensures that the class and vtable 206D for that type is created, writes the vtable pointer 206B in the DOT entry, then writes in the data pointer 206C, pointing back to the content stream data 206K. Then, the application skips to the next object in content stream (each entry has a length prefix stored in header 206J). When the application is done it has a fully populated DOT, with a number of objects that are writeable. If more objects are added to the document (via scripting requests), they are dynamically added to the end of the DOT in the form of FIG. 2F2, for example.

Like the PODS object model, the invention's Object Model, while implemented in C, is compatible with C++. Objects can be represented as abstract classes (pure virtual member functions), where the base class has no data slots. On most C++ compilers, this will guarantee that the C++ vtable entry will be forced to offset zero in the class. The benefit: both C [i.e., ADOM setValue(object, "xxx")] and C++ [i.e., object->setValue("xxx");] bindings (APIs) to the same object are provided.

Figure 2H:
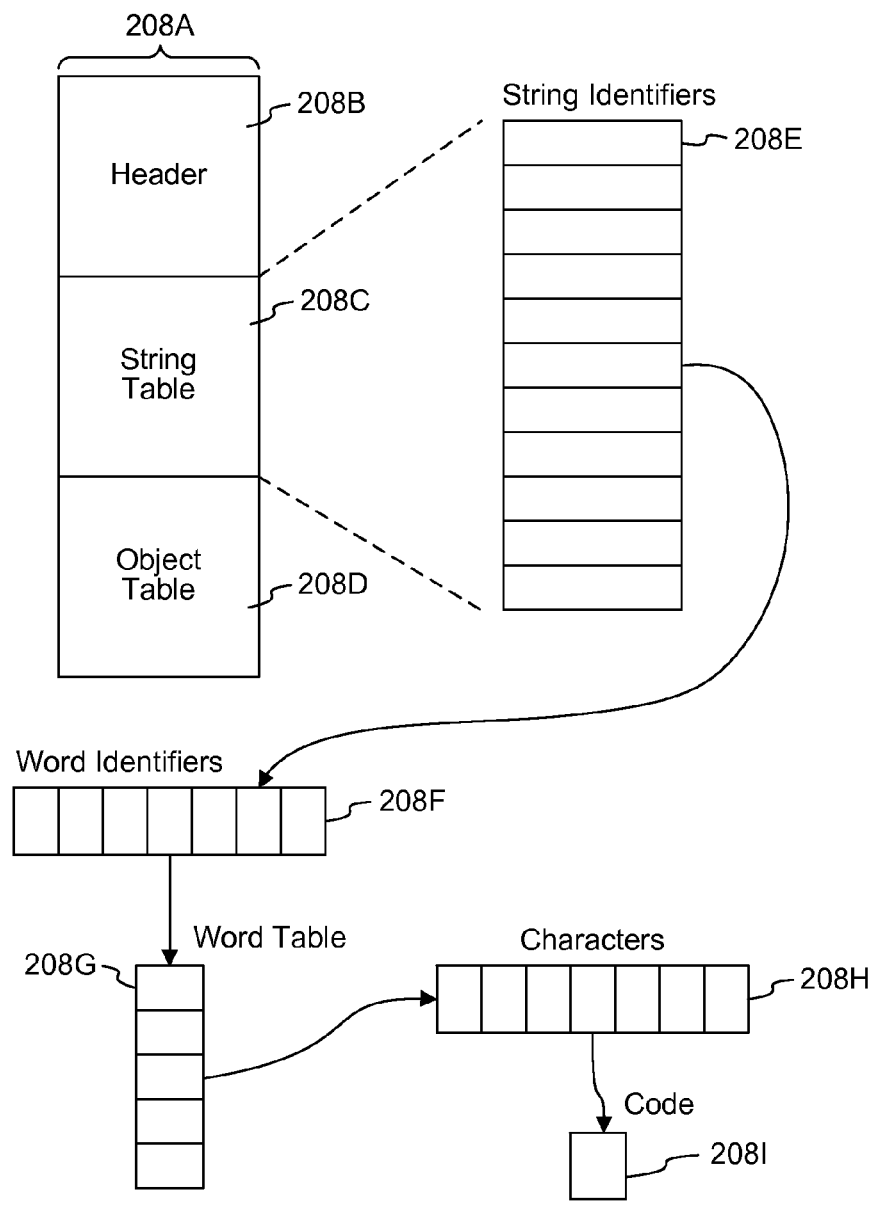
FIG. 2H is a diagram illustrating the content structure according to an embodiment of the invention.
Figure 212:
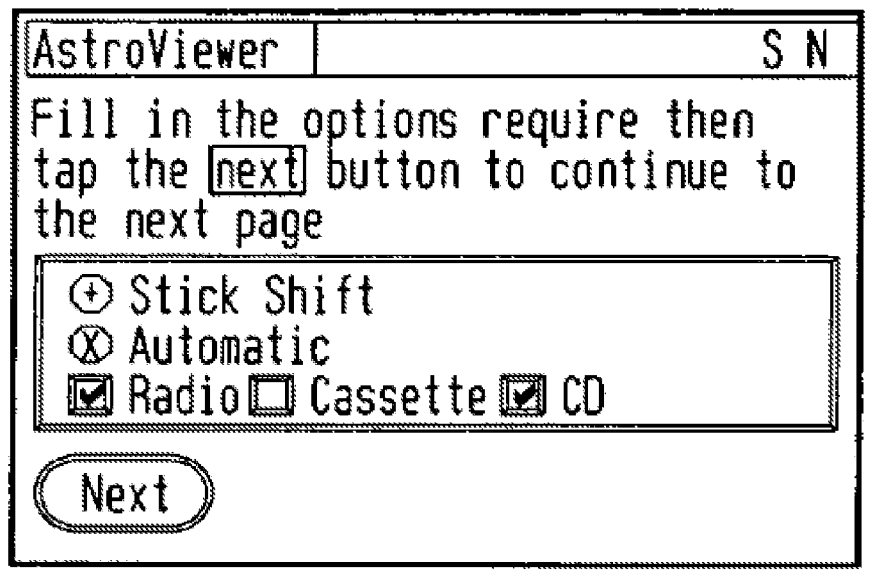

Referring to FIG. 2H, a diagram illustrating content structure according to an embodiment of the invention is shown.

Document stream 208A illustrates at a high level the structure of the document that includes header 208B, string table 208C, and object table 208D. Header 208B includes the document table information, which can include object size, number of objects and string sizes. String table 208C includes string identifiers (SIDs) 208E that are ordered based on the SID in a manner similar to OIDs, as discussed above. String identifiers 208E include lists of word identifiers 208F, which are ordered word tables 208G. Each word table contains characters 208H that are represented by a certain code 208I.

The structure embodied in stream 208A provides the compressed and ordered nature described herein. Object table 208D includes the type and size and other attribute information for each object in the document as in FIG. 2E. String objects in these objects are string identifiers referring to 208C.

2.4 CSS Style Sheet Technology on Mobile Devices

Style Sheets represent a mechanism for setting and holding style attributes. HTML elements have a number of attributes that are stylistic in nature (dimensions, colors, font information, list bullet styles, etc.). Style Sheets are just a formalized scheme of setting, getting, and most importantly sharing these attributes. An advantage of Style Sheets is that they make it very easy to make global or semi global stylistic changes to a document.

For example, if one wants all the image borders to be 4 pixels wide, one can do that easily in one place. An advantage of supporting styles is it will make it easier for the content developer to share HTML between desktop and mobile devices—without recoding the HTML.

Also, style sheets represent a useful abstraction for attribute information. In an embodiment, the HTML Element super class of HTML/DOM is aware of style sheets. HTML Element provides the interface to get all attribute information for each object in the document. In one embodiment, HTML Element obtains most of this information from the style sheet that is associated with the object. As style sheets tend to be shared by like objects, the memory hit is not substantial.

FIGS. 2I1 and 2I2 demonstrate the effect of example style sheets.

In FIGS. 2I1 and 2I2, note the borders around Product List. The top and left borders are lighter, while the bottom and right borders are darker than the background—creating a stand-out 3D effect.

The tree is made up of a three element list, where each item is a title label and an embedded list. The embedded list is hidden by setting the top level display property to none, then shown again by setting the property to block.

Figure 2J:
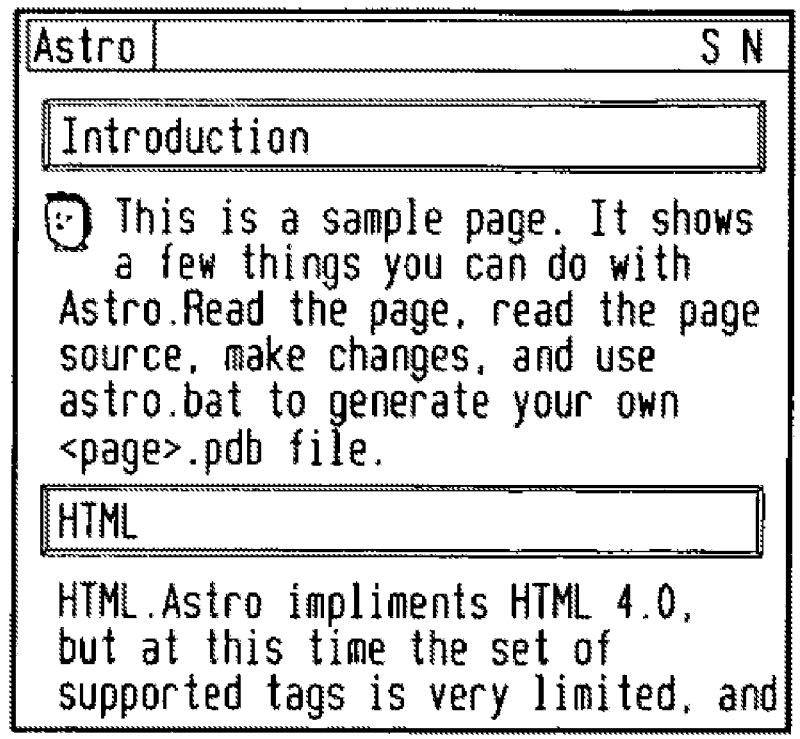
FIG. 2J demonstrates an example of floating images, where the text flows around the image.

FIG. 2J demonstrates floating images, where the text flows around the image. The example of FIG. 2J may represent a page created as a HTML source file, compiled on the server, and loaded onto the device for viewing.

2.5 Overview to the Architecture of the Technology

According to an embodiment, the architecture of the invention is designed so that a majority of the code is in the cross platform core pieces. A component that cannot be easily made cross platform is graphics code that draws bits on the screen. According to an embodiment, an approach is to break this component out as the Render abstraction, define a strict interface between Render and the rest of the code, and then utilize platform specific graphics subsystems capable of plugging back into the rest of the system.

The Draw code module deals with the semantic and programmatic level of graphics, leaving the Render module with only the responsibility of putting bits on the screen, such as bits in the form of strings, rectangles, border frames, etc. By keeping the abstraction level low, more functionality is maintained in the cross platform code, leaving the platform specific Render engine author with less code to write and maintain.

2.6 Classes and Relationships within the Technology

The relationship between the render modules and the rest of the system is defined by a render interface. In one embodiment, an example header file can be implemented. Such an example header file can includes one or more of three interfaces: ARenderMgr, ADrawCtx, and ARenderFont.

In one embodiment, ARenderMgr is the render engine. In a given executable based on this technology, one can have 0, 1, or N objects that implement an ARenderMgr interface. In order to do a layout or draw on a DOM tree, one must have an ARenderMgr instance (actually one needs a DrawCtx which is created by a RenderMgr object—see the discussion below). The render engine for a given platform's graphics subsystem is created by a factory method on the object subclass implemented by that platform.

In one embodiment, ARenderFont is a font in the world of this technology. ARenderFont basically defines a logical abstraction of the kinds of questions the core code (especially layout) needs to ask of a font, without locking down to the (very) platform specific details of any platform's font subsystem. ARenderFont only defines font metrics, such as "in one font, how many pixels wide is this string," but most platform specific render engines may sub class and add drawing behavior to the ARenderFont class.

In one embodiment, ADrawCtx is a drawing context and includes many rendering and drawing capabilities. ADrawCtx provides methods for getting bits on the screen (drawString( ), drawRectangle( ), etc), it provides the abstraction for the logical drawing surface (the Window, Form, or Port) that drawing occurs on, and also acts as memo pad for coordinate information during drawing.

2.7 Example Features

Cross-platform Construction, Layout, and Rendering Technology for DOM Application Browsers or Viewers for Mobile Devices and DHTML Layout and Cascading Style Sheets According to an embodiment of the invention, the cross-platform construction, layout, and rendering technology first parses HTML and then constructs a document object model based on HTML tags. It then lays out those objects in the tree that represent those tags in their logical pattern relative to their parent and children including details such as an x/y location and width and height attributes. After the layout is complete, the invention serializes the data and transmits it to the client in the case of the client/server browser embodiment.

FIGS. 2D1 and 2D2 (described above) illustrate example diagrams showing an embodiment of the rendering of the client and/or server.

Rendering functionality can reside on device or on the server. All of the processes can be present on the server, leaving only the device specific reader to complete the pixelation of the objects, or all of the processes can be present on the device including the parser. Thus, in some embodiments, the device can receive HTML and parse it appropriately.

Figure 2K:
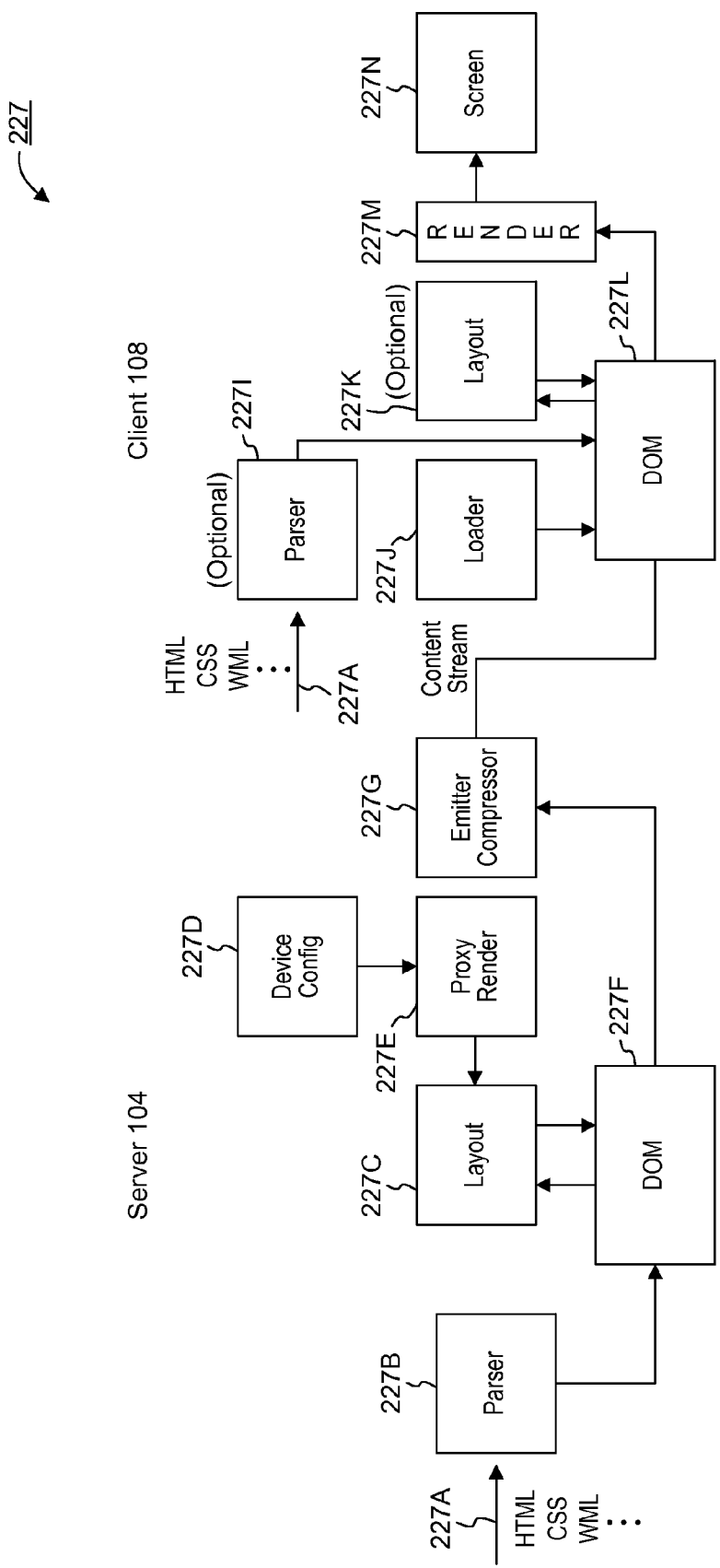
FIG. 2K is an example architecture showing construction, layout, rendering, and cross-platform technology, according to embodiments of the invention.

FIG. 2K illustrates an example construction, layout, rendering and cross-platform technology architecture according to embodiments of the invention (see also FIGS. 2D1 and 2D2).

The diagram 227 includes server 104 and device 106. As discussed above, content 227A in the form of HTML, CSS, wireless markup language (WML), or other format enters the system.

Parser module 227B receives the content and formats it into discrete objects. Parser 227B assembles the objects into DOM 227F. Here, DOM 227F is simply a placeholder for the content stream as it is being assembled. Layout module 227C reads configuration information from proxy render module 227E. Proxy render module 227E obtains this information from the device, shown here as device configuration 227D.

Once the content stream has been assembled, emitter and compressor module 227G forwards the content stream via communications medium 227H to client 108.

The client 108 receives the content stream in DOM 227L. Loader 227J forwards the content stream to render module 227M for display on screen 227N.

Additionally, client 108 can also include optional parser module 227I, and optional layout module 227K. In embodiments that include these modules, client 108 is capable of receiving content 227A and parsing it into a content stream.

Furthermore, layout module 227K can provide the proper configuration information directly from the device on which it is operating.

In an embodiment, the above-described processes begin with a user account and device specific sync to server 104, where the server 104 preemptively gathers enough information to represent the requirements of device 106.

If the device is capable of layout (i.e., includes a layout and rendering module 134), then the server may sync to the device only the DOM in content stream format. Layout operations are then performed on the device for the document.

If the device does not have a layout module, or if the server is configured to perform the layout operations, then the server will layout the document and then sync the document content and layout information to the device.

Another feature of this embodiment is that HTML is sent to the server. There a parser communicates with the document object model that creates a collection of objects (including the ability to generate objects based on invalid HTML). From these objects, a tree of objects is generated that includes their layout attributes such as x/y coordinates and their width and height. This layout is based on a proxy of the device on the server.

Another feature is that the level of the technology that is synced or loaded to the device can be preemptively determined. The device, known or unknown to the server, will sync a proxy, or map, of the device requirements to the server. At the server, objects are rendered to the specifications of that proxied device before the device syncs. This involves parsing, rendering, and laying out of document objects using the proxy map of the device.

For example, suppose that a future device syncs to a current server. The invention enables the device to inform the server of enough information to represent its requirements. In other words, the device provides enough information to enable the server to create a proxy of the device. The server then proxy-renders the objects to the device based on the proxy of the device. Then, the server may send the parsed and laid out objects or the parsed only objects to the device. In the case of raw HTML being sent to the device, the server may not need to participate in the parsing process or other processes performed by the client.

Figure 2L:
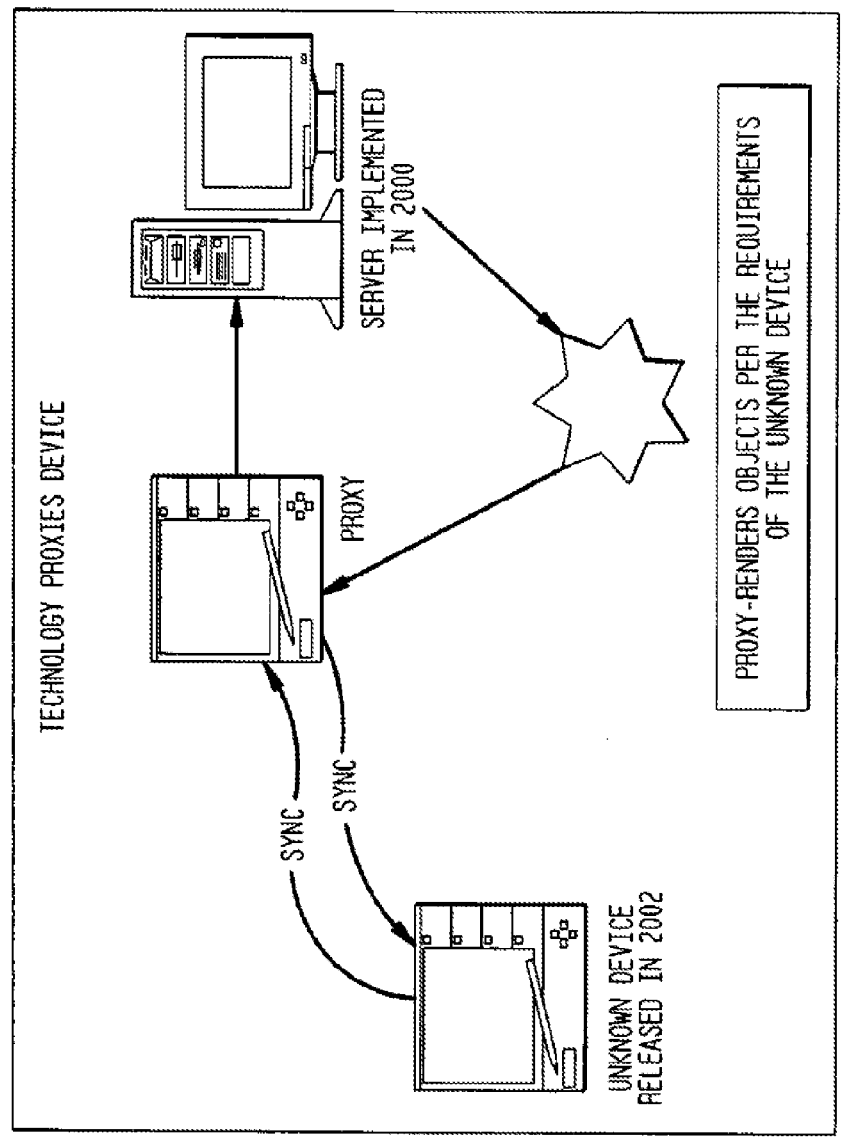
FIG. 2L is an example operation where a future device is able to sync with a current server, according to embodiments of the invention.

FIG. 2L illustrates an example process where a future device is able to sync with a current server. The loader, layout, and rendering modules (as described above with respect to FIG. 2K) of the client employ an incremental and/or on-demand approach. To view the first page of the document, only the first few objects (those visible) are loaded from the content stream. Content stream layout and rendering operations stop after the visible set of objects has been handled.

On-device pages are not necessarily created in their entirety (although they can be). They may be viewed as instantiated objects as they are needed. The content stream is rendered based on the need for the elements on a page. Compressed (in content stream format) objects are instantiated based on deltas against a default set of attributes (such as found in HTML) coded into the client application.

For example, if a document sent to the device needs to be viewed, it is quickly rendered as a set of objects rather than as a rebuilt page of HTML.

In addition, if the page needs to change, the relevant objects are incrementally decompressed from the content stream as described above with respect to FIGS. 2F1 and 2F2. Thus, the decompressed versions of only the required objects are created. When a value in an attribute is changed by a user (for example, the name of a button is lengthened or a paragraph of text is added to the page), only the objects that must be changed are decompressed.

For each instance of these objects, there is a table of objects providing an efficient way of making a byte stream into a data model. The tables are heuristic tables for matching calls to data. The objects viewed are seen through the laid out objects. When the objects are changed, a duplicate is created or morphed from the original object or set of objects and thus expanded based on a set of deltas. The result is a fully rendered copy of the object that is now writeable. A key to this functionality is how small the viewable objects are (as they need to be on mobile devices) until they need to be writeable. They become writeable when they are uncompressed or inflated to a fully rendered version.

The document object table that enables the content stream to be rendered by the invention is variable and customizable. The table may map to a function that calls data as easily as it maps to tables of data as easily as it maps to strings of code.

Another feature is that of on-device HTML authoring. Rendered HTML and resources can be redrawn and the HTML can be sent back in a content stream via a sync for storage in a database or posting on a network, intranet, or Internet.

Another feature is that the proxy-rendered nature of the invention enables a sync process to "take-over" a device. The result may be a single function device with a browser or application lock that can only be reset by another sync to the server, based on new server preferences. This means the client in conjunction with the object renderer and via a sync or other "install" mechanism, can "take over" a device for a use as a single function/single application device.

3.0 Server-Side Preparation of Data, HTML, and Other Network Resources and Objects for Ease-of-Use on Mobile Devices 3.1 Server Cache Operations As previously stated, in embodiments the invention uses server logic to optimize content for delivery on mobile devices. Server 104 also stores optimized content in a cache. The optimized content is based on the type of mobile device that requested the content. Thus, the invention stores device specific versions of content requested by mobile devices. For example, suppose a first Palm device requests document A from provider 128A. Provider 128A controls page caching using relative or absolute date-time stamps. Server 104 may optionally override the page caching from Provider 128A. Document A is retrieved from provider 128A and optimized by web synchronization module 124 for use on the first Palm device. The optimized content is then cached for the first Palm device. Next a Windows CE device requests document A from provider 128A. Document A is retrieved from provider 128A, optimized for use by the Windows CE device, and cached for the Windows CE device. If, sometime later, a second Palm device with identical or similar characteristics (depending on the implementation) as the first Palm device requests document A from provider 128A, document A, specific to the first Palm device, is immediately retrieved from the cache. The web synchronization module 124 does not have to retrieve document A from provider 128A for the second Palm device. As the number of users increases, the cache hit ratio increases, resulting in fewer fetches from providers 128. As the need for web synchronization module 124 to retrieve an object from provider 128 decreases, server bandwidth requirements also decrease.

Figure 3A:
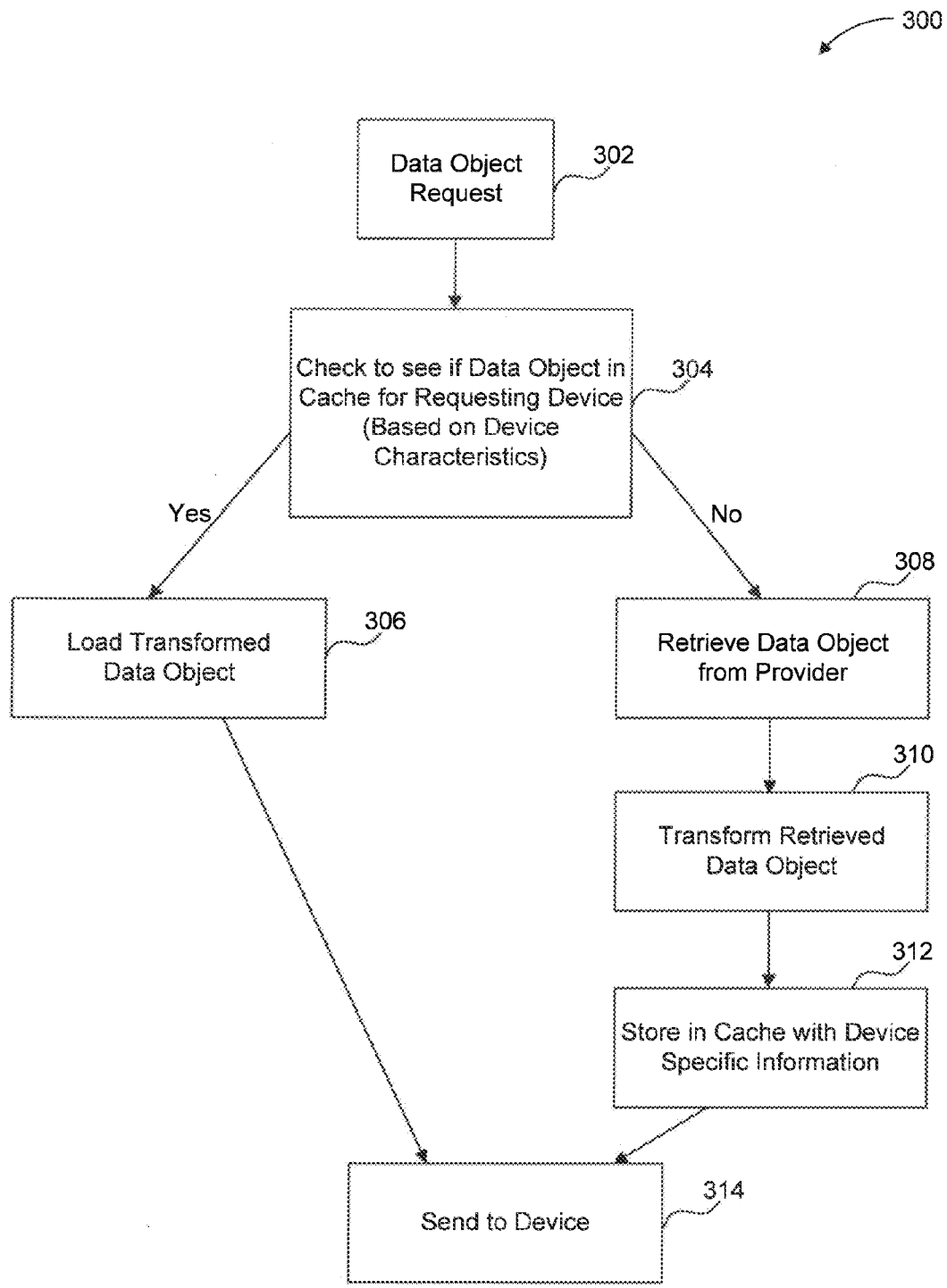
FIG. 3A is an example flowchart relating to a server cache for transformed content according to an embodiment of the invention.

FIG. 3A is a flow diagram representing an exemplary server cache operation of transformed content. The process begins with step 302. In step 302, a data object request is made by a mobile device. The mobile device may be, but is not limited to, any mobile device listed in Table 2. The process proceeds to step 304.

In step 304, web synchronization module 124 checks to see if the data object specific or applicable to the requesting mobile device is found in the cache associated with the server. If the data object specific or applicable to the requesting mobile device is found in the cache and is still valid, the process proceeds to step 306.

In step 306, web synchronization module 124 retrieves the optimized data object from cache. The process then proceeds to step 314.

Returning to step 304, if the data object specific or applicable to the requesting mobile device is not found in the cache or is no longer valid, the process proceeds to step 308.

In step 308, web synchronization module 124 retrieves the data object from provider 128. The retrieved data object may include a date-time stamp and/or other information indicating when the data object will expire. The process then proceeds to step 310.

In step 310, web synchronization module 124 transforms the data object to a form suitable for use and/or display on the requesting mobile device. For example, an address book entry will differ for Palm and Windows CE devices. The process then proceeds to step 312.

In step 312, the transformed data object is stored in the cache with device specific information, along with information on how long the data object can remain in the cache (such information may include the date-time stamp information of step 308). Note that the transformed data object is only stored in the cache if information retrieved from provider 128A indicates that the data object is cacheable or if server 104 is set to override the information from provider 128A. The process then proceeds to step 314.

In step 314, the transformed data object is sent to the requesting mobile device.

3.1.1 Special Case of Optimization for Mobile Devices: Negative Caching of Compressed Error Messages In one embodiment, negative caching is implemented. Negative caching involves caching errors that result when web synchronization module 124 is unable to retrieve the requested data object from provider 128. This eliminates the need to subsequently access the provider 128. For example, if provider 128 is down, negative caching may lessen the number of negative hits that would otherwise result if attempts were made to retrieve data objects from provider 128. When web synchronization module 124 subsequently checks the cache for the irretrievable requested data, it will see the cached error message and will make no attempt to retrieve the data from provider 128.

For example, suppose device A requests a page. The web synchronization module 124 requests the page from provider 128. However, when web synchronization module 124 requests the page from provider 128, an error is returned indicating that the page is unavailable. Web synchronization module 124 caches the error, setting configurable expiration information. Later, another device (device B) with characteristics similar to device A requests the same page. Web synchronization module 124 will see the cached error (assuming that this cached error is still valid) indicating that the page is irretrievable. Therefore, web synchronization module 124 will not have to make an attempt to retrieve the page from provider 128.

Figure 3B:
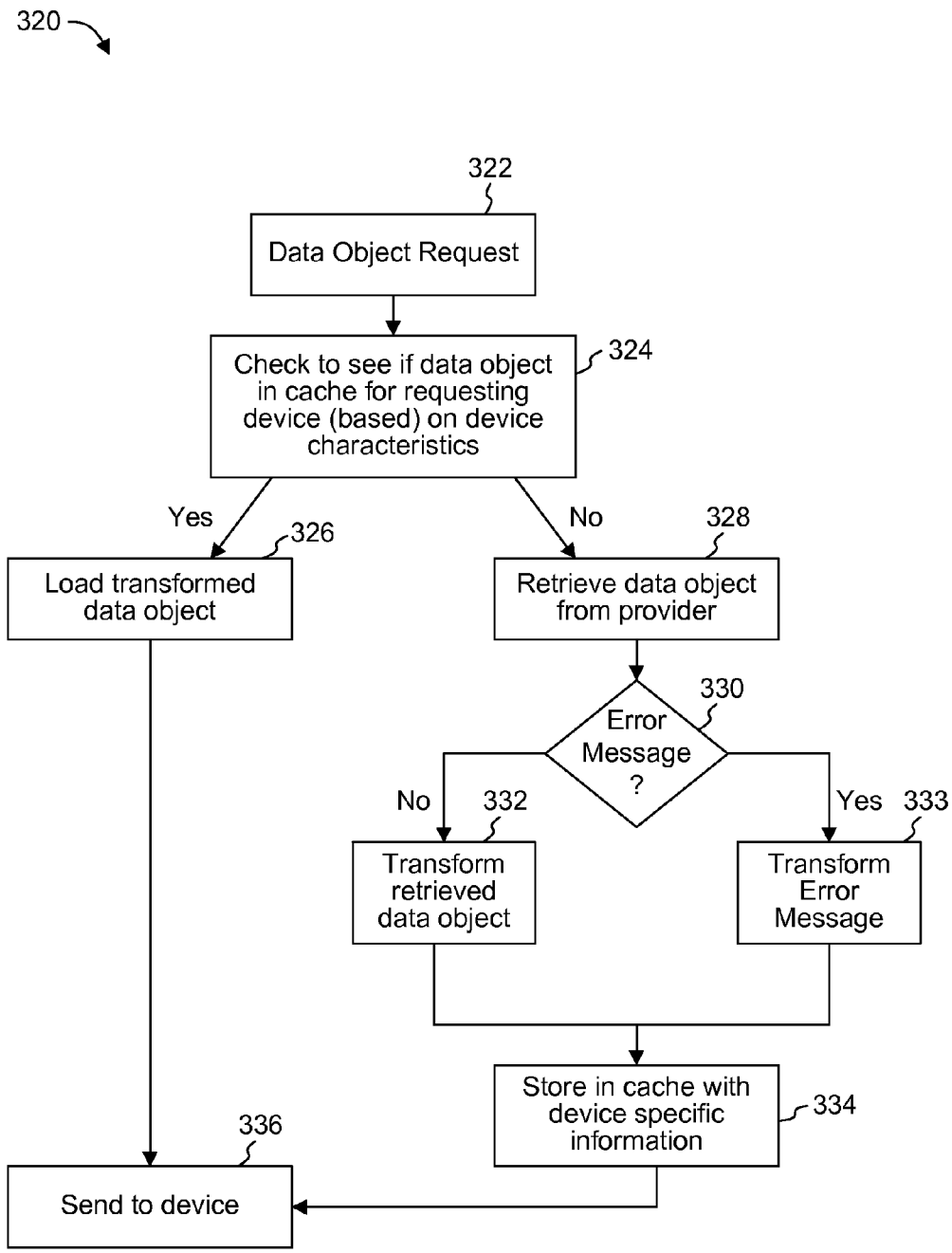
FIG. 3B is an example flowchart relating to a server cache for transformed content having negative caching according to an embodiment of the invention.

FIG. 3B is an exemplary flow diagram representing negative caching of error messages. The process begins with step 322. In step 322, a data object request is made by a mobile device. The process proceeds to step 324.

In step 324, web synchronization module 124 checks to see if the data object specific or applicable to the requesting mobile device is found in the cache associated with the server. If the data object specific or applicable to the requesting mobile device is found in the cache, the process proceeds to step 326.

In step 326, web synchronization module 124 retrieves the optimized data object from the cache. The process then proceeds to step 336.

Returning to step 324, if the data object specific or applicable to the requesting mobile device is not found in the cache, the process proceeds to step 328.

In step 328, web synchronization module 124 attempts to retrieve the data object from provider 128. The retrieved data object may include a date-time stamp and/or other information indicating when the data object will expire. The process then proceeds to decision step 330.

In decision step 330, it is determined whether an error indicating that the requested data object was irretrievable occurred as a result of step 328. If an error message occurred, the process proceeds to step 333. If no error message occurred, the process proceeds to step 332.

In step 332, web synchronization module 124 transforms the retrieved data object to a form suitable for use and/or display on the requesting mobile device. The process then proceeds to step 334.

Returning to decision step 330, if an error message occurred, web synchronization module 124, in step 333, transforms the error message to a form suitable for display on the requesting mobile device. The process then proceeds to step 334.

In step 334, the transformed data object or the error message is stored in the cache with device specific information, which may include an indication of how long such information may be cached (as explained above). Note that the transformed data object or error message is only stored in the cache if information retrieved from provider 128A indicates that the data object is cacheable or if server 104 is set to override the information from provider 128A. Server 104 may provide special overrides for negative caching of error messages. The process then proceeds to step 336.

In step 336, the transformed data object or the error message is sent to the mobile device.

3.1.2 Stochastic Cache Expiration Algorithm

Normally, when a large group of users sync daily, at least some of the users are syncing the same version of a set of pages all of which will expire at the same time. For example, if server 104 has a million users with a page on each user's device that expires at 12 midnight on Sep. 9, 2000, every single device connected to server 104 at that moment (which in a wireless world may be all of the mobile devices) will request server 104 to provide those pages.

Figure 3C:
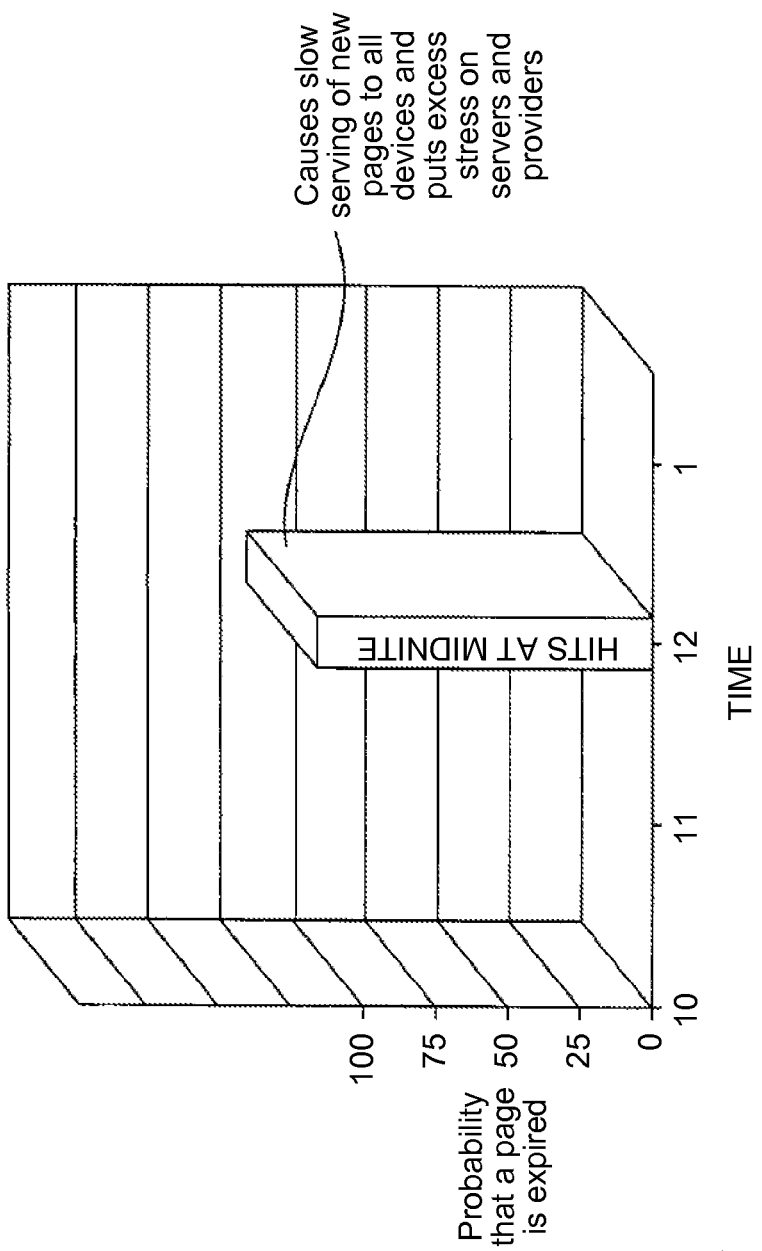
FIG. 3C is an exemplary diagram illustrating all hits on a server occurring at the same time.

An example diagram illustrating all hits on a server occurring at the same time is shown in FIG. 3C for the above example. As seen in FIG. 3C, the diagram shows all of the hits on server 104 occurring at once, that is, 12 midnight. This causes slow serving of new pages to all devices and puts excess stress on server 104 and provider 128.

To prevent the above scenario from occurring, an embodiment of the invention randomizes the expiration of the objects. This results in fast serving of new objects to all devices and puts less stress on server 104 and provider 128.

Server 104 sets a freshness lifetime for each object (or, in some embodiments, for groups of objects) stored in the cache. If the age of an object stored in the cache is within some % of the freshness lifetime (e.g. if it is about to expire), otherwise known as Server FL or server freshness lifetime, then server 104 will vary the expiration of the cached object to determine whether the cached object should expire. The % of the freshness lifetime is usually set at the startup of server 104 using server preferences set by an administrator. Alternatively, the % of the freshness lifetime may be configurable.

Server 104 uses freshness lifetime for determining whether or not to modify the expiration of the cached object. Server 104 determines whether the cached object is close to expiring and then in an embodiment it uses a stochastic function to determine whether or not to expire the cached objects. The stochastic function is used if the current age of the cached object is within some percentage of the freshness lifetime.

Figure 3D:
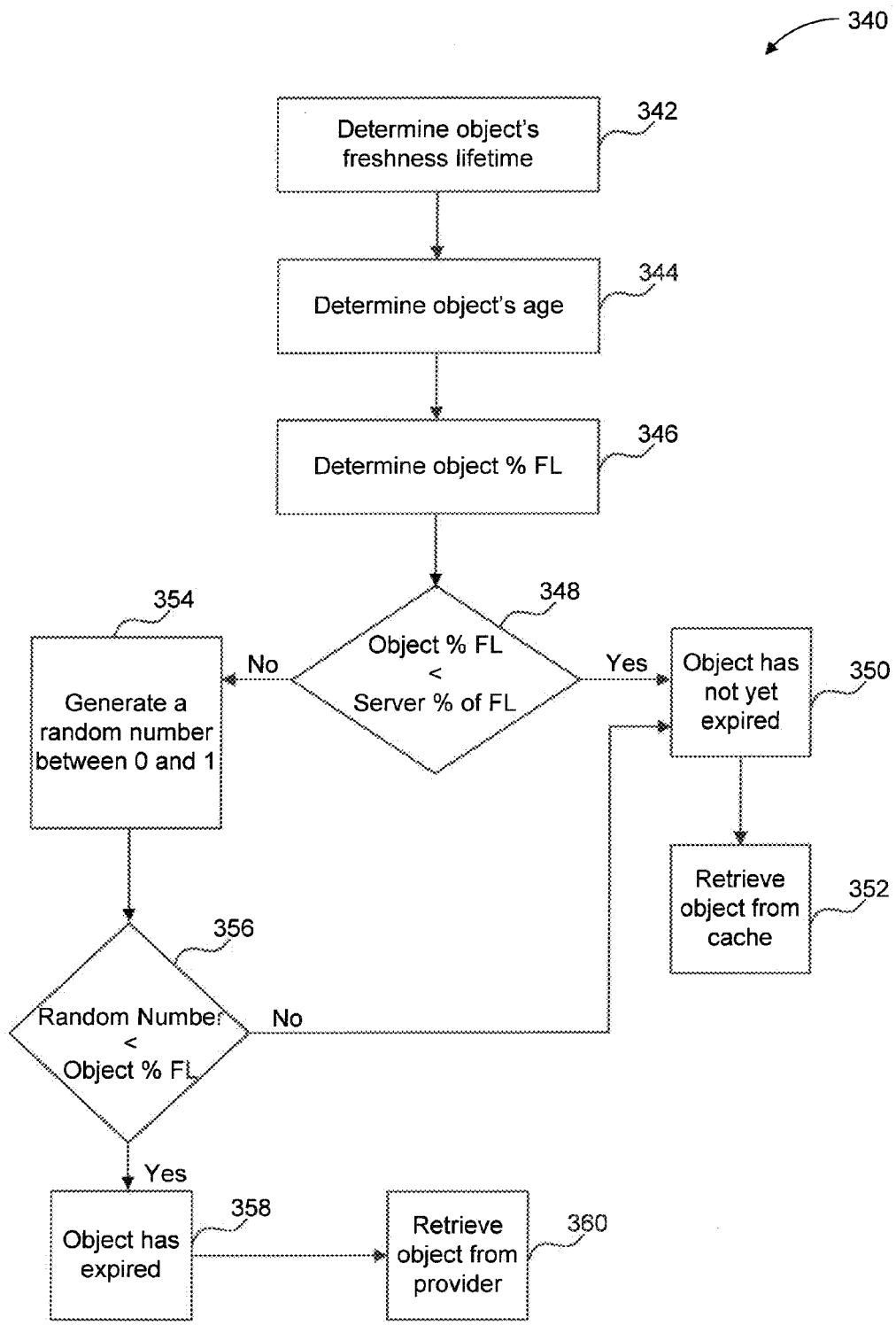
FIG. 3D is an example flow diagram representing a method for randomizing the expiration of objects set to expire at the same time according to an embodiment of the invention.

FIG. 3D is an example flow diagram representing a method for randomizing the expiration of objects set to expire at the same time according to an embodiment of the invention. The process is performed for any given object in the cache (called the cached object). The process begins with step 342. In step 342, server 104 determines the cached object's freshness lifetime. The cached object's freshness lifetime (FL) is the time of expiration (Texp) of the cached object minus the time in which the object was placed in the cache (Tin-cache). In embodiments, the time of expiration is given when the object is retrieved from the provider 128. If the time of expiration is not given, server 104 may set a time of expiration for the object, or this may be configurable. The cached object's freshness lifetime is:

$$\text{Object's FL} = T\text{exp} - T\text{in-cache} \qquad (1)$$

The process then proceeds to step 344.

In step 344, server 104 determines the cached object's age. The cached object's age is the total time that the object has been stored in the cache. The cached object's age is $$\text{Object's Age} = T\text{now} - T\text{in-cache} \qquad (2)$$

where Tnow is the current time. The process then proceeds to step 346.

In step 346, server 104 determines the % of the object's freshness lifetime. The % of the object's freshness lifetime is the object's age divided by the object's freshness lifetime. The % of the object's freshness lifetime is:

$$\text{\% of the Object's FL} = \text{Object's Age} / \text{Object's FL} \qquad (3)$$

The process then proceeds to decision step 348.

In decision step 348, it is determined whether the % of the Object's FL<% of the server FL. As previously stated, the % of the server FL is the % of the freshness lifetime set at the startup of server 104 using server preferences set by an administrator. Alternatively, the % of the server FL may be configurable. If it is determined that the % of the Object's FL is less than the % of the Server FL, then the process proceeds to step 350.

In step 350, the object is determined not to have expired. The process then proceeds to step 352.

In step 352, the object is retrieved from the cache and processed in an implementation or application dependent manner.

Returning to decision step 348, if it is determined that the % of the Object's FL is greater than or equal to the % of the Server FL, then the process proceeds to step 354.

In step 354, in an embodiment, a random number is generated using a random number generator. In one embodiment, the random number generator may be normally distributed. In another embodiment, the random number generator may be uniformly distributed. One skilled in the relevant arts would know that other distributions may be used without departing from the scope of the present invention. The process then proceeds to decision step 356.

In decision step 356, it is determined whether the random number generated in step 354 is less than the % of the Object's FL. If the random number is greater than or equal to the % of the Object's FL, then the process proceeds to step 350, where the object is determined not to have expired, and is then retrieved from the cache in step 352.

Returning to decision step 356, if it is determined that the random number generated in step 354 is less than the % of the Object's FL, then the process proceeds to step 358.

In step 358, it is determined that the object has expired. The process then proceeds to step 360.

In step 360, server 104 attempts to retrieve the object from provider 128.

The following is an example of how the above method works according to an embodiment of the invention. As previously stated, if the % of the Object's FL is within the % of the FL set by the server, the stochastic process is implemented. If, for example, an object's age is 190 and the object's freshness lifetime is 200, the object's age is 95% of the object's freshness lifetime. Suppose server 104 was set for a threshold of 90% of the freshness lifetime. When a decision is made to vary the expiration for determining whether the object is fresh or expired, the probability that the object is expired is determined by figuring out what percentage of the vary range (90-100%) the current age of the object has covered. The vary range is 90-100 percent, and since the age of the object is 95%, 50% is the probability that the object is expired. If the age were 92% of the freshness lifetime, the probability would be 20%, if 98, 80%, etc. Similarly, if the range were 80-100, and the age is 95%, the probability would be 75%. Then the random number is generated, and compared to the probability in order to determine if the object is fresh or expired. Table 3 shows the age of the object, the object's % of freshness lifetime, and the probability that the object will expire for the above example.

TABLE 3

| Age | % of Freshness Lifetime/100 | Probability of Expiring |
|---|---|---|
| 179 | .895 | 0% (not considered) |
| 185 | .925 | 25% |
| 190 | .95 | 50% |
| 195 | .975 | 75% |
| 200 | 1.0 | 100% |

Figure 3E:
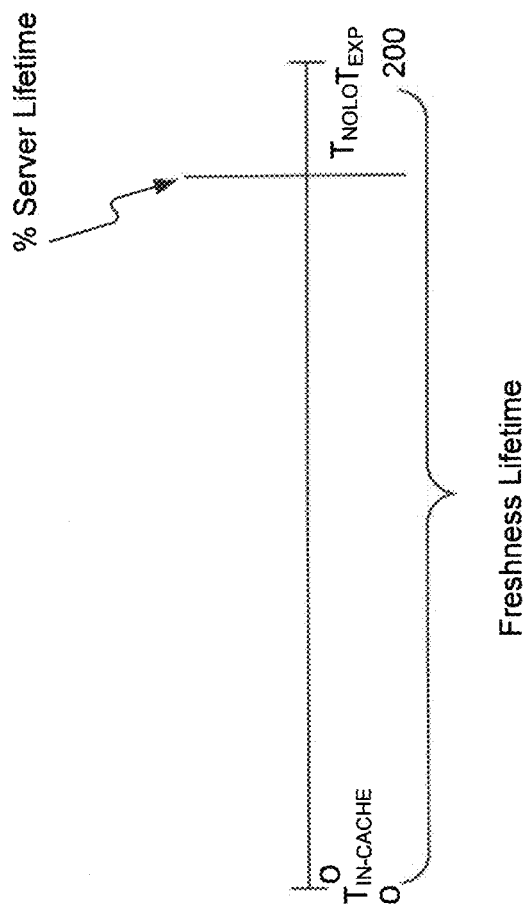
FIG. 3E is a diagram showing freshness lifetime for an object according to an embodiment of the present invention.

FIG. 3E is a diagram showing freshness lifetime for the object described in the above example. The shaded area indicates the vary range in which it is determined if the object is fresh or expired.

3.2 Syncing Mobile Devices 3.2.1 Single Account/Profile-Multiple Devices

Figure 3F:
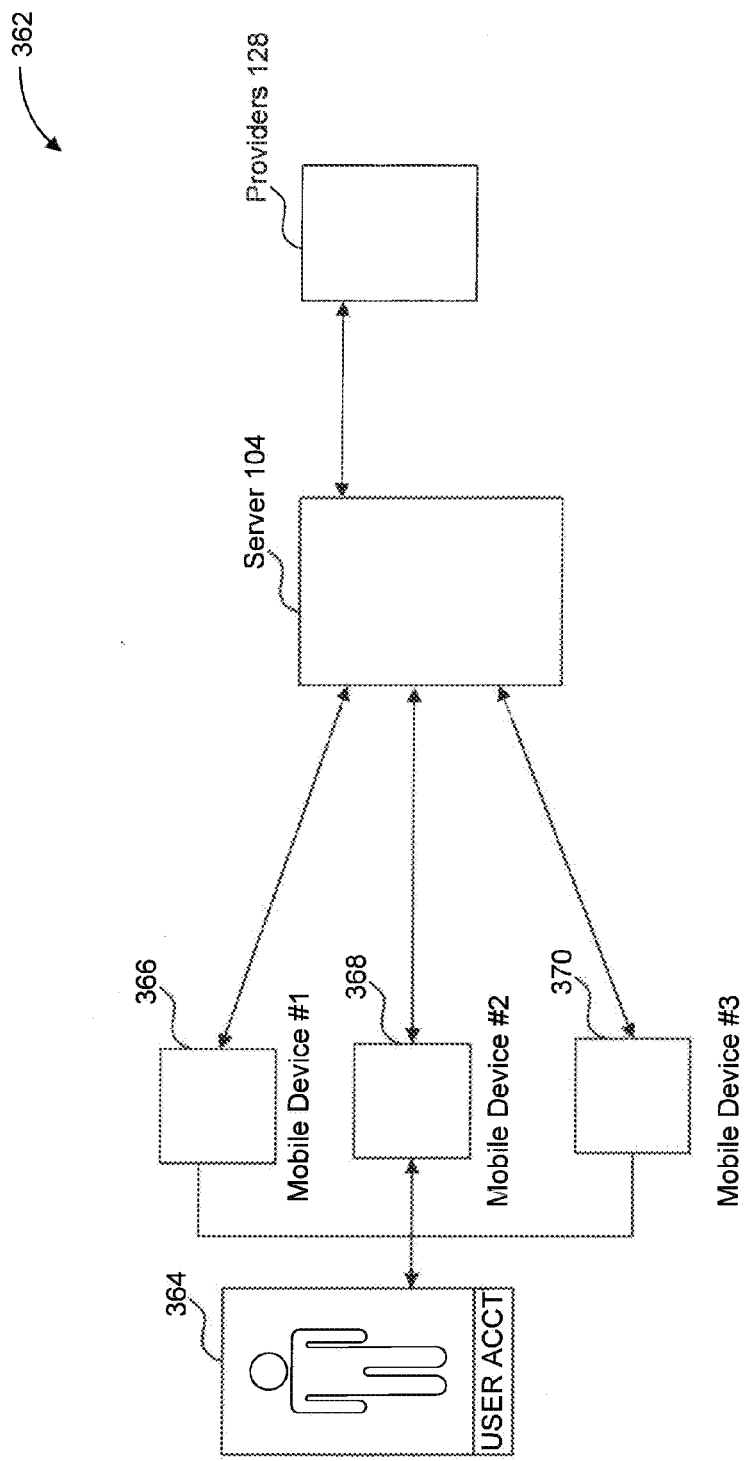
FIG. 3F is a block diagram illustrating a single account/profile having multiple devices according to an embodiment of the invention.

Server 104 enables a single account/profile user to sync multiple devices and obtain device specific content on each device. FIG. 3F is an example block diagram 362 illustrating a single account/profile having multiple devices. Block diagram 362 comprises a user account/profile 364, a first mobile device 366, a second mobile device 368, a third mobile device 370, server 104, and providers 128. First mobile device 366 may be a Palm device. Second mobile device 368 may be a cell phone. Third mobile device 370 may be Windows CE device. Although FIG. 3F shows three mobile devices associated with a single account/profile, one skilled in the relevant art(s) would know that more devices or one less device could be added or subtracted, respectively, without departing from the scope of the invention. User account/profile 364 is associated with each mobile device 366-370. Each mobile device 366-370 interacts with server 104 via a transmission medium which may be any wired or wireless medium using any communication protocol. Server 104 may also connect to providers 128.

When any one of mobile devices 366-370 initially connects to server 104, each device 366-370 will provide its device characteristics to server 104. Server 104 will store the device characteristics in database module 126 and send the device characteristics to web synchronization module 124 and/or server extension module 156. For subsequent connections with server 104, each mobile device 366-370 will identify itself to server 104 and server 104 will retrieve the device's characteristics from database module 126. In one embodiment, as long as the user continues to sync devices 366-370 with server 104, server 104 will maintain each device's information on database module 126. If any one of devices 366-370 are not synced within some predetermined period, server 104 may optionally delete that device's information from database module 126. If a user syncs devices 366-370, one right after the other, each device 366-370 will have the same content, but the content will be optimized for each specific device 366-370.

An embodiment of the invention also provides a common link to share and sync data objects between disparate user devices. For example, if user account/profile 364 has a personal digital assistant and a cell phone, neither the PDA nor the cell phone may have the ability to communicate directly with each other. Assume an address book exists on both the cell phone and the PDA. The address book must be separately updated since the two devices do not have the ability to communicate with each other. However, by using server 104 of the present invention, the PDA and the cell phone may sync up with server 104 to provide the same information on both devices. In this example, the address book of both devices may sync up with server 104 to enable the address book on both the PDA and cell phone to contain the same information. Thus, the invention syncs disparate user devices by providing server 104 as a common link to share and sync data objects.

3.2.2 Single Device-Multiple Servers

Figure 3G:
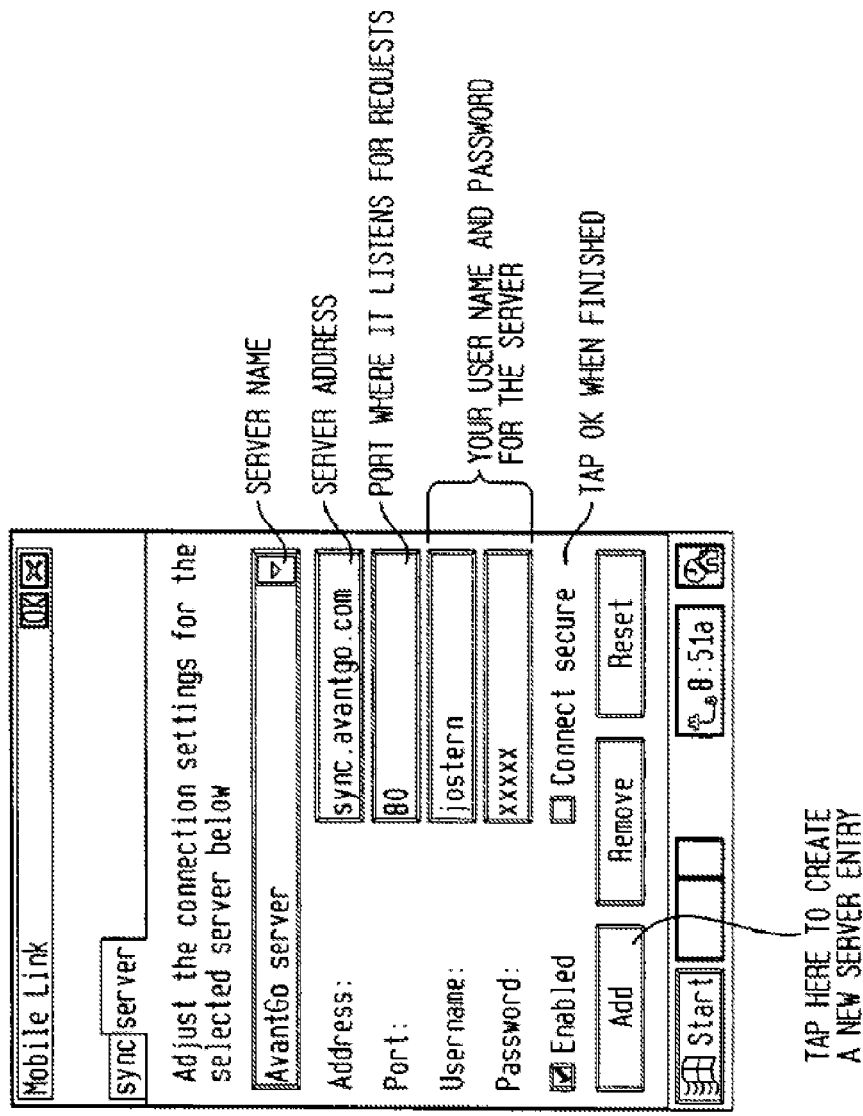
FIG. 3G shows an example screen shot for enabling a user to add multiple servers according to an embodiment of the invention.
Figure 3H:
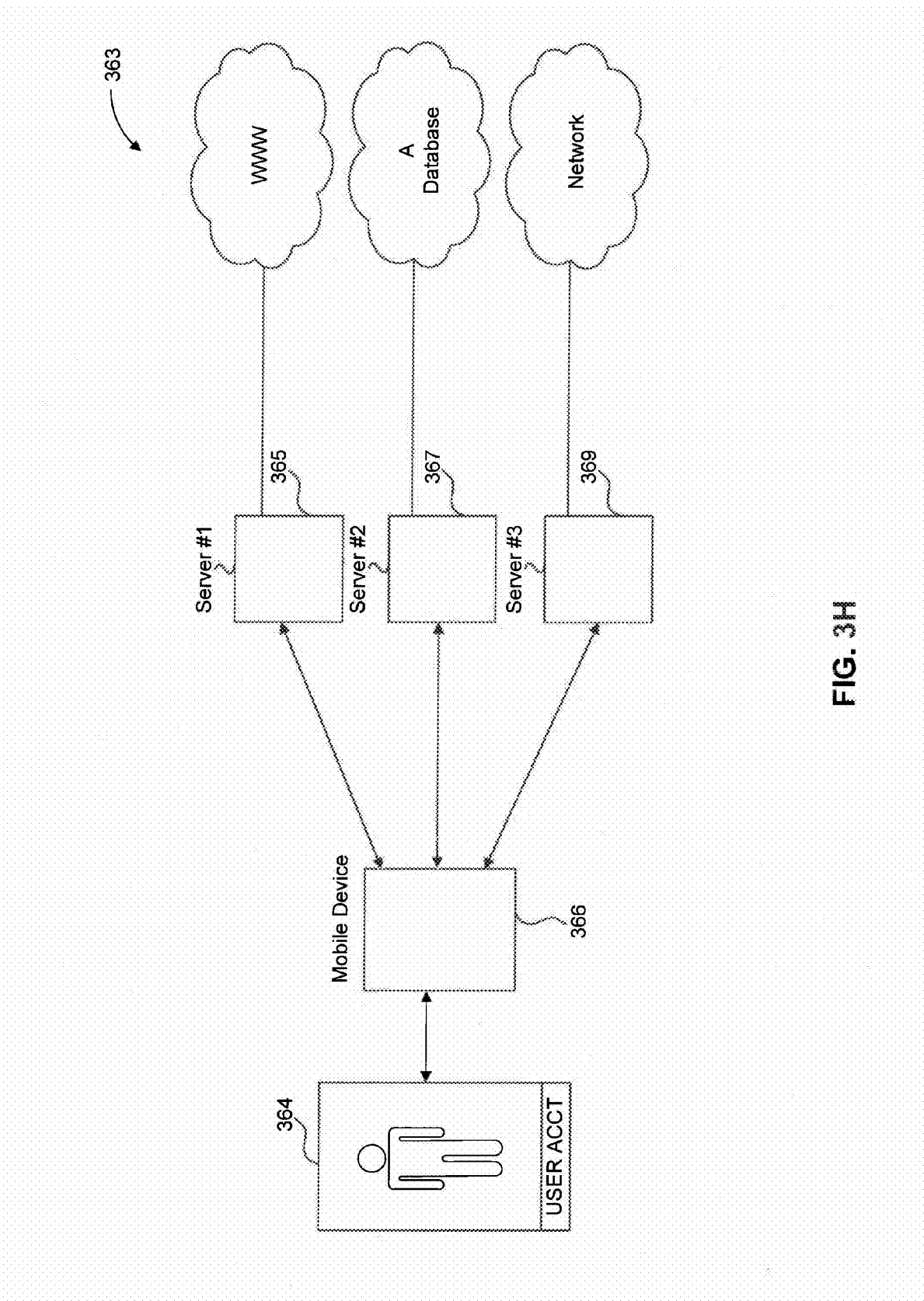
FIG. 3H is an exemplary block diagram representing a single mobile device that connects to multiple servers according to an embodiment of the invention.

The invention also enables a single device to connect to multiple servers. FIG. 3G shows an example screen shot for enabling a user to add multiple servers. FIG. 3H is an exemplary block diagram 363 representing a single mobile device that connects to multiple servers. Diagram 363 comprises single user account/profile 364 connected to mobile device 366, which, in turn, can be connected to a plurality of servers 365, 367, and 369 that may be connected to any variety of providers 128, such as the Web, a database, such as LOTUS Notes, or a network, respectively. Although FIG. 3H shows three servers 365-369, one skilled in the relevant art(s), based on the teachings contained herein, would know that more servers or less servers could be implemented without departing from the scope of the invention. When a user initiates a sync, in an embodiment, device 366 will be synced to each enabled server on device 366, one at a time.

Figure 3I:
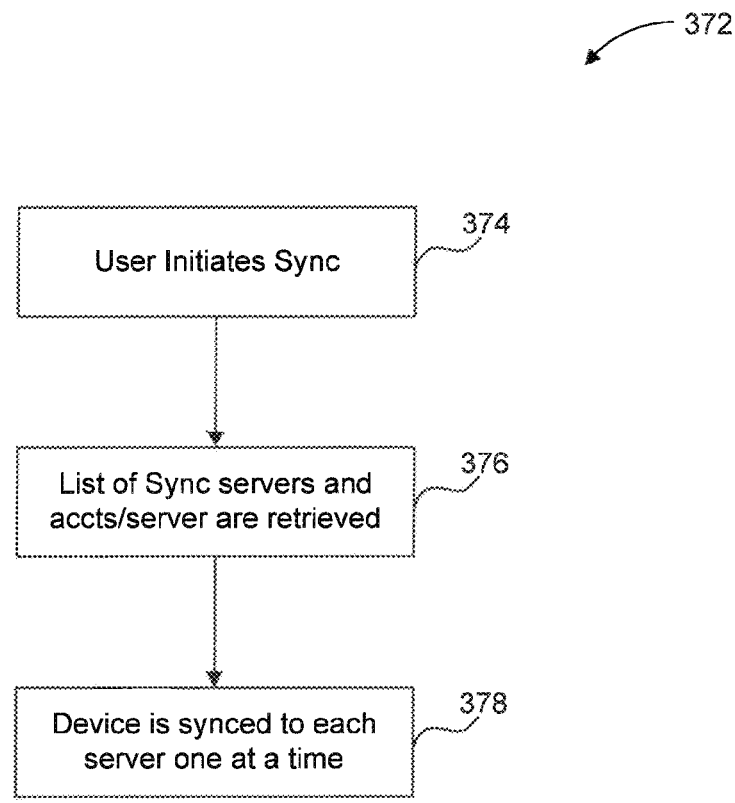
FIG. 3I is an exemplary flow diagram representing a sync process for a device connected to multiple servers according to an embodiment of the invention.

FIG. 3I is an exemplary flow diagram representing a sync process for a device connected to multiple servers. The process begins with step 374. In step 374, a user initiates a sync. The process proceeds to step 376.

In step 376, a list of sync servers and accounts per server are retrieved. The process then proceeds to step 378.

In step 378, device 366 is synced to each server, one at a time.

3.2.3 Multiple Devices-Multiple Servers

Figure 3J:
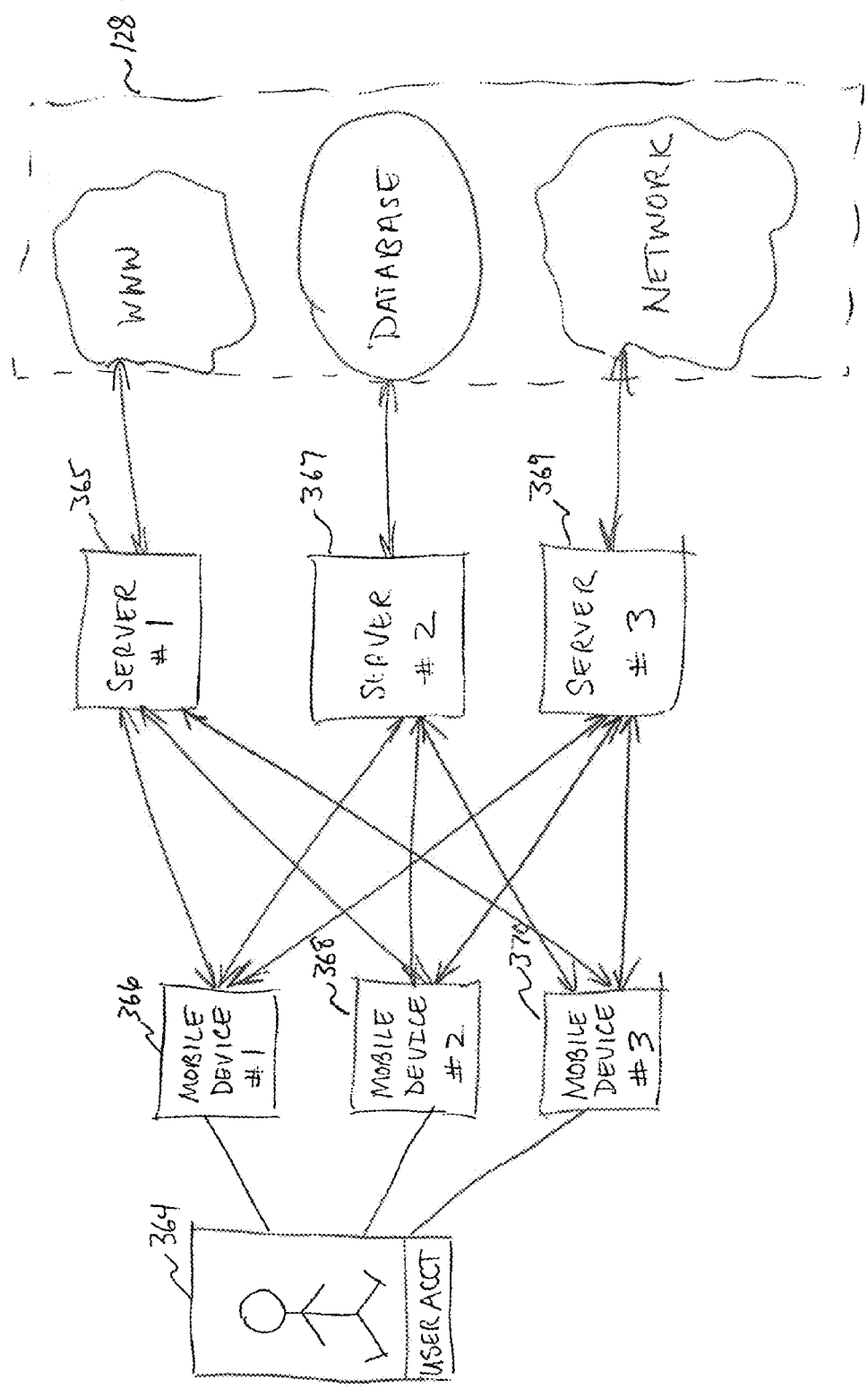
FIG. 3J is an exemplary diagram illustrating a multiple device-multiple server configuration according to an embodiment of the invention.

The invention also allows multiple devices for a single user account/profile to be connected to a plurality of servers. A multiple device—multiple server scenario is shown in FIG. 3J. Although three mobile devices and three servers are shown in FIG. 3J, one skilled in the art would know that more or less devices and servers could be used without departing from the scope of the invention. In one embodiment, user account/profile 364 can cache a variety of device characteristics 366, 368, and 370 used to access a variety of servers 365, 367, and 369. In one embodiment, the user can store the device profiles on a desktop and store the multi-server connections on devices 366, 368, and 370. When the user initiates a sync for any one of devices 366, 368, and 370, a list of sync servers and accounts per server is retrieved for the device and the device is synced to each server in the list, one at a time. The user may then sync the next device, as described above in section 3.2.1.

4. Conclusion

While various embodiments of the present invention have been described above, it should be understood that they have been presented by way of example only, and not limitation. It will be understood by those skilled in the art that various changes in form and details may be made therein without departing from the spirit and scope of the invention as defined in the appended claims. Thus, the breadth and scope of the present invention should not be limited by any of the above-described exemplary embodiments, but should be defined only in accordance with the following claims and their equivalents.

What is claimed is:

1. A method in a server for caching device specific content, comprising: receiving a request for a data object from a device; determining whether the data object is cached in a form specific to a characteristic of the requesting device; retrieving the cached data object if determined to be cached in the form; and providing the retrieved data object to the requesting device during a synchronization operation for the requesting device.

2. The method of claim 1, further comprising:
retrieving the data object from a provider if the data object is not determined to be cached in the form; and
transforming the retrieved data object into the form specific to the characteristic of the requesting device.

3. The method of claim 2, further comprising:
caching the transformed data object if information retrieved from the provider indicates that the retrieved data object is cacheable or if the server is set to override information from the provider.

4. The method of claim 2, wherein the transforming further comprises:
transforming the retrieved data object into a form suitable for use and display on the requesting device.

5. The method of claim 2, wherein the retrieving the data object from a provider further comprises:
retrieving from the provider information that indicates when the retrieved data object will expire.

6. The method of claim 1, further comprising:
caching error messages resulting from unsuccessful attempts to retrieve data objects from providers.

7. The method of claim 1, further comprising:
polling a cache for volume of cached objects expiring at the same time; and randomizing expiration of cached objects set to expire at the same time.

8. The method of claim 7, wherein the caching error messages comprises:
determining a freshness lifetime of a cached object;
determining an age of the cached object;
determining a percentage of the cached object's freshness lifetime;
retrieving the cached object from the cache if the percentage of the cached object's freshness lifetime is less than a percentage of a server freshness lifetime; and
stochastically determining whether the cached object has expired if the percentage of the cached object's freshness lifetime is equal to or greater than the percentage of the server freshness lifetime.

9. The method of claim 8, wherein the stochastically determining comprises:
generating a random number;
retrieving the cached object from the cache if the random number is greater than or equal to the percentage of the cached object's freshness lifetime; and
retrieving the cached object from a provider if the random number is less than the percentage of the cached object's freshness lifetime.

10. A method for enabling an account/profile on a server to be associated with a plurality of devices, comprising:
receiving device characteristics for each device from the plurality of devices;
storing the device characteristics;
storing, at the server, content in a first form for devices having a first device characteristic;
storing, at the server, the content in a second form for devices having a second device characteristic; and
syncing a device from the plurality of devices with one of the first form or the second form of the content based on at least one device characteristic specific to the device.

11. The method of claim 10, further comprising: syncing the device to a plurality of servers.

12. The method of claim 10, wherein the server provides a common link to share and to sync data objects between disparate devices.

13. The method of claim 12, comprising:
syncing with a first device by receiving updates to a first resource resident on said first device; and
syncing with a second device by transferring said updates to said second device, wherein said updates are applied to a second resource resident on said second device.

14. The method of claim 13, wherein said first and second resources are representations of an object, wherein said object is at least one of an address book, a calendar, a document, an email account, and a financial program.

15. The method of claim 11, the synching of the device to the plurality of servers comprising:
retrieving a list of servers; and
second syncing the device to each of the servers in said list.

16. The method of claim 15, further comprising:
repeating the second synching for each device from the plurality of devices.

17. A computer program product comprising a computer useable non-transitory medium including control logic stored therein, said control logic enabling a processor to perform operations to cache device specific content in a server, the operations comprising:
receiving a request for a data object from a device;
determining whether the data object is cached in a form specific to a characteristic of the requesting device;

retrieving the cached data object if found to be cached in the determining; and providing the retrieved data object to the requesting device during a synchronization operation for the requesting device.

18. The computer program product of claim 17, the operations further comprising:

retrieving the data object from a provider if the data object is not found to be cached; and transforming the retrieved data object into a form specific to the characteristic of the requesting device.

19. The computer program product of claim 18, the operations further comprising:

caching the transformed data object if information retrieved from the provider indicates that the retrieved data object is cacheable or if the processor is set to override information from the provider.

20. The computer program product of claim 18, the transforming comprising:

transforming the retrieved data object into a form suitable for use and display on the requesting device.

21. The computer program product of claim 18, the retrieving comprising:

retrieving from the provider information that indicates when the retrieved data object will expire.

22. The computer program product of claim 17, the operations further comprising:

caching error messages resulting from unsuccessful attempts to retrieve data objects from providers.

23. The computer program product of claim 17, the operations further comprising:

polling a cache for volume of cached objects expiring at the same time; and randomizing expiration of cached objects that are set to expire at the same time.

24. The computer program product of claim 23, the randomizing comprising:

determining a freshness lifetime of a cached object;

determining an age of the cached object;

determining a percentage of the cached object's freshness lifetime;

retrieving the cached object from the cache if the percentage of the cached object's freshness lifetime is less than a percentage of the server freshness lifetime; and stochastically determining if the cached object has expired based on whether the percentage of the cached object's freshness lifetime is equal to or greater than the percentage of the server freshness lifetime.

25. The computer program product of claim 24, the stochastically determining comprising:

generating a random number;

retrieving the cached object from the cache if the random number is greater than or equal to the percentage of the cached object's freshness lifetime; and retrieving the cached object from the provider if the random number is greater less than the percentage of the cached object's freshness lifetime.

26. A computer program product comprising a computer useable non-transitory medium including control logic stored therein, said control logic enabling a processor to perform operations to associate an account/profile on a server with a plurality of devices, the operations comprising:

receiving device characteristics for each device from the plurality of devices;

first storing the device characteristics;

second storing content, at the server, in a first form for devices containing a first device characteristic;

third storing the content, at the server, in a second form for devices containing a second device characteristic; and syncing a device from the plurality of devices with one of the first form or the second form of the content based on at least one device characteristic specific to the device.

27. The computer program product of claim 26, the operations further comprising:

syncing the device to a plurality of servers.

28. The computer program product of claim 26, wherein the server provides a common link to share and to sync data objects between disparate devices.

29. The computer program product of claim 28, the operations further comprising:

syncing with a first device by receiving updates to a first resource resident on said first device; and syncing with a second device by transferring said updates to said second device, wherein said updates are applied to a second resource resident on said second device.

30. The computer program product of claim 29, wherein said first and second resources are representations of an object, wherein said object is at least one of an address book, a calendar, a document, an email account, and a financial program.

31. The computer program product of claim 27, the syncing the device to the plurality of servers comprising:

retrieving a list of servers; and syncing the device to each of the servers in said list.

32. The computer program product of claim 31, the operations further comprising:

syncing each device from the plurality of devices to each of the servers in said list.

* * * * *